US011015057B2

(12) United States Patent
Rao et al.

(10) Patent No.: US 11,015,057 B2
(45) Date of Patent: May 25, 2021

(54) DUAL-CURE COMPOSITIONS

(71) Applicant: PRC-DeSoto International, Inc., Sylmar, CA (US)

(72) Inventors: Chandra Rao, Valencia, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 106 days.

(21) Appl. No.: 16/373,668

(22) Filed: Apr. 3, 2019

(65) Prior Publication Data
US 2020/0317917 A1    Oct. 8, 2020

(51) Int. Cl.
*C08L 81/02* (2006.01)
*C08K 5/19* (2006.01)
*C08K 5/55* (2006.01)
*C08L 71/02* (2006.01)
*C09K 3/10* (2006.01)
*C08G 75/04* (2016.01)

(52) U.S. Cl.
CPC .............. *C08L 81/02* (2013.01); *C08K 5/19* (2013.01); *C08K 5/55* (2013.01); *C08L 71/02* (2013.01); *C09K 3/1012* (2013.01); *C08G 75/04* (2013.01); *C09K 2003/1062* (2013.01)

(58) Field of Classification Search
CPC ................................ C08L 81/02; C08K 5/55
See application file for complete search history.

(56) References Cited

U.S. PATENT DOCUMENTS

| | | |
|---|---|---|
| 3,517,082 A | 6/1970 | Cockerham |
| 4,366,307 A | 12/1982 | Singh et al. |
| 4,609,762 A | 9/1986 | Morris et al. |
| 4,623,711 A | 11/1986 | Morris et al. |
| 5,225,472 A | 7/1993 | Cameron et al. |
| 6,172,179 B1 | 1/2001 | Zook et al. |
| 6,232,401 B1 | 5/2001 | Zook et al. |
| 6,509,418 B1 | 1/2003 | Zook et al. |
| 7,009,032 B2 | 3/2006 | Bojkova et al. |
| 7,247,596 B2 | 7/2007 | Jialanella et al. |
| 7,390,859 B2 | 6/2008 | Sawant et al. |
| 7,438,974 B2 | 10/2008 | Obuhowich |
| 7,858,703 B2 | 12/2010 | Zook et al. |
| 7,875,666 B2 | 1/2011 | Gilmore et al. |
| 7,879,955 B2 | 2/2011 | Rao et al. |

(Continued)

FOREIGN PATENT DOCUMENTS

| | | |
|---|---|---|
| WO | 2006/073695 A1 | 7/2006 |
| WO | 2007/044735 A2 | 4/2007 |

(Continued)

OTHER PUBLICATIONS

Kim, Y.H. et al., "Organic Synthesis Utilizing Tetrabutylammonium Peroxydisulfate," Reviews on Heteroatom Chemistry, 1999, vol. 20, p. 69-96.

(Continued)

*Primary Examiner* — Michael M Dollinger
(74) *Attorney, Agent, or Firm* — William R. Lambert

(57) ABSTRACT

Dual cure compositions include a combination of an organoborane complex and a radical oxidizing agent as co-catalysts. The compositions are curable under dark conditions and can be used to catalyze thiol-ene reactions. The compositions are useful as sealants.

22 Claims, 2 Drawing Sheets

(56) References Cited

U.S. PATENT DOCUMENTS

| | | | |
|---|---|---|---|
| 8,138,273 B2 | 3/2012 | Rao et al. | |
| 8,466,220 B2 | 6/2013 | Rao et al. | |
| 8,541,513 B2 | 9/2013 | Hobbs et al. | |
| 8,729,216 B2 | 5/2014 | Hobbs et al. | |
| 8,816,023 B2 | 8/2014 | Anderson et al. | |
| 8,932,685 B2 | 1/2015 | Keledjian et al. | |
| 8,952,124 B2 | 2/2015 | Rao et al. | |
| 8,993,691 B2 | 3/2015 | Anderson et al. | |
| 9,079,833 B2 | 7/2015 | Klobes et al. | |
| 9,382,642 B2 | 7/2016 | Yarlagadda et al. | |
| 9,422,451 B2 | 8/2016 | Rao et al. | |
| 9,533,798 B2 | 1/2017 | Virnelson | |
| 9,540,540 B2 | 1/2017 | Rao et al. | |
| 9,663,619 B2 | 5/2017 | Echigoya et al. | |
| 2003/0027900 A1* | 2/2003 | Burgel | C04B 40/0666 524/2 |
| 2007/0141267 A1 | 6/2007 | Sonnenschein et al. | |
| 2008/0319097 A1* | 12/2008 | Johannsen | C08F 8/32 522/61 |
| 2009/0023606 A1* | 1/2009 | Gavelin | C08F 226/02 506/30 |
| 2010/0010133 A1 | 1/2010 | Zook et al. | |
| 2011/0319559 A1 | 12/2011 | Kania et al. | |
| 2016/0090507 A1 | 3/2016 | Keledjian et al. | |
| 2016/0152775 A1 | 6/2016 | Tobis et al. | |
| 2016/0257819 A1 | 9/2016 | Pathak et al. | |
| 2017/0114208 A1 | 4/2017 | Rao et al. | |
| 2017/0369737 A1 | 12/2017 | Cui et al. | |
| 2019/0153163 A1* | 5/2019 | Davis | C08L 81/02 |
| 2019/0153164 A1* | 5/2019 | Davis | C08G 75/045 |

FOREIGN PATENT DOCUMENTS

| | | | |
|---|---|---|---|
| WO | 2015148319 | 10/2015 | |
| WO | 2016/106352 A1 | 6/2016 | |
| WO | 2016/168048 A1 | 10/2016 | |
| WO | 2017044704 | 3/2017 | |
| WO | WO-2017177089 A1 * | 10/2017 | C08G 75/045 |
| WO | WO-2017177095 A1 * | 10/2017 | C09J 181/02 |
| WO | 2018005416 | 1/2018 | |
| WO | 2018/031532 A1 | 2/2018 | |
| WO | 2018/085650 A1 | 5/2018 | |
| WO | 2018085190 | 5/2018 | |
| WO | 2018227149 | 12/2018 | |
| WO | 2019064103 | 4/2019 | |

OTHER PUBLICATIONS

Yang, Seung Gak et al., "Highly efficient epoxidation of electron-deficient olefins with tetrabutylammonium peroxydisulfate," Tetrahedron, 2007, vol. 63, Issue 24, p. 5184-5188.

International Search Report and Written Opinion for Application No. PCT/US2018/036746, dated Aug. 7, 2018, 9 pages.

* cited by examiner

DUAL-CURE COMPOSITIONS

FIELD

The disclosure relates to compositions that are curable under dark conditions. The dual cure compositions include a combination of an organoborane and a radical oxidizing agent as co-catalysts. The compositions can be used to catalyze thiol-ene reactions. The compositions are useful as sealants.

BACKGROUND

Sealants that are curable using ultraviolet (UV) radiation are useful in the aerospace industry. UV-curable sealants can be stored as a single component and can have an extended application time.

Although able to provide highly reliable seals in certain applications the thickness or geometry of a seal can prevent the ultraviolet light needed to initiate the free-radical curing reaction from reaching all portions of the applied sealant. Incomplete, insufficient, and/or inhomogeneous exposure to the ultraviolet light can result in a sealant that is not completely cured or that will only cure after an unacceptably long period of time. Furthermore, in some seals it is not possible to fully irradiate the uncured sealant.

Dual cure systems that combine a UV-initiated free radical curing reaction and a redox initiated free radical reaction can be combined to provide a sealant that will at least partially cure following exposure to UV radiation and subsequently continue to cure through a redox-initiated free radical reaction.

Alternative dual cure and dark cure sealants that can be at least partially cured upon exposure to UV radiation and that can cure under dark conditions are desired.

SUMMARY

According to the present invention, compositions comprise a polythiol; a polyalkenyl; an organoborane complex; and a radical oxidizing agent.

According to the present invention, cured sealants are prepared from the composition according to the present invention.

According to the present invention, parts are sealed with the cured sealant according to the present invention.

According to the present invention, vehicles comprise a surface sealed with the cured sealant according to the present invention.

According to the present invention, methods of sealing a part comprise applying the composition according to the present invention to a part; and allowing the applied composition to cure, to seal the part.

According to the present invention, sealant systems comprise: a first part, wherein the first part comprises a polyalkenyl; and a second part, wherein the second part comprises a polythiol; a third part, wherein the third part comprises an organoborane complex; and a fourth part, wherein the fourth part comprises a radical oxidizing agent.

According to the present invention, methods of sealing a part, comprise combining the first part, the second part, the third part, and the fourth part of the sealant system according to the present invention to provide a curable sealant; applying the curable sealant to a part; and allowing the applied sealant to cure, to seal the part.

BRIEF DESCRIPTION OF THE DRAWINGS

The drawings described herein are for illustration purposes only. The drawings are not intended to limit the scope of the present disclosure.

DETAILED DESCRIPTION

Figure 1:
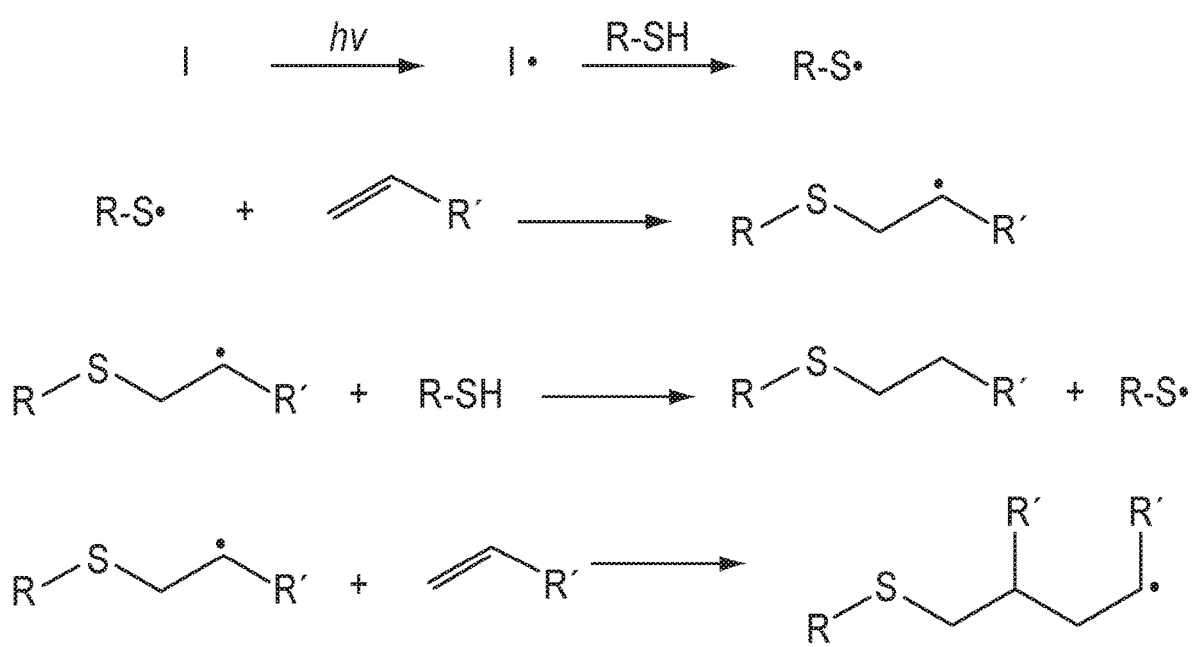
FIG. 1 shows a reaction scheme for a UV-initiated free-radical reaction between a thiol and an alkenyl.

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("-") that is not between two letters or symbols is used to indicate a point of bonding for a substituent or between two atoms. For example, —$CONH_2$ is attached through the carbon atom.

"Alkanediyl" refers to a diradical of a saturated or unsaturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, and dodecane- 1,12-diyl Alkanediyl groups can include single, double, and/or triple bonds between carbon atoms.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$, $C_{6-10}$, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, or $C_{6-9}$ alkanearene. Examples of alkanearene groups include diphenyl methane.

"Alkanearenediyl" refers to a diradical of an alkanearene group. An alkanearenediyl group is $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, or $C_{6-9}$ alkanearenediyl. Examples of alkanearenediyl groups include diphenyl methane-4,4'-diyl.

"Alkenyl" group refers to the structure $-CR=C(R)_2$ where the alkenyl group is a terminal group and is bonded to a larger molecule. In such embodiments, each R may independently comprise, for example, hydrogen and $C_{1-3}$ alkyl. Each R can be hydrogen and an alkenyl group can have the structure $-CH=CH_2$.

"Alkoxy" refers to a $-OR$ group where R is alkyl as defined herein. Examples of alkoxy groups include methoxy, ethoxy, n-propoxy, isopropoxy, and n-butoxy. An alkoxy group can be $C_{1-8}$ alkoxy, $C_{1-6}$ alkoxy, $C_{1-4}$ alkoxy, or $C_{1-3}$ alkoxy.

"Alkyl" refers to a monoradical of a saturated or unsaturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_{6-9}$ arenediyl, or benzene-diyl.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

"Cycloalkyl" refers to a saturated monocyclic or polycyclic hydrocarbon mono-radical group. A cycloalkyl group can be $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, or P. In a heteroalkanediyl, the one or more heteroatoms can comprise N or O.

"Heterocycloalkanediyl" refers to a cycloalkanediyl group in which one or more of the carbon atoms are replaced with a heteroatom, such as N, O, S, or P. In a heterocycloalkanediyl, the one or more heteroatoms can comprise N or O.

"Heteroarenediyl" refers to an arenediyl group in which one or more of the carbon atoms are replaced with a heteroatom, such as N, O, S, or P. In a heteroarenediyl, the one or more heteroatoms can comprise N or O.

A "polyalkenyl" refers to a compound having at least two alkenyl groups. The at least two alkenyl groups can be terminal alkenyl groups and such polyalkenyls can be referred to as alkenyl-terminated compounds. Alkenyl groups can also be pendent alkenyl groups. A polyalkenyl can be a dialkenyl, having two alkenyl groups. A polyalkenyl can have more than two alkenyl groups such as from three to six alkenyl groups. A polyalkenyl can comprise a single type of polyalkenyl, can be a combination of polyalkenyls having the same alkenyl functionality, or can be a combination of polyalkenyls having different alkenyl functionalities.

A "polyalkenyl prepolymer" refers to a polyalkenyl having at least one repeat unit in the polyalkenyl backbone. A polyalkenyl prepolymer generally has a molecular weight in the range from 500 Da to 6,000 Da, such as from 500 Da to 4,000 Da or from 500 Da to 2,000 Da.

A "monomeric polyalkenyl" refers to a polyalkenyl that does not include repeat units in the polyalkenyl backbone. A monomeric polyalkenyl generally has a molecular weight that is less than that of a polyalkenyl prepolymer. Monomeric polyalkenyls can be difunctional or have an alkenyl functionality greater than two.

"Formed from" or "prepared from" denotes open, e.g., comprising, claim language. As such, it is intended that a composition "formed from" or "prepared from" a list of recited components be a composition comprising at least the recited components or the reaction product of at least the recited components, and can further comprise other, non-recited components used to form or prepare the composition.

"Reaction product of" means a chemical reaction product(s) of at least the recited reactants and can include partial reaction products as well as fully reacted products and other reaction products that are present in a lesser amount. For example, a "prepolymer comprising the reaction product of reactants" refers to a prepolymer or combination of prepolymers that are the reaction product of at least the recited reactants. The reactants can further comprise additional reactants.

A compound having a thiol functionality or an alkenyl functionality refers to a compound which has reactive thiol or alkenyl groups, respectively. The reactive thiol or alkenyl groups may be terminal groups bonded to the ends of the molecule, may be bonded to the backbone of the molecule, or the compound may contain thiol or alkenyl groups that are terminal groups or are bonded to the backbone.

As used herein, the term "cure" or "cured" as used in connection with a composition, e.g., "composition when cured" or a "cured composition", means that any curable or crosslinkable components of the composition are at least partially reacted or crosslinked.

The term "equivalent" refers to the number of functional reactive groups of the substance. "Equivalent weight" is effectively equal to the molecular weight of a substance, divided by the valence or number of functional reactive groups of the substance.

A "backbone" of a prepolymer refers to the segment between the reactive terminal groups. A prepolymer backbone typically includes repeating subunits. For example, the backbone of a polythiol HS—[R]$_n$—SH is —[R]$_n$—.

A "core" of a polyfunctionalizing agent B(—V)$_z$ refers to the moiety B. A "core" of a compound or a polymer refers to the segment between the reactive terminal groups. For example, the core of a polythiol HS—R—SH will be —R—. A core of a compound or prepolymer can also be referred to as a backbone of a compound or a backbone of a prepolymer. A core of a polyfunctionalizing agent can be an atom or a structure such as a cycloalkane, a substituted cycloalkane, heterocycloalkane, substituted heterocycloalkane, arene, substituted arene, heteroarene, or substituted heteroarene from which moieties having a reactive functional are bonded.

"Prepolymer" refers to oligomers, homopolymers, and copolymers. For thiol-terminated prepolymers, molecular weights are number average molecular weights "Mn" as determined by end group analysis using iodine titration. For prepolymers that are not thiol-terminated, the number average molecular weights are determined by gel permeation chromatography using polystyrene standards. A prepolymer comprises reactive groups capable of reacting with another compound such as a curing agent or crosslinker to form a cured polymer. A prepolymer such as a chain-extended polythioether prepolymer provided by the present disclosure can be combined with a curing agent to provide a curable composition, which can cure to provide a cured polymer network. Prepolymers are liquid at room temperature (213° C.) and pressure (760 torr; 101 kPa).

A prepolymer includes multiple repeating subunits bonded to each other than can be the same or different. The multiple repeating subunits make up the backbone of the prepolymer.

A "curable composition" refers to a composition that comprises at least two reactants capable of reacting to form a cured composition. For example, a curable composition can comprise an isocyanate-terminated chain-extended polythioether prepolymer and a polyamine capable of reacting to form a cured polymer. A curable composition may include a catalyst for the curing reaction and other components such as, for example, filler, pigments, and adhesion promoters. A curable composition may be curable at room temperature or may require exposure to elevated temperature such as a temperature above room temperature or other condition(s) to initiate and/or to accelerate the curing reaction. A curable composition may initially be provided as a two-part composition including, for example, a separate base component and an accelerator component. The base composition can contain one of the reactants participating in the curing reaction such as an isocyanate-terminated chain-extended polythioether prepolymer and the accelerator component can contain the other reactant such as a polyamine. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec). The viscosity of the compositions is measured as described herein. After the two components of a sealant system are combined and mixed, the curing reaction can proceed, and the viscosity of the curable composition can increase and at some point, will no longer be workable, as described herein. The duration between when the two components are mixed to form the curable composition and when the curable composition can no longer be reasonably or practically applied to a surface for its intended purpose can be referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, cures, and then fully cures over a period of time. A curable composition can be considered to be cured when the hardness of the surface is at least Shore 30 A for a Class B sealant or a Class C sealant. After a sealant has cured to a hardness of Shore 30 A it can take from several days to several weeks for a curable composition fully cure. A composition is considered fully cured when the hardness no longer increases. Depending on the formulation, a fully cured sealant can exhibit, for example, a hardness from Shore 40 A to Shore 70 A, determined according to ISO 868. For coating applications, a curable composition can have a viscosity, for example, from 200 cps to 800 cps (0.2 Pa-sec to 0.8 Pa-sec). For sprayable coating and sealant compositions, a curable composition can have a viscosity, for example, from 15 cps to 100 cps (0.015 Pa-sec to 0.1 Pa-sec), such as from 20 cps to 80 cps (0.02 Pa-sec to 0.0.8 Pa-sec).

"Substituted" refers to a group in which one or more hydrogen atoms are each independently replaced with the same or different substituent(s). A substituent can comprise halogen, —S(O)$_2$OH, —S(O)$_2$, —SH, —SR where R is C$_{1-6}$ alkyl, —COOH, —NO$_2$, —NR$_2$ where each R independently comprises hydrogen and C$_{1-3}$ alkyl, —CN, =O, C$_{1-6}$ alkyl, —CF$_3$, —OH, phenyl, C$_{2-6}$ heteroalkyl, C$_{5-6}$ heteroaryl, C$_{1-6}$ alkoxy, or —C(O)R where R is C$_{1-6}$ alkyl. A substituent can be —OH, —NH$_2$, or C$_{1-3}$ alkyl.

"Derived from" as in "a moiety derived from a compound" refers to a moiety that is generated upon reaction of a parent compound with a reactant. For example, a bis (alkenyl) compound CH$_2$=CH—R—CH=CH$_2$ can react with another compound such as a compound having thiol groups to produce the moiety —(CH$_2$)$_2$—R—(CH$_2$)$_2$— derived from the reaction of the alkenyl groups with the thiol groups. For example, for a parent diisocyanate having the structure O=C=N—R—N=C=O, a moiety derived from the diisocyanate has the structure —C(O)—NH—R—NH—C(O)—. As another example, for a parent non-linear short chain diol having the structure HO—R—OH, a moiety derived from the non-linear short-chain diol has the structure —O—R—O—.

"Derived from the reaction of —V with a thiol" refers to a moiety —V'— that results from the reaction of a thiol group with a moiety comprising a terminal group reactive with a thiol group. For example, a group V— can comprise $CH_2$=CH—$CH_2$—O—, where the terminal alkenyl group $CH_2$=CH— is reactive with a thiol group —SH. Upon reaction with a thiol group, the moiety —V'— is —$CH_2$—$CH_2$—$CH_2$—O—.

"Dark cure" refers to curing mechanisms that do not require exposure to actinic radiation such as UV radiation to initiate the reaction. Actinic radiation may be applied to a dark cure system to accelerate curing of all or a part of a composition but exposing the composition to actinic radiation is not necessary to cure the sample. A dark cure composition can fully cure under dark conditions without exposure to actinic radiation.

Glass transition temperature $T_g$ is determined by dynamic mechanical analysis (DMA) using a TA Instruments Q800 apparatus with a frequency of 1 Hz, an amplitude of 20 microns, and a temperature ramp of –80° C. to 25° C., with the $T_g$ identified as the peak of the tan δ curve.

When reference is made to a chemical group defined, for example, by a number of carbon atoms, the chemical group is intended to include all sub-ranges of carbon atoms as well as a specific number of carbon atoms. For example, a $C_{2-10}$ alkanediyl includes a $C_{2-4}$ alkanediyl, $C_{5-7}$ alkanediyl, and other sub-ranges, a $C_2$ alkanediyl, a $C_6$ alkanediyl, and alkanediyls having other specific number(s) of carbon atoms from 2 to 10.

A polyfunctionalizing agent can have the structure of Formula (1):

where $B^1$ is the core of the polyfunctionalizing agent, each V is a moiety terminated in a reactive functional group such as a thiol group, an alkenyl group, an epoxy group, an isocyanate group, or a Michael acceptor group, and z is an integer from 3 to 6, such as 3, 4, 5, or 6. In polyfunctionalizing agents of Formula (1), each —V can have the structure, for example, —R—SH or —R—CH=$CH_2$, where R can be, for example, $C_{2-10}$ alkanediyl, $C_{2-10}$ heteroalkanediyl, substituted $C_{2-10}$ alkanediyl, or substituted $C_{2-10}$ heteroalkanediyl.

When the moiety V is reacted with another compound the moiety —$V^1$— results and is said to be derived from the reaction with the other compound. For example, when V is —R—CH=$CH_2$ and is reacted, for example, with a thiol group, the moiety $V^1$ is —R—$CH_2$—$CH_2$— is derived from the reaction.

In polyfunctionalizing agents of Formula (1), B can be, for example $C_{2-8}$ alkane-triyl, $C_{2-8}$ heteroalkane-triyl, $C_{5-8}$ cycloalkane-triyl, $C_{5-8}$ heterocycloalkane-triyl, substituted $C_{5-8}$ cycloalkene-triyl, $C_{5-8}$ heterocycloalkane-triyl, $C_6$ arene-triyl, $C_{4-5}$ heteroarene-triyl, substituted $C_6$ arene-triyl, or substituted $C_{4-5}$ heteroarene-triyl.

In polyfunctionalizing agents of Formula (1), B can be, for example, $C_{2-8}$ alkane-tetrayl, $C_{2-8}$ heteroalkane-tetrayl, $C_{5-10}$ cycloalkane-tetrayl, $C_{5-10}$ heterocycloalkane-tetrayl, $C_{6-10}$ arene-tetrayl, $C_4$ heteroarene-tetrayl, substituted $C_{2-8}$ alkane-tetrayl, substituted $C_{2-8}$ heteroalkane-tetrayl, substituted $C_{5-10}$ cycloalkane-tetrayl, substituted $C_{5-10}$ heterocycloalkane-tetrayl, substituted $C_{6-10}$ arene-tetrayl, and substituted $C_{4-10}$ heteroarene-tetrayl.

Examples of suitable alkenyl-terminated polyfunctionalizing agents include triallyl cyanurate (TAC), triallylisocyanurate (TAIC), 1,3,5-triallyl-1,3,5-triazinane-2,4,6-trione1, 3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

A polyfunctionalizing agent of Formula (1) can be thiol terminated.

Examples of suitable trifunctional thiol-terminated polyfunctionalizing agents include, for example, 1,2,3-propanetrithiol, 1,2,3-benzenetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472.

Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercapto-propionyloxy)ethyl]isocyanurate (TEMPIC), dipentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable mercapto-acetate polythiol polyfunctionalizing agents include pentaerythritol tetramercaptoacetate (PRTMA), trimethylolpropane trimercaptoacetate (TMPMA), glycol dimercaptoacetate (GDMA), ethyleneglycol dimercaptoacetate, di-trimethylolpropane tetramercaptoacetate, and combinations of any of the foregoing.

Examples of suitable polythiol polyfunctionalizing agents include, tris[2-(3-mercaptopropionyloxy)ethyl]isocyanurate, 2,3-di(2-mercaptoethylthio)-1-propane-thiol, dimercaptodiethylsulfide (2,2'-thiodiethanethiol), 1,8-dimercapto-3,6-dioxaoctane, and combinations of any of the foregoing.

Other examples of polythiol polyfunctionalizing agents and polythiol monomers include pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, and also alkoxylated, for example, ethoxylated and/or propoxylated, such as ethoxylated, products of these compounds. Examples include, pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra (3-mercaptopropionate), ditrimethylolpropane tetramercaptoacetate, particularly pentaerythritol tetra(3-mercaptopropionate) (PETMP), pentaerythritol tetramercaptoacetate (PETMA), dipentaerythritol hexa(3-mercaptopropionate), dipentaerythritol hexamercaptoacetate, ditrimethylolpropane tetra(3-mercaptopropionate), and ditrimethylolpropane tetramercaptoacetate.

Suitable polythiol polyfunctionalizing agents are commercially available, for example, from Bruno Bock Thiochemicals under the Thiocure® tradename.

"Derived from a polyfunctionalizing agent" refers to a moiety that results from the reaction of a polyfunctionalizing agent with a reactive functional group. For example, a moiety derived from the polyfunctionalizing agent triallyl cyanurate of Formula (2a):

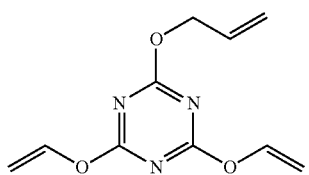

results in a moiety having the structure of Formula (2b):

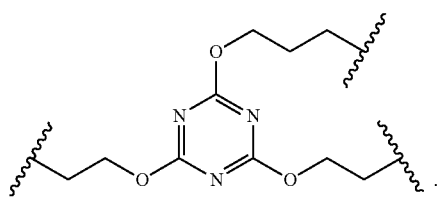

where the segments are bonded to the other reactants.

"Polythiol polyfunctionalizing agent" refers to a polythiol having, for example, from 3 to 6 terminal thiol groups. A polythiol polyfunctionalizing agent can have a molecular weight, for example, less than 1,400 Da, less than 1,200 Da, less than 1,000 Da, less than 800 Da, less than 700 Da, less than 600 Da, less than 500 Da, less than 400 Da, less than 300 Da, less than 200 Da, or less than 100 Da. Polythiol polyfunctionalizing agents can be represented by the formula B(—V)$_z$, where B$^4$ represents a core of a z-valent polyfunctionalizing agent B(—V)$_z$, z is an integer from 3 to 6; and each —V is a moiety comprising a terminal thiol (—SH) group.

A polythiol or a polyalkenyl can be a polythiol polyfunctionalizing agent or a polyalkenyl polyfunctionalizing agent, respectively.

"Composition" is intended to encompass a product comprising the specified components in the specified amounts, as well as any product which results, directly or indirectly, from the combination of the specified ingredients in the specified amounts.

"Average molecular weight" refers to number average molecular weight. Number average molecular weight can be determined by gel permeation chromatography using a polystyrene standard, or for thiol-terminated prepolymers, can be determined using iodine titration.

"Application time" refers to the duration during which a curable composition can be applied to a surface. The application time can be for example, at least 2 hours, at least 4 hours, at least 6 hours, at least 12 hours, at least 16 hours, at least 20 hours, or at least 24 hours. The application time can depend on the method of application such as, for example, by extrusion, rolling, brushing, or spreading. The application time of a curable composition can be determined by measuring the extrusion rate of a composition. For example, the application time of a curable composition provided by the present disclosure can be defined as the duration until the curable composition exhibits an extrusion rate, as determined by extrusion through a No. 440 nozzle (Semco®, 0.125-inch internal diameter and 4-inch length, available from PPG Aerospace) at a pressure of 90 psi (620 KPa), is greater than 15 g/min, greater than 30 g/min, or greater than 50 g/min. An appropriate application time can depend, for example, on the specific application method, temperature, humidity, thickness, surface area, and volume.

"Tack free time" refers to the duration from the time when co-reactive components are first combined and mixed to form a curable sealant until a coating prepared from the curable sealant exhibits is tack free as determined by applying a polyethylene sheet to the surface of the sealant with hand pressure and observing whether sealant adheres to the surface of the polyethylene sheet.

"Full cure" refers to the duration from the time when co-reactive components are first combined and mixed to form a curable sealant until a coating prepared from the curable sealant exhibits a hardness of at least Shore 40 A at 25° C. and 50% RH. A time to full cure can be, for example, from 1 week to 2 weeks, from 1 week to 6 weeks, from 2 weeks to 5 weeks, or from 3 weeks to 5 weeks.

"Cure time" refers to the duration from the time when co-reactive components are first combined and mixed to form a curable sealant until a coating prepared from the curable sealant exhibits a hardness of Shore 30 A at conditions of 25° C. and 50% RH.

Specific gravity is determined according to ASTM D1475.

Shore A hardness is measured using a Type A durometer in accordance with ASTM D2240.

Tensile strength and elongation are measured according to AMS 3279.

A "core" of a compound or a polymer refers to the segment between the reactive terminal groups. For example, the core of a polythiol HS—R—SH will be —R—. A core of a compound or prepolymer can also be referred to as a backbone of a compound or a backbone of a prepolymer.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

As illustrated in FIG. 1, unmodified UV-curable compositions based on thiol-ene chemistry react by generation of free radicals when exposed to light in the presence of a photoinitiator (I). An unmodified UV-curable composition refers to a UV-curable composition that does not include an organoborane complex and a radical oxidizing agent. The free radical generated by the photoinitiator abstracts the hydrogen from a thiol group creating a thienyl radical that can add to an alkylene group, creating a sulfur-carbon bond and a β-carbon radical, which accepts a hydrogen from a thiol group to complete the addition across the double bond.

Under dark cure conditions, i.e., when actinic radiation such as UV radiation is not used to generate free radicals and/or in the absence of ambient lighting, the disclosure provides an alternate radical initiation mechanism that takes place in the absence of light.

Tialkylborane complexes can be used to generate free radicals under dark cure conditions. The general process is summarized in FIG. 2. A blocked trialkylborane B(—R)$_3$(-L) where each R is an alkyl such as a $C_{1-8}$ alkyl, and L is a ligand can be deblocked to form a trialkylborane B(—R)$_3$. The deblocking can take place in the presence of an acid and/or a co-catalyst. At room temperature (25° C.) the un-blocked trialkyl borane can oxidize in the presence of atmospheric $O_2$ to form the peroxide $R_2B$—O—O—R, which upon fragmentation provides several radicals including the borinate radical $B(R)_2O*$, an alkyl radical $R*$, a peroxy radical R—O—O*, and an alkoxy radial R—O*, in increasing order of reactivity. Reaction of the trialkyl borane with oxygen is necessary to generate the free radical. Thus, when used as the only radical catalyst in a sealant system the depth of cure will be limited by the diffusion of atmospheric oxygen from the surface.

Figure 2:
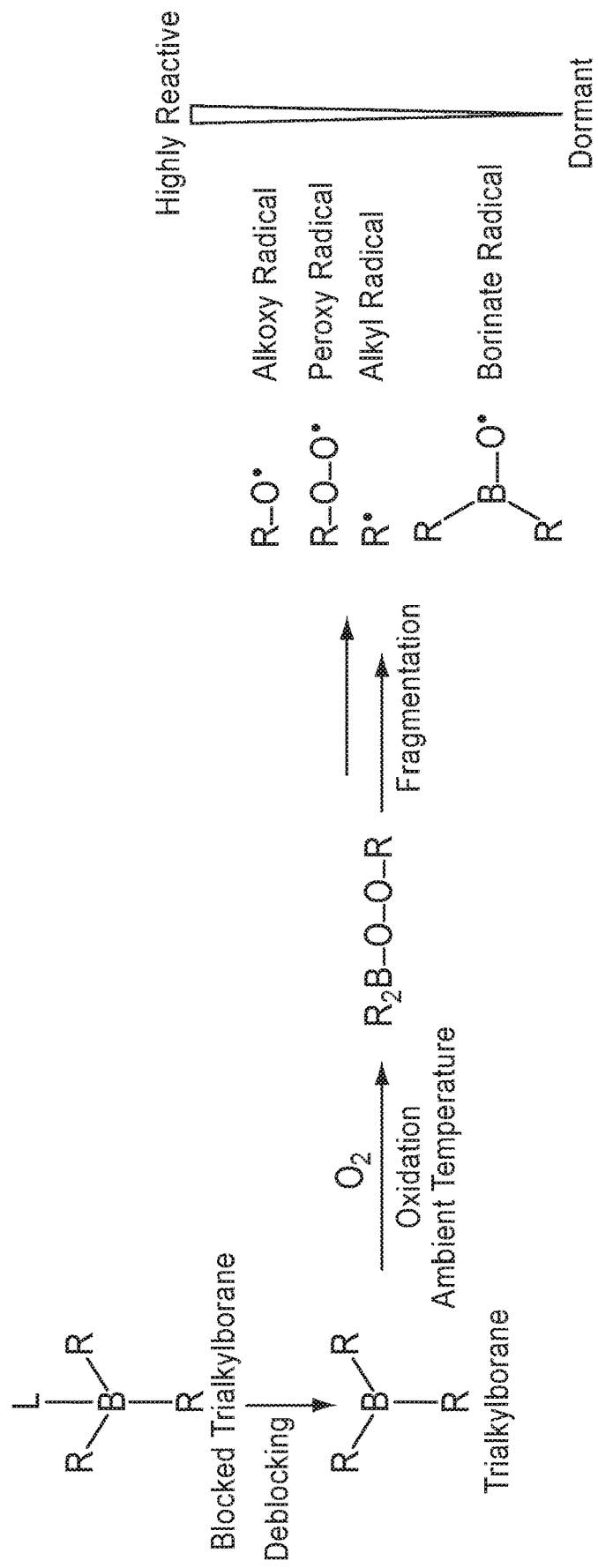
FIG. 2 illustrates the decomposition of a trialkyl borane complex, tri-n-butylborane-3-methoxypropylamine (TnBB-MOPA), in the presence of a co-catalyst, tetrabutylammonium persulfate (TBAPS), to generate organic radicals.

In the disclosed dark cure mechanism, the thiol-ene polymerization proceeds through a controlled generation of free radicals using a combination of an organoborane complex and a radical oxidizing agent in the absence of light. FIG. 2 illustrates the decomposition of a trialkyl borane complex tri-n-butylborane-3-methoxypropylamine (TnBB-MOPA), in the presence of a co-catalyst tetrabutylammonium persulfate (TBAPS) to generate free radicals.

After the radicals are generated as shown in FIG. 1, the thiol-ene polymerization can continue in the manner as shown in FIG. 2. The use of organoborane complexes in combination with a dark cure co-catalyst can provide cured sealant compositions with properties similar to those of UV-cured sealant compositions.

To extend the generation of free radicals using trialkyl boranes a co-catalyst can be used to provide a source of oxygen. The co-catalyst should provide a source of oxygen radicals at room temperature and suitable illumination conditions and be able to deblock the ligand from the borane complex under dark conditions.

Compositions provided by the present disclosure can comprise a polythiol, a polyalkenyl, an organoborane complex; and a radical oxidizing agent.

Compositions and sealant formulations provided by the present disclosure can comprise a polythiol or combination of polythiols. A polythiol can be a polythiol prepolymer, a small molecule polythiol, a thiol-terminated polyfunctionalizing agent, or a combination of any of the foregoing.

A polythiol prepolymer can comprise any suitable thiol-terminated prepolymer.

A polythiol prepolymer can comprise a thiol-terminated sulfur-containing prepolymer.

Compositions and sealant formulations provided by the present disclosure can comprise a thiol-terminated sulfur-containing prepolymer such as a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing. In the context of the present disclosure, a sulfur-containing prepolymer refers to a prepolymer that has one or more thioether —$S_n$— groups, where n can be, for example, 1 to 6, in the backbone of the prepolymer. Prepolymers that contain only thiol or other sulfur-containing groups either as terminal groups or as pendent groups of the prepolymer are not encompassed by sulfur-containing prepolymers. The prepolymer backbone refers to the portion of the prepolymer having repeating segments. Thus, a prepolymer having the structure HS—R—R(—$CH_2$—SH)—[—R—($CH_2$)$_2$—S(O)$_2$—($CH_2$)—S(O)$_2$]$_n$—CH=$CH_2$ where each R is a moiety that does not contain a sulfur atom, is not encompassed by a sulfur-containing prepolymer. A prepolymer having the structure HS—R—R(—$CH_2$—SH)—[—R—($CH_2$)$_2$—S(O)$_2$—($CH_2$)—S(O)$_2$]—CH=$CH_2$ where at least one R is a moiety that contains a sulfur atom, such as a thioether group, is encompassed by a sulfur-containing prepolymer.

A thiol-terminated sulfur-containing prepolymer can comprise a thiol-terminated sulfur-containing prepolymer or a combination of thiol-terminated sulfur-containing prepolymers. The thiol-terminated sulfur-containing prepolymers may have the same or different functionality. A thiol-terminated sulfur-containing prepolymer can have an average functionality, for example, from 2 to 6, from 2 to 4, from 2 to 3, from 2.3 to 2.8, or from 2.05 to 2.5. For example, a thiol-terminated sulfur-containing prepolymer can comprise a difunctional thiol-terminated sulfur-containing prepolymer, a trifunctional thiol-terminated sulfur-containing prepolymer, or a combination thereof.

Compositions and sealants provided by the present disclosure can comprise, for example, from 40 wt % to 80 wt %, from 40 wt % to 75 wt %, from 45 wt % to 70 wt %, or from 50 wt % to 70 wt % of a thiol-terminated sulfur-containing prepolymer or combination of thiol-terminated sulfur-containing prepolymers, such as a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing, where wt % is based on the total weight of the composition.

A sulfur-containing prepolymer can comprise a thiol-terminated polythioether prepolymer or combinations of thiol-terminated polythioether prepolymers. Examples of suitable thiol-terminated polythioether prepolymers are disclosed, for example, in U.S. Pat. No. 6,172,179, which is incorporated by reference in its entirety. A thiol-terminated polythioether prepolymer can comprise Permapol® P3.1E, Permapol® P3.1E-2.8, Permapol® L56086, or a combination of any of the foregoing, each of which is available from PPG Aerospace. These Permapol® products are encompassed by the thiol-terminated polythioether prepolymers of Formula (3)-(3c). Thiol-terminated polythioethers include prepolymers described in U.S. Pat. No. 7,390,859 and urethane-containing polythiols described in U.S. Application Publication Nos. 2017/0369757 and 2016/0090507.

A thiol-terminated polythioether prepolymer can comprise a thiol-terminated polythioether prepolymer comprising at least one moiety having the structure of Formula (3):

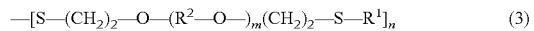

—[S—($CH_2$)$_2$—O—($R^2$—O—)$_m$($CH_2$)$_2$—S—$R^1$]$_n$—     (3)

where,
each $R^1$ can independently be selected from $C_{2-10}$ n-alkanediyl, $C_{3-6}$ branched alkanediyl, $C_{6-8}$ cycloalkanediyl, $C_{6-10}$ alkanecycloalkanediyl, and —[(CHR$^3$)$_p$—X—]$_q$(CHR$^3$)$_r$—, wherein each $R^3$ can be selected from hydrogen and methyl;
each $R^2$ can independently be selected from $C_{2-10}$ n-alkanediyl, $C_{3-6}$ branched alkanediyl, $C_{6-8}$ cycloalkanediyl, $C_{6-14}$ alkanecycloalkanediyl, and —[($CH_2$)$_p$—X—]$_q$($CH_2$)$_r$—;
each X can independently be selected from O, S, and NR, wherein R can be selected from hydrogen and methyl;
m ranges from 0 to 50;
n can be an integer ranging from 1 to 60;
p can be an integer ranging from 2 to 6;
q can be an integer ranging from 1 to 5; and
r can be an integer ranging from 2 to 10.

In moieties of Formula (3), $R^1$ can be —[(CHR$^3$)$_p$—X—]$_q$(CHR$^3$)$_r$— wherein each X can independently be selected from O and S.

In moieties of Formula (3), $R^1$ can be —[(CHR$^3$)$_p$—X—]$_q$(CHR$^3$)$_r$—, each X can be O or each X can be S.

In moieties of Formula (3), $R^1$ can be —$[(CH_2)_p$—X—$]_q(CH_2)_r$—, where p can be 2, X can be O, q can be 2, r can be 2, $R^2$ can be ethanediyl, m can be 2, and n can be 9.

In moieties of Formula (3), each $R^1$ can be derived from 1,8-dimercapto-3,6-dioxaoctane (DMDO), each $R^1$ can be derived from dimercaptodiethylsulfide (DMDS), or a combination thereof.

In moieties of Formula (3), each m can independently be an integer from 1 to 3. Each m can be the same and can be 1, 2, or 3.

In moieties of Formula (3), n can be an integer from 1 to 30, an integer from 1 to 20, an integer from 1 to 10, or an integer from 1 to 5. In addition, n may be any integer from 1 to 60.

In moieties of Formula (3), each p can independently be 2, 3, 4, 5, and 6. Each p can be the same and can be 2, 3, 4, 5, or 6.

In moieties of Formula (3), each q can independently be 1, 2, 3, 4, or 5. Each q can be the same and can be 1, 2, 3, 4, or 5.

In moieties of Formula (3), each r can independently be 2, 3, 4, 5, 6, 7, 8, 9, or 10.

In moieties of Formula (3), each r can be the same and can be 2, 3, 4, 5, 6, 7, 8, 9, or 10.

In moieties of Formula (3), each r can independently be an integer from 2 to 4, from 2 to 6, or from 2 to 8.

In moieties of Formula (3), each $R^2$ can independently be selected from a $C_{2-10}$ n-alkanediyl group, a $C_{3-6}$ branched alkanediyl group, and a —$[(CH_2)_p$—X—$]_q(CH_2)_r$— group.

In moieties of Formula (3), each $R^2$ can independently be a $C_{2-10}$ n-alkanediyl group.

In moieties of Formula (3), each $R^2$ can independently comprise a —$[(CH_2)_p$—X—$]_q(CH_2)_r$— group, where each X can be O or S.

Thiol-terminated sulfur-containing prepolymer of Formula (3) can comprise a thiol-terminated polythioether prepolymer or combination of thiol-terminated polythioether prepolymers, where E comprises the backbone of a polythioether prepolymer.

A thiol-terminated polythioether prepolymer can have the structure of Formula (4):

HS-(E-SH)$_w$—SH    (4)

wherein, each E can comprise a moiety having the structure of Formula (5):

—S—$R^1$—[S-A-S—$R^1$—]$_n$—S—    (5)

wherein,
n can be an integer from 1 to 60;
each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and —$[(CHR^3)_p$—X—$]_q(CHR^3)_r$—, where,
p can be an integer from 2 to 6;
q can be an integer from 1 to 5;
r can be an integer from 2 to 10;
each $R^3$ can independently be selected from hydrogen and methyl; and
each X can independently be selected from O, S, S—S, and NR, wherein R can be selected from hydrogen and methyl; and
each A can independently be a moiety derived from a polyvinyl ether of Formula (6) and a polyalkenyl polyfunctionalizing agent of Formula (7):

  (6)

  (7)

wherein,
m can be an integer from 0 to 50;
each $R^2$ can independently be selected from $C_{1-10}$ alkanediyl, $C_{6-8}$ cycloalkanediyl, $C_{6-14}$ alkanecycloalkanediyl, and —$[(CHR^3)_p$—X—$]_q(CHR^3)_r$—, wherein p, q, r, $R^3$, and X are as defined as for $R^1$;
B represents a core of a z-valent, polyalkenyl polyfunctionalizing agent B(—$R^{70}$—CH=$CH_2$)$_z$ wherein,
z can be an integer from 3 to 6; and
each $R^{70}$ can independently be selected from $C_{1-10}$ alkanediyl, $C_{1-10}$ heteroalkanediyl, substituted $C_{1-10}$ alkanediyl, and substituted $C_{1-10}$ heteroalkanediyl.

In moieties of Formula (5), $R^1$ can be $C_{2-10}$ alkanediyl.

In moieties of Formula (5), $R^1$ can be —$[(CHR^3)_p$—X—$]_q(CHR^3)_r$—.

In moieties of Formula (5), X can be selected from O and S, and thus —$[(CHR^3)_p$—X—$]_q(CHR^3)_r$— in Formula (5) can be —$[(CHR^3)_p$—O—$]_q(CHR^3)_r$— or —$[(CHR^3)_p$—S—$]_q(CHR^3)_r$—. P and r can be equal, such as where p and r can both be two.

In moieties of Formula (5), $R^1$ can be selected from $C_{2-6}$ alkanediyl and —$[(CHR^3)_p$—X—$]_q(CHR^3)_r$—.

In moieties of Formula (5), $R^1$ can be —$[(CHR^3)_p$—X—$]_q(CHR^3)_r$—, and X can be O, or X can be S.

In moieties of Formula (5) where $R^1$ can be —$[(CHR^3)_p$—X—$]_q(CHR^3)_r$—, p can be 2, r can be 2, q can be 1, and X can be S; or p can be 2, q can be 2, r can be 2, and X can be O; or p can be 2, r can be 2, q can be 1, and X can be O.

In moieties of Formula (5) where $R^1$ can be —$[(CHR^3)_p$—X—$]_q(CHR^3)_r$—, each $R^3$ can be hydrogen, or at least one $R^3$ can be methyl.

In moieties of Formula (5), $R^1$ can be —$[(CH_2)_p$—X—$]_q(CH_2)_r$— wherein each X can independently be selected from O and S. In polythioethers of Formula (5), $R^1$ can be —$[(CH_2)_p$—X—$]_q(CH_2)_r$— each X can be O or each X can be S.

In moieties of Formula (5), $R^1$ can be —$[(CH_2)_p$—X—$]_q(CH_2)_r$—, where p can be 2, X can be O, q can be 2, r can be 2, $R^2$ can be ethanediyl, m can be 2, and n can be 9.

In moieties of Formula (5), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis (ethan-1-thiol)), and combinations thereof.

In moieties of Formula (5), each p can independently be selected from 2, 3, 4, 5, and 6. Each p can be the same and can be 2, 3, 4, 5, or 6.

In moieties of Formula (5) each q can independently be 1, 2, 3, 4, or 5. Each q can be the same and can be 1, 2, 3, 4, or 5.

In moieties of Formula (5), each r can independently be 2, 3, 4, 5, 6, 7, 8, 9, or 10. Each r can be the same and can be 2, 3, 4, 5, 6, 7, 8, 9, or 10.

In moieties of Formula (5), each r can independently be an integer from 2 to 4, from 2 to 6, or from 2 to 8.

In moieties of Formula (5), each A can be derived from a polyvinyl ether such as a divinyl ether. A divinyl ether can comprise a divinyl ether having the structure of Formula (6).

In divinyl ethers of Formula (6), m can be an integer from 0 to 50, such as from 0 to 40, from 0 to 20, from 0 to 10, from 1 to 50, from 1 to 40, from 1 to 20, from 1 to 10, from 2 to 50, from 2 to 40, from 2 to 20, or from 2 to 10.

In divinyl ethers of Formula (6), each $R^2$ can independently be selected from a $C_{2-10}$ n-alkanediyl group, a $C_{3-6}$ branched alkanediyl group, and a —$[(CH_2)_p$—X—$]_q(CH_2)_r$— group.

In divinyl ethers of Formula (6), each $R^2$ can independently be a $C_{2-10}$ n-alkanediyl group, such as methanediyl, ethanediyl, n-propanediyl, or n-butanediyl.

In divinyl ethers of Formula (6), each $R^2$ can independently comprise a $-[(CH_2)_p-X-]_q(CH_2)_r-$ group, where each X can be O or S.

In divinyl ethers of Formula (6), each $R^2$ can independently comprise a $-[(CH_2)_p-X-]_q(CH_2)_r-$ group, In divinyl ethers of Formula (6), each m can be independently an integer from 1 to 3. Each m can be the same and can be 1, 2, or 3.

In divinyl ethers of Formula (6), each $R^2$ can independently be selected from a $C_{2-10}$ n-alkanediyl group, a $C_{3-6}$ branched alkanediyl group, and a $-[(CH_2)_p-X-]_q(CH_2)_r-$ group.

In divinyl ethers of Formula (6), each $R^2$ can independently be a $C_{2-10}$ n-alkanediyl group.

In divinyl ethers of Formula (6), each $R^2$ can independently be a $-[(CH_2)_p-X-]_q(CH_2)_r-$ group, where each X can be O or S.

In divinyl ethers of Formula (6), each $R^2$ can independently be a $-[(CH_2)_p-X-]_q(CH_2)_r-$ group, where each X can be O or S, and each p can independently be 2, 3, 4, 5, and 6.

In divinyl ethers of Formula (6), each p can be the same and can be 2, 3, 4, 5, or 6.

In divinyl ethers of Formula (6), each $R^2$ can independently be a $-[(CH_2)_p-X-]_q(CH_2)_r-$ group, where each X can be O or S, and each q can independently be 1, 2, 3, 4, or 5.

In divinyl ethers of Formula (6), each q can be the same and can be 1, 2, 3, 4, or 5.

In divinyl ethers of Formula (6), each $R^2$ can independently be a $-[(CH_2)_p-X-]_q(CH_2)_r-$ group, where each X can be O or S, and each r can independently be 2, 3, 4, 5, 6, 7, 8, 9, or 10.

In divinyl ethers of Formula (6), each r can be the same and can be 2, 3, 4, 5, 6, 7, 8, 9, or 10. In divinyl ethers of Formula (6), each r can independently be an integer from 2 to 4, from 2 to 6, or from 2 to 8.

Examples of suitable divinyl ethers include ethylene glycol divinyl ether (EG-DVE) butanediol divinyl ether (BD-DVE) hexanediol divinyl ether (HD-DVE), diethylene glycol divinyl ether (DEG-DVE), triethylene glycol divinyl ether, tetraethylene glycol divinyl ether, polytetrahydrofuryl divinyl ether, cyclohexane dimethanol divinyl ether, and combinations of any of the foregoing.

A divinyl ether can comprise a sulfur-containing divinyl ether. Examples of suitable sulfur-containing divinyl ethers are disclosed, for example, in PCT Publication No. WO 2018/085650, which is incorporated by reference in its entirety.

In moieties of Formula (5) each A can independently be derived from a polyalkenyl polyfunctionalizing agent. A polyalkenyl polyfunctionalizing agent can have the structure of Formula (7), where z can be 3, 4, 5, or 6.

In polyalkenyl polyfunctionalizing agents of Formula (7), each $R^{70}$ can independently be selected from $C_{1-10}$ alkanediyl, $C_{1-10}$ heteroalkanediyl, substituted $C_{1-10}$ alkanediyl, or substituted $C_{1-10}$ heteroalkanediyl. The one or more substituent groups can be selected from, for example, $-OH$, $=O$, $C_{1-4}$ alkyl, and $C_{1-4}$ alkoxy. The one or more heteroatoms can be selected from, for example, O, S, and a combination thereof.

Examples of suitable polyalkenyl polyfunctionalizing agents include triallyl cyanurate (TAC), triallylisocyanurate (TAIC), 1,3,5-triallyl-1,3,5-triazinane-2,4,6-trione), 1,3-bis (2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris (prop-2-enyl)-1,3,5-triazinane-2,4-dione, and 1,3,5-tris(2-methylallyl)-1,3,5-triazinane-2,4,6-trione, 1,2,4-trivinylcyclohexane, trimethylolpropane trivinyl ether, and combinations of any of the foregoing.

In moieties of Formula (5) the molar ratio of vinyl ether moieties derived from a divinyl ether to alkenyl moieties derived from a polyalkenyl polyfunctionalizing agent can be, for example, from 10:1 to 1,000:1, from 10:1 to 100:1, or from 20:1 to 100:1.

In moieties of Formula (5), each $R^1$ can be $-(CH_2)_2-O-(CH_2)_2-O-(CH_2)_2-$; each $R^2$ can be $-(CH_2)_2-$; and m can be an integer from 1 to 4.

In moieties of Formula (5), $R^2$ can be derived from a divinyl ether such a diethylene glycol divinyl ether, a polyalkenyl polyfunctionalizing agent such as triallyl cyanurate, or a combination thereof.

In moieties of Formula (5), each A can independently be selected from a moiety of Formula (6a) and a moiety of Formula (7a):

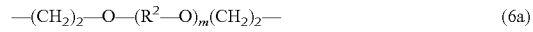

$-(CH_2)_2-O-(R^2-O)_m(CH_2)_2-$ (6a)

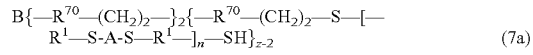

$B\{-R^{70}-(CH_2)_2-\}_z\{-R^{70}-(CH_2)_2-S-[-R^1-S-A-S-R^1-]_n-SH\}_{z-2}$ (7a)

where m, $R^1$, $R^2$, $R^{70}$, A, B, m, n, and z are defined as in Formula (5), Formula (6), and Formula (7).

In moieties of Formula (5),
each $R^1$ can be $-(CH_2)_2-O-(CH_2)_2-O-(CH_2)_2-$;
each $R^2$ can be $-(CH_2)_2-$;
m can be an integer from 1 to 4; and
the polyfunctionalizing agent $B(-R^{70}-CH=CH_2)_z$ comprises triallyl cyanurate where z is 3 and each $R^{70}$ is $-O-CH_2-CH=CH_2$.

A thiol-terminated polythioether prepolymer can have the structure of Formula (5a):

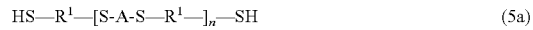

$HS-R^1-[S-A-S-R^1-]_n-SH$ (5a)

wherein,
n can be an integer from 1 to 60;
each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$, wherein,
p can be an integer from 2 to 6;
q can be an integer from 1 to 5;
r can be an integer from 2 to 10;
each $R^3$ can independently be selected from hydrogen and methyl; and
each X can independently be selected from O, S, and NR, wherein R can be selected from hydrogen and methyl; and
each A can independently be selected from a moiety derived from a polyvinyl ether of Formula (6) and a moiety derived from a polyalkenyl polyfunctionalizing agent of Formula (7):

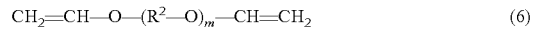

$CH_2=CH-O-(R^2-O)_m-CH=CH_2$ (6)

$B(-R^{70}-CH=CH_2)_z$ (7)

wherein,
each $R^2$ can independently be selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein, p, q, r, $R^3$, and X are as defined as for $R^1$;

m can be an integer from 0 to 50;

B represents a core of a z-valent, polyalkenyl polyfunctionalizing agent $B(-R^{70}-CH=CH_2)_z$ wherein, z can be an integer from 3 to 6; and each $R^{70}$ can independently be selected from $C_{1-10}$ alkanediyl, $C_{1-10}$ heteroalkanediyl, substituted $C_{1-10}$ alkanediyl, and substituted $C_{1-10}$ heteroalkanediyl.

In thiol-terminated polythioether prepolymers of Formula (5a), $R^1$ can be $C_{2-10}$ alkanediyl.

In thiol-terminated polythioether prepolymers of Formula (5a), $R^1$ can be $-[(CHR^3)_p-X-]_q(CHR^3)_r-$.

In thiol-terminated polythioether prepolymers of Formula (5a), X can be selected from O and S, and thus $-[(CHR^3)_p-X-]_q(CHR^3)_r-$ in Formula (5a) can be $-[(CHR^3)_p-O-]_q(CHR^3)_r-$ or $-[(CHR^3)_p-S-]_q(CHR^3)_r-$. P and r can be equal, such as where p and r can be both two.

In thiol-terminated polythioether prepolymers of Formula (5a), $R^1$ can be selected from $C_{2-6}$ alkanediyl and $-[(CHR^3)_p-X-]_q(CHR^3)_r-$.

In thiol-terminated polythioether prepolymers of Formula (5a), $R^1$ can be $-[(CHR^3)_p-X-]_q(CHR^3)_r-$, and X can be O, or X can be S.

In thiol-terminated polythioether prepolymers of Formula (5a), where $R^1$ can be $-[(CHR^3)_p-X-]_q(CHR^3)_r-$, p can be 2, r can be 2, q can be 1, and X can be S; or p can be 2, q can be 2, r can be 2, and X can be O; or p can be 2, r can be 2, g can be 1, and X can be O.

In thiol-terminated polythioether prepolymers of Formula (5a), where $R^1$ can be $-[(CHR^3)_p-X-]_q(CHR^3)_r-$, each $R^3$ can be hydrogen, or at least one $R^3$ can be methyl.

In thiol-terminated polythioether prepolymers of Formula (5a), $R^1$ can be $-[(CH_2)_p-X-]_q(CH_2)_r-$ wherein each X can independently be selected from O and S. In thiol-terminated polythioethers of Formula (5a), $R^1$ can be $-[(CH_2)_p-X-]_q(CH_2)_r-$ each X can be O or each X can be S.

In thiol-terminated polythioether prepolymers of Formula (5a), $R^1$ can be $-[(CH_2)_p-X-]_q(CH_2)_r-$, where p can be 2, X can be O, q can be 2, r can be 2, $R^2$ can be ethanediyl, m can be 2, and n can be 9.

In thiol-terminated polythioether prepolymers of Formula (5a), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis(ethan-1-thiol)), and combinations thereof.

In thiol-terminated polythioether prepolymers of Formula (5a), each p can independently be selected from 2, 3, 4, 5, and 6. Each p can be the same and can be 2, 3, 4, 5, or 6.

In thiol-terminated polythioether prepolymers of Formula (5a), each q can independently be 1, 2, 3, 4, or 5. Each q can be the same and can be 1, 2, 3, 4, or 5.

In thiol-terminated polythioether prepolymers of Formula (5a), each r can independently be 2, 3, 4, 5, 6, 7, 8, 9, or 10. Each r can be the same and can be 2, 3, 4, 5, 6, 7, 8, 9, or 10.

In thiol-terminated polythioether prepolymers of Formula (5a), each r can independently be an integer from 2 to 4, from 2 to 6, or from 2 to 8.

In thiol-terminated polythioether prepolymers of Formula (5a), each A can independently be selected from a moiety of Formula (6a) and a moiety of Formula (7a):

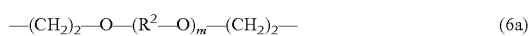

$-(CH_2)_2-O-(R^2-O)_m-(CH_2)_2-$ (6a)

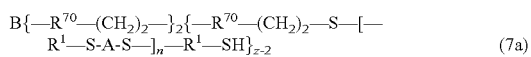

$B\{-R^{70}-(CH_2)_2-\}_2\{-R^{70}-(CH_2)_2-S-[-R^1-S-A-S-]_n-R^1-SH\}_{z-2}$ (7a)

where m, $R^1$, $R^2$, $R^{70}$, A, B, m, n, and z are defined as in Formula (5), Formula (6), and Formula (7).

In thiol-terminated polythioether prepolymers of Formula (5a) the molar ratio of moieties derived from a divinyl ether to moieties derived from a polyalkenyl polyfunctionalizing agent can be, for example, of 200:1, 150:1, 100:1, 50:1, or 25:1.

A thiol-terminated polythioether prepolymer can comprise a thiol-terminated polythioether prepolymer of Formula (3a), a thiol-terminated polythioether prepolymer of Formula (3b), a thiol-terminated polythioether prepolymer of Formula (3c), or a combination of any of the foregoing:

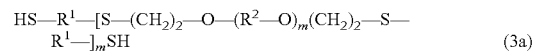

$HS-R^1-[S-(CH_2)_2-O-(R^2-O)_m(CH_2)_2-S-R^1-]_mSH$ (3a)

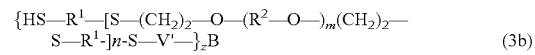

$\{HS-R^1-[S-(CH_2)_2-O-(R^2-O-)_m(CH_2)_2-S-R^1-]n-S-V'-\}_zB$ (3b)

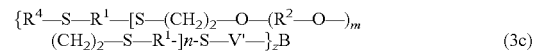

$\{R^4-S-R^1-[S-(CH_2)_2-O-(R^2-O-)_m(CH_2)_2-S-R^1-]n-S-V'-\}_zB$ (3c)

wherein, each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$, wherein, p can be an integer from 2 to 6;

q can be an integer from 1 to 5;

r can be an integer from 2 to 10;

each $R^3$ can independently be selected from hydrogen and methyl; and each X can independently be selected from O, S, and NR, wherein R can be selected from hydrogen and methyl;

each $R^2$ can independently be selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;

m can be an integer from 0 to 50;

n can be an integer from 1 to 60;

B represents a core of a z-valent, polyfunctionalizing agent $B(-V)_z$ wherein, z can be an integer from 3 to 6; and each V can be a moiety comprising a terminal group reactive with a thiol;

each $-V'-$ can be derived from the reaction of $-V$ with a thiol; and each $R^4$ can independently be selected from hydrogen and a moiety of Formula (3), which is bound to a prepolymer of Formula (3c).

In prepolymers of Formula (3a)-(3c), $R^1$ can be $-[(CH_2)_p-X-]_q(CH_2)_r-$, where p can be 2, X can be O, q can be 2, r can be 2, $R^2$ can be ethanediyl, m can be 2, and n can be 9.

In prepolymers of Formula (3a)-(3c), $R^1$ can be selected from $C_{2-6}$ alkanediyl and $-[(CHR^3)_p-X-]_q(CHR^3)_r-$.

In prepolymers of Formula (3a)-(3c), $R^1$ can be $-[(CHR^3)_p-X-]_q(CHR^3)_r-$, X can be O or X can be S.

In prepolymers of Formula (3a)-(3c), where $R^1$ can be $-[(CHR^3)_p-X-]_q(CHR^3)_r-$, p can be 2, r can be 2, q can be 1, and X can be S; or wherein p can be 2, q can be 2, r can be 2, and X can be O; or p can be 2, r can be 2, q can be 1, and X can be O.

In prepolymers of Formula (3a)-(3c), $R^1$ can be $-[(CHR^3)_p-X-]_q(CHR^3)_r-$, and each $R^3$ can be hydrogen or at least one $R^3$ can be methyl.

In prepolymers of Formula (3a)-(3c), each $R^1$ can be the same, or at least one R1 can be different.

In prepolymers of Formula (3a)-(3c), each m can be independently an integer from 1 to 3. Each m can be the same and can be 1, 2, or 3.

In prepolymers of Formula (3a)-(3c), n can be an integer from 1 to 30, an integer from 1 to 20, an integer from 1 to 10, or an integer from 1 to 5. The variable n may be any integer from 1 to 60.

In prepolymers of Formula (3a)-(3c), each p can independently be 2, 3, 4, 5, and 6. Each p can be the same and can be 2, 3, 4, 5, or 6.

In prepolymers of Formula (3a)-(3c), each q can independently be 1, 2, 3, 4, or 5. Each q can be the same and can be 1, 2, 3, 4, or 5.

In prepolymers of Formula (3a)-(3c), each r can independently be 2, 3, 4, 5, 6, 7, 8, 9, or 10.

In prepolymers of Formula (3a)-(3c), each r can independently be an integer from 2 to 4, from 2 to 6, or from 2 to 8.

Various methods can be used to prepare thiol-terminated polythioether prepolymers of Formula (3a)-(3c). Examples of suitable thiol-terminated polythioether prepolymers, and methods for their production, are described in U.S. Pat. Nos. 6,172,179, 6,232,401, and 8,932,685. Such thiol-terminated polythioether prepolymers may be difunctional, that is, linear prepolymers having two terminal thiol groups, or can be polyfunctional, that is, branched prepolymers having three or more terminal thiol groups.

A thiol-terminated polythioether prepolymer may comprise a mixture of different thiol-terminated polythioether prepolymers and the thiol-terminated polythioether prepolymers may have the same or different functionality. A thiol-terminated polythioether prepolymer or combination of thiol-terminated polythioether prepolymers can have an average functionality, for example, from 2 to 6, from 2 to 4, from 2 to 3, from 2.05 to 2.8, or from 2.05 to 2.5. For example, a thiol-terminated polythioether prepolymer can comprise a difunctional thiol-terminated polythioether prepolymer, a trifunctional thiol-terminated polythioether prepolymer, or a combination thereof.

A thiol-terminated polythioether prepolymer can be prepared by reacting a polythiol and a diene such as a divinyl ether, and the respective amounts of the reactants used to prepare the polythioethers can be chosen to yield terminal thiol groups. Thus, in some cases, (n or >n, such as n+1) moles of a polythiol, such as a dithiol or a mixture of at least two different dithiols and 0.05 moles to 1 moles, such as from 0.1 moles to 0.8 moles, of a thiol-terminated polyfunctionalizing agent may be reacted with (n) moles of a diene, such as a divinyl ether, or a combination of at least two different dienes, such as a combination of two different divinyl ethers. A thiol-terminated polyfunctionalizing agent can be present in the reaction mixture in an amount sufficient to provide a thiol-terminated polythioether prepolymer having an average thiol functionality, for example, from 2.05 to 3, such as from 2.1 to 2.8, or from 2.1 to 2.6.

A reaction used to prepare a thiol-terminated polythioether prepolymer may be catalyzed by a free radical catalyst. Suitable free radical catalysts include azo compounds, for example, azobisnitrile compounds such as azo(bis)isobutyronitrile (AIBN); organic peroxides, such as benzoyl peroxide and tert-butyl peroxide; and inorganic peroxides, such as hydrogen peroxide. The reaction can also be accelerated by irradiation with ultraviolet light either with or without a radical initiator/photosensitizer. Ionic catalysis methods, using either inorganic or organic bases, e.g., triethylamine, may also be used.

Suitable thiol-terminated polythioether prepolymers may be produced by reacting a divinyl ether or combination of divinyl ethers with an excess of dithiol or combination of dithiols.

A thiol-terminated polythioether prepolymer can comprise the reaction product of reactants comprising:

(a) a dithiol of Formula (8):

$$HS—R^1—SH \qquad (8)$$

wherein,
$R^1$ can be selected from $C_{2-6}$ alkanediyl, $C_{6-8}$ cycloalkanediyl, $C_{6-10}$ alkanecycloalkanediyl, $C_{5-8}$ heterocycloalkanediyl, and $—[(CHR^3)_p—X—]_q(CHR^3)_r—$; wherein,
each $R^3$ can independently be selected from hydrogen and methyl;
each X can independently be selected from —O—, —S—, and —NR— wherein
R can be selected from hydrogen and methyl;
p can be an integer from 2 to 6;
q can be an integer from 1 to 5; and
r can be an integer from 2 to 10; and (b) a divinyl ether of Formula (6):

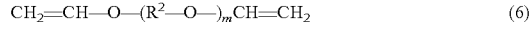

$$CH_2=CH—O—(R^2—O—)_mCH=CH_2 \qquad (6)$$

wherein,
each $R^2$ can independently be selected from $C_{1-10}$ alkanediyl, $C_{6-8}$ cycloalkanediyl, $C_{6-14}$ alkanecycloalkanediyl, and $—[(CHR^3)_p—X—]_q(CHR^3)_r—$, wherein p, q, r, $R^3$, and X are as defined above; and
m can be an integer from 0 to 50.

The reactants can further comprise (c) a polyfunctional compound such as a polyfunctional compound $B(—V)_z$, where B, —V, and z are as defined herein.

In dithiols of Formula (8), $R^1$ can be $—[(CHR^3)_p—X—]_q(CHR^3)_r—$.

In dithiols of Formula (8), X can be selected from O and S, and thus $—[(CHR^3)_p—X—]_q(CHR^3)_r—$ in Formula (8) can be $—[(CHR^3)_p—O—]_q(CHR^3)_r—$ or $—[(CHR^3)_p—S—]_q(CHR^3)_r—$. P and r can be equal, such as where p and r can be both two.

In dithiols of Formula (8), $R^1$ can be selected from $C_{2-6}$ alkanediyl and $—[(CHR^3)_p—X—]_q(CHR^3)_r—$.

In dithiols of Formula (8), $R^1$ can be $—[(CHR^3)_p—X—]_q(CHR^3)_r—$, and X can be O, or X can be S.

In dithiols of Formula (8) where $R^1$ can be $—[(CHR^3)_p—X—]_q(CHR^3)_r—$, p can be 2, r can be 2, q can be 1, and X can be S; or p can be 2, q can be 2, r can be 2, and X can be O; or p can be 2, r can be 2, q can be 1, and X can be O.

In dithiols of Formula (8) where $R^1$ can be $—[(CHR^3)_p—X—]_q(CHR^3)_r—$, each $R^3$ can be hydrogen, or at least one $R^3$ can be methyl.

In dithiols of Formula (8), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis(ethan-1-thiol)), and combinations thereof.

In dithiols of Formula (8), each p can independently be selected from 2, 3, 4, 5, and 6. Each p can be the same and can be 2, 3, 4, 5, or 6.

In dithiols of Formula (8) each q can independently be 1, 2, 3, 4, or 5. Each q can be the same and can be 1, 2, 3, 4, or 5.

In dithiols of Formula (8), each r can independently be 2, 3, 4, 5, 6, 7, 8, 9, or 10. Each r can be the same and can be 2, 3, 4, 5, 6, 7, 8, 9, or 10.

In dithiols of Formula (8), each r can independently be an integer from 2 to 4, from 2 to 6, or from 2 to 8.

In divinyl ethers of Formula (6), each m can be independently an integer from 1 to 3. Each m can be the same and can be can be 1, 2, or 3.

In divinyl ethers of Formula (6), each $R^2$ can independently be selected from a $C_{2-10}$ n-alkanediyl group, a $C_{3-6}$ branched alkanediyl group, and a $—[(CH_2)_p—X—]_q(CH_2)_r—$ group.

In divinyl ethers of Formula (6), each $R^2$ can independently be a $C_{2-10}$ n-alkanediyl group.

In divinyl ethers of Formula (6), each $R^2$ can independently be a $—[(CH_2)_p—X—]_q(CH_2)_r—$ group, where each X can be O or S.

In divinyl ethers of Formula (6), each $R^2$ can independently be a $—[(CH_2)_p—X—]_q(CH_2)_r—$ group, where each X can be O or S, and each p can independently be 2, 3, 4, 5, and 6.

In divinyl ethers of Formula (6), each p can be the same and can be 2, 3, 4, 5, or 6.

In divinyl ethers of Formula (6), each $R^2$ can independently be a $—[(CH_2)_p—X—]_q(CH_2)_r—$ group, where each X can be O or S, and each q can independently be 1, 2, 3, 4, or 5.

In divinyl ethers of Formula (6), each q can be the same and can be 1, 2, 3, 4, or 5.

In divinyl ethers of Formula (6), each $R^2$ can independently be a $—[(CH_2)_p—X—]_q(CH_2)_r—$ group, where each X can be O or S, and each r can independently be 2, 3, 4, 5, 6, 7, 8, 9, or 10.

In divinyl ethers of Formula (6), each r can be the same and can be 2, 3, 4, 5, 6, 7, 8, 9, or 10. In divinyl ethers of Formula (6), each r can independently be an integer from 2 to 4, from 2 to 6, or from 2 to 8.

Dithiols suitable for use in preparing thiol-terminated polythioether prepolymers include those having the structure of Formula (8):

$$HS—R^1—SH \qquad (8)$$

wherein, $R^1$ can be selected from $C_{2-6}$ alkanediyl, $C_{6-8}$ cycloalkanediyl, $C_{6-10}$ alkanecycloalkanediyl, $C_{5-8}$ heterocycloalkanediyl, and $—[(CHR^3)_p—X—]_q(CHR^3)_r—$; wherein, each $R^3$ can independently be selected from hydrogen and methyl; each X can independently be selected from O, S, and NR wherein R can be selected from hydrogen and methyl; p can be an integer from 2 to 6; q can be an integer from 1 to 5; and r can be an integer from 2 to 10.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

A dithiol may have one or more pendent groups comprising a lower (e.g., $C_{1-6}$) alkyl group, a lower alkoxy group, or a hydroxyl group. Suitable alkyl pendent groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (8), $R^1$ can be $—[(CH_2)_p—X—]_q(CH_2)_r—$, wherein p can be 2, r can be 2, q can be 1, and X can be S); dimercaptodioxaoctane (DMDO) (in Formula (8), $R^1$ can be $—[(CH_2)_p—X—]_q(CH_2)_r—$, wherein p can be 2, q can be 2, r can be 2, and X can be O); and 1,5-dimercapto-3-oxapentane (in Formula (8), $R^1$ can be $—[(CH_2)_p—X—]_q(CH_2)_r—$, wherein p can be 2, r can be 2, q can be 1, and X can be O). It is also possible to use dithiols that include both heteroatoms in the carbon backbone and pendent alkyl groups, such as methyl groups. Such dithiols include, for example, methyl-substituted DMDS, such as $HS—CH_2—CH(—CH_3)—S—CH_2—CH_2—SH$, $HS—CH(—CH_3)—CH_2—S—CH_2—CH_2—SH$ and dimethyl substituted DMDS, such as $HS—CH_2—CH(—CH_3)—S—CH(—CH_3)—CH_2—SH$ and $HS—CH(—CH_3)—CH_2—S—CH_2CH(—CH_3)—SH$.

Suitable divinyl ethers for preparing thiol-terminated polythioether prepolymers include, for example, divinyl ethers of Formula (6):

$$CH_2=CH—O—(R^2—O—)_mCH=CH_2 \qquad (6)$$

where each $R^2$ can independently be selected from $C_{1-10}$ alkanediyl, $C_{6-8}$ cycloalkanediyl, $C_{6-14}$ alkanecycloalkanediyl, and $—[(CHR^3)_p—X—]_q(CHR^3)_r—$, where each $R^3$ can independently be selected from hydrogen and methyl; each X can independently be selected from O, S, and NR wherein R can be selected from hydrogen and methyl; p can be an integer from 2 to 6; q can be an integer from 1 to 5; and r can be an integer from 2 to 10.

Suitable divinyl ethers include, for example, compounds having at least one oxyalkanediyl group $—R^2—O—$, such as from 1 to 4 oxyalkanediyl groups, i.e., compounds in which m in Formula (6) can be an integer ranging from 1 to 4. The variable m in Formula (6) can be an integer ranging from 2 to 4. It is also possible to employ commercially available divinyl ether mixtures that are characterized by a non-integral average value for the number of oxyalkanediyl units per molecule. Thus, m in Formula (6) can also be a rational number value ranging from 0 to 10.0, such as from 1.0 to 10.0, from 1.0 to 4.0, or from 2.0 to 4.0.

Examples of suitable vinyl ethers include ethylene glycol divinyl ether (EG-DVE) ($R^2$ in Formula (6) is ethanediyl and m is 1), butanediol divinyl ether (BD-DVE) ($R^2$ in Formula (6) is butanediyl and m is 1), hexanediol divinyl ether (HD-DVE) ($R^2$ in Formula (6) is hexanediyl and m is 1), diethylene glycol divinyl ether (DEG-DVE) ($R^2$ in Formula (6) is ethanediyl and m is 2), triethylene glycol divinyl ether ($R^2$ in Formula (6) is ethanediyl and m is 3), tetraethylene glycol divinyl ether ($R^2$ in Formula (6) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendent groups which can comprise alkyl groups, hydroxyl groups, alkoxy groups, or amine groups. A divinyl ether can be triethyleneglycol divinyl ether and methyltriethylene glycol divinyl ether.

Divinyl ethers in which W in Formula (6) is $C_{3-6}$ branched alkanediyl may be prepared by reacting a polyhydroxyl compound with acetylene. Examples of divinyl ethers of this type include compounds in which W in Formula (6) is an alkyl-substituted methanediyl group such as $—CH(—CH_3)—$, or an alkyl-substituted ethanediyl.

Two or more types of divinyl ethers of Formula (6) may be used. Thus, two dithiols of Formula (8) and one divinyl ethers of Formula (6), one dithiol of Formula (8) and two divinyl ethers of Formula (6), two dithiols of Formula (8) and two divinyl ethers of Formula (6), and more than two compounds of one or both Formula (8) and Formula (6), may be used to produce a variety of thiol-terminated polythioethers prepolymers.

The divinyl ether(s) can comprise, for example, from 20 mole percent to less than 50 mole percent of the reactants used to prepare a thiol-terminated polythioether prepolymer, or 30 mole percent to less than 50 mole percent.

Relative amounts of dithiols and divinyl ethers can be selected to yield polythioether prepolymers having terminal thiol groups. Thus, a dithiol of Formula (8) or a mixture of at least two different dithiols of Formula (8), can be reacted with of a divinyl ether of Formula (6) or a mixture of at least two different divinyl ethers of Formula (6) in relative amounts such that the molar ratio of thiol groups to alkenyl groups is greater than 1:1, such as from 1.1:1.0 to 2.0:1.0.

The reaction between dithiols and divinyl ethers and/or polythiols and polyvinyl ethers may be catalyzed by a free radical catalyst, an ionic catalyst, or ultraviolet radiation. Suitable free radical catalysts include, for example, azo compounds, for example azobisnitriles such as azo(bis) isobutyronitrile (AIBN); organic peroxides such as benzoyl peroxide and t-butyl peroxide; and inorganic peroxides such as hydrogen peroxide. In certain reactions, the catalyst does not comprise acidic or basic compounds, and does not produce acidic or basic compounds upon decomposition. Examples of suitable free-radical catalysts include azo-type catalysts, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other suitable free-radical catalysts include alkyl peroxides, such as t-butyl peroxide. The reaction may also be effected by irradiation with ultraviolet light either with or without a cationic photo-initiating moiety.

Thiol-terminated polythioether prepolymers provided by the present disclosure may be prepared by combining at least one dithiol of Formula (8) and at least one divinyl ether of Formula (6) followed by addition of an appropriate catalyst, and carrying out the reaction at a temperature, for example, within a range from 30° C. to 120° C., such as 70° C. to 90° C., for a duration, for example, within a range from 2 hours to 24 hours, such as 2 hours to 6 hours.

Thiol-terminated polythioether prepolymers may comprise a polyfunctional polythioether prepolymer, i.e., may have an average thiol functionality greater than 2.0. Suitable polyfunctional thiol-terminated polythioether prepolymers include, for example, those having the structure of Formula (3b), the structure of Formula (3c), or a combination thereof:

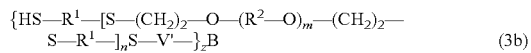
(3b)

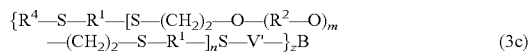
(3c)

wherein z has an average value of greater than 3.0, such as an average value within a range from 3 and 4, an average value within a range from 3.1 to 3.8, an average value within a range from 3 and 4, an average value within a range from 3 and 6, or an average value within a range from 3 to 6.

In prepolymers of Formula (3c), each $R^4$ can independently comprise hydrogen or can be bonded to a prepolymer of Formula (3c). In prepolymers of Formula (3c), each $R^4$ can independently be hydrogen or can be bonded to a polyfunctionalizing agent $B(-V)_z$ through a moiety of Formula (3).

Polyfunctionalizing agents suitable for use in preparing such polyfunctional thiol-terminated prepolymers include tri-functionalizing agents, for example, compounds of formula $B(-V)_z$ where z is 3. Suitable tri-functionalizing agents include, for example, triallyl cyanurate (TAC), 1,2, 3-propanetrithiol, isocyanurate-containing trithiols, and combinations thereof, as disclosed in U.S. Application Publication No. 2010/0010133, which is incorporated by reference in its entirety; and isocyanurates as disclosed, for example, in U.S. Pat. No. 7,858,703, which is incorporated by reference in its entirety. Other useful polyfunctionalizing agents include trimethylolpropane trivinyl ether. Mixtures of polyfunctionalizing agents may also be used. As a result, thiol-terminated polythioether prepolymers provided by the present disclosure may have a wide range of average functionality. For example, trifunctionalizing agents may afford average functionalities of groups capable of reacting with thiol groups from 2.05 to 2.9, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

Thiol-terminated polythioether prepolymers provided by the present disclosure are liquid at room temperature and can have a glass transition temperature $T_g$, for example, less than −20° C., less than −30° C., or less than −40° C., where the glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

Thiol-terminated polythioether prepolymers can exhibit a viscosity, for example, within a range from 20 poise to 500 poise (2 Pa-sec to 50 Pa-sec), from 20 poise to 200 poise (2 Pa-sec to 20 Pa-sec) or from 40 poise to 120 poise (4 Pa-sec to 12 Pa-sec), measured using a Brookfield CAP 2000 viscometer, with a No. 6 spindle, at speed of 300 rpm, and a temperature of 25° C.

Thiol-terminated polythioether prepolymers provided by the present disclosure can be characterized by a number average molecular weight and/or a molecular weight distribution. Thiol-terminated polythioether prepolymers can exhibit a number average molecular weight, for example, from 500 Da to 20,000 Da, from 2,000 Da to 5,000 Da, or from 1,000 Da to 4,000 Da. Thiol-terminated polythioether prepolymers can exhibit a polydispersity (Mw/Mn; weight average molecular weight/number average molecular weight), for example, from 1 to 20, or from 1 to 5. The backbone of a thiol-terminated polythioether prepolymer provided by the present disclosure can be modified to improve the properties such as adhesion, tensile strength, elongation, UV resistance, hardness, and/or flexibility of sealants and coatings prepared using polythioether prepolymers. For example, adhesion promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl)alkanol-containing), U.S. Pat. No. 9,382,642 (metal-ligand containing), U.S. Application Publication No. 2017/0114208 (antioxidant-containing), PCT International Publication No. WO 2018/085650 (sulfur-containing divinyl ether), and PCT International Publication No. WO 2018/031532 (urethane-containing), each of which is incorporated by reference in its entirety.

Thiol-terminated polythioether prepolymers include prepolymers described in U.S. Application Publication Nos. 2017/0369737 and 2016/0090507.

A thiol-terminated urethane-containing prepolymer can comprise a thiol-terminated urethane-containing prepolymer of Formula (9a), a thiol-terminated urethane-containing prepolymer of Formula (9b), or a combination thereof:

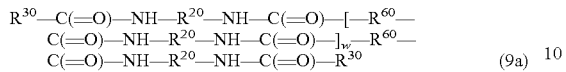
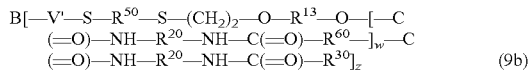

(9a)

(9b)

wherein,
w is an integer from 1 to 100;
each $R^{13}$ independently comprises $C_{2-10}$ alkanediyl;
each $R^{20}$ independently comprises a core of a diisocyanate;
each $R^{30}$ independently is a moiety comprising at least one terminal thiol group;
each $R^{50}$ independently comprises a core of a sulfur-containing prepolymer;
each $R^{60}$ independently comprises a moiety having the structure of Formula (10):

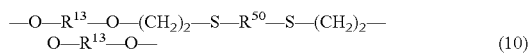

(10)

B represents a core of a z-valent, polyfunctionalizing agent $B(-V)_z$ wherein,
z is an integer from 3 to 6; and
each V is a moiety comprising a terminal group reactive with a thiol group; and
each —V'— is derived from the reaction of —V with a thiol.

A moiety —C(=O)—NH—$R^{20}$—NH—C(=O)— can be derived from a diisocyanate of Formula (11):

(11)

In moieties of Formula (11), $R^{20}$ can be a core of an aliphatic diisocyanate such as 4,4'-methylene dicyclohexyl diisocyanate and has the structure of Formula (12):

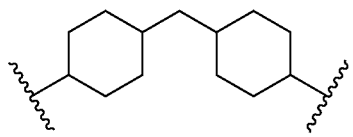

(12)

An isocyanate-terminated urethane-containing prepolymer can comprise an isocyanate-terminated urethane-containing prepolymer of Formula (13a), an isocyanate-terminated urethane-containing prepolymer of Formula (13b), or a combination thereof:

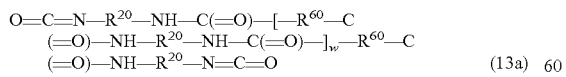

(13a)

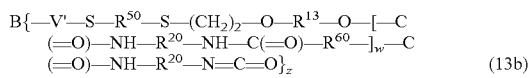

(13b)

wherein,
w is an integer from 1 to 100;
each $R^{13}$ independently comprises $C_{2-10}$ alkanediyl;

each $R^{20}$ independently comprises a core of a diisocyanate;
each $R^{50}$ independently comprises a core of a sulfur-containing prepolymer;
each $R^{60}$ independently comprises a moiety having the structure of Formula (10):

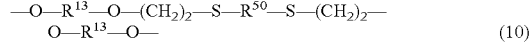

(10)

B represents a core of a z-valent, polyfunctionalizing agent $B(-V)_z$ wherein,
z is an integer from 3 to 6; and
each V is a moiety comprising a terminal group reactive with a thiol group; and
each —V'— is derived from the reaction of —V with a thiol.

In prepolymers of Formula (13a) and Formula (13b), each $R^{50}$ can be derived from a polythioether. For example, each $R^{50}$ can haves the structure of Formula (14):

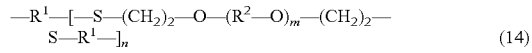

(14)

wherein,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(-CHR^3-)_p-X-]_q-(-CHR^3-)_r-$,
wherein:
p is an integer from 2 to 6;
q is an integer from 1 to 5;
r is an integer from 2 to 10;
each $R^3$ is independently selected from hydrogen and methyl; and
each X is independently selected from —O—, —S—, and —NR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $-[(-CHR^3-)_p-X-]_q-(-CHR^3-)_r-$, wherein p, q, r, $R^3$, and X are as defined as for $R^1$;
m is an integer from 0 to 50;
n is an integer from 1 to 60; and
s is an integer from 2 to 6.

In prepolymers of Formula (13a) and Formula (13b), w can be an integer from 1 to 50, from 2 to 50, or from 1 to 20 or from 2 to 20.

An isocyanate-terminated urethane-containing adduct can comprise the reaction product of reactants comprising a hydroxyl-terminated sulfur-containing adduct and a diisocyanate.

Thiol-terminated urethane-containing prepolymers can comprise a backbone of Formula (15):

(15)

wherein,
s is an integer from 1 to 60;
each $R^1$ comprises $C_{2-10}$ alkanediyl, $C_{6-8}$ cycloalkanediyl, $C_{6-10}$ alkanecycloalkanediyl, or $-[(CHR-)_p-X-]_q-(CHR-)_r-$, wherein each R is independently selected from hydrogen and methyl, wherein,
each X is independently selected from —O— and —S—
each p is independently an integer from 2 to 6;
q is an integer from 1 to 5; and
r is an integer from 2 to 10;

each A independently comprises a moiety of Formula (16) or a moiety of Formula (17):

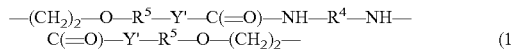

$$—(CH_2)_2—O—R^5—Y'—C(=O)—NH—R^4—NH—C(=O)—Y'—R^5—O—(CH_2)_2— \quad (16)$$

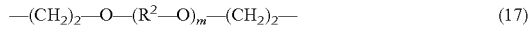

$$—(CH_2)_2—O—(R^2—O)_m—(CH_2)_2— \quad (17)$$

wherein,
m is an integer from 0 to 50;
each Y' independently comprises —NH— or —O—; and
each $R^2$ comprises $C_{2-6}$ n-alkanediyl, $C_{3-6}$ branched alkanediyl, $C_{6-8}$ cycloalkanediyl, $C_{6-10}$ alkanecycloalkanediyl, or $—[(CH_2—)_pO—]_q—(CH_2—)_r—$, wherein,
each p is independently an integer ranging from 2 to 6;
q is an integer from 1 to 5; and
r is an integer from 2 to 10;
$R^4$ comprises a core of a diisocyanate;
each $R^5$ independently comprises $C_{1-10}$ alkanediyl; and
at least one A comprises a moiety of Formula (37).

Thiol-terminated urethane-containing prepolymers can comprise reaction products of reactants comprising:
(a) a polythiol comprising a dithiol of Formula (8):

$$HS—R^1—SH \quad (8)$$

wherein $R^1$ comprises $C_{2-10}$ alkanediyl, $C_{6-8}$ cycloalkanediyl, $C_{6-10}$ alkanecycloalkanediyl, $C_{5-8}$ heterocycloalkanediyl, or $—[(CHR—)_pX—]_q—(CHR)_r—$, wherein:
each p is independently an integer from 2 to 6;
q is an integer from 1 to 5;
r is an integer from 2 to 10;
each R is independently selected from hydrogen and methyl; and
each X is independently selected from —O—, —S—, and —NR$^5$—, wherein $R^5$ is selected from hydrogen and methyl;
(b) a urethane/urea-containing bis(alkenyl) ether of Formula (18):

$$CH_2=CH—O—R^5—Y'—C(=O)—NH—R^4—NH—C(=O)—Y'—R^5—O—CH=CH_2 \quad (18)$$

wherein,
each Y' independently comprises —NH— or —O—;
$R^4$ comprises a core of a diisocyanate; and
each $R^5$ independently comprises $C_{1-10}$ alkanediyl; and
(c) a divinyl ether of Formula (6):

$$CH_2=CH—O—(R^2—O—)_m—CH=CH_2 \quad (6)$$

wherein,
m is 0 to 50; and
each $R^2$ independently comprises $C_{2-6}$ n-alkanediyl, $C_{3-6}$ branched alkanediyl, $C_{6-8}$ cycloalkanediyl, $C_{6-10}$ alkanecycloalkanediyl, or $—[(CH_2—)_p—O—]_q—(CH_2—)_r—$, wherein,
each p is independently an integer ranging from 2 to 6;
q is an integer from 1 to 5; and
r is an integer from 2 to 10.

A dithiol and a urethane/urea-containing bis(alkenyl) ether can include any of those disclosed herein.

A polythiol can further comprise a polythiol of Formula (1):

$$B(—V)_z \quad (1)$$

wherein,
B represents a core of a z-valent polyfunctionalizing agent $B(—V)_z$,
z is an integer from 3 to 6; and
each —V is a moiety comprising terminal thiol group.

A thiol-terminated sulfur-containing prepolymer can comprise a thiol-terminated polysulfide prepolymer or a combination of thiol-terminated polysulfide prepolymers.

A polysulfide prepolymer refers to a prepolymer that contains one or more polysulfide linkages, i.e., —$S_x$— linkages, where x is from 2 to 4, in the prepolymer backbone. A polysulfide prepolymer can have two or more sulfur-sulfur linkages. Suitable thiol-terminated polysulfide prepolymers are commercially available, for example, from AkzoNobel and Toray Industries, Inc. under the tradenames Thioplast® and from Thiokol-LP®, respectively.

Examples of suitable polysulfide prepolymers are disclosed, for example, in U.S. Pat. Nos. 4,623,711; 6,172,179; 6,509,418; 7,009,032; and 7,879,955.

Examples of suitable thiol-terminated polysulfide prepolymers include are liquid polysulfide prepolymers that are blends of di- and tri-functional molecules where the difunctional polysulfide prepolymers have the structure of Formula (19a) and E in the thiol-terminated prepolymer of Formula (4) can be a moiety of Formula (19):

$$—(—R—S—S—)_n—R— \quad (19)$$

$$HS—(—R—S—S—)_n—R—SH \quad (19a)$$

and the trifunctional polysulfide polymers can have the structure of Formula (20a) and E in the thiol-terminated prepolymer of Formula (4) can be a moiety of Formula (20):

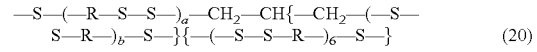

$$—S—(—R—S—S—)_a—CH_2—CH\{—CH_2—(—S—S—R—)_b—S—\}\{—(—S—S—R—)_c—S—\} \quad (20)$$

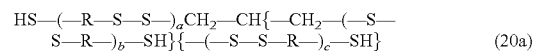

$$HS—(—R—S—S—)_aCH_2—CH\{—CH_2—(—S—S—R—)_b—SH\}\{—(—S—S—R—)_c—SH\} \quad (20a)$$

where each R is $—(CH_2)_2—O—CH_2—O—(CH_2)_2—$, and n=a+b+c, where the value for n may be from 7 to 38 depending on the amount of the trifunctional cross-linking agent (1,2,3,-trichloropropane; TCP) used during synthesis of the polysulfide prepolymer. Such thiol-terminated polysulfide prepolymers include Thioplast™ G polysulfides/resins such as Thioplast™ G1, Thioplast™ G4, Thioplast™ G10, Thioplast™ G12, Thioplast™ G21, Thioplast™ G22, Thioplast™ G44, Thioplast™ G122, and Thioplast™ G131, which are commercially available from AkzoNobel. Thioplast™ G polysulfides can have a number average molecular weight from 1,000 Da to 6,500 Da, a SH content from 1% to greater than 5.5%, and a cross-linking density from 0% to 2.0%.

Examples of suitable thiol-terminated polysulfide prepolymers also include Thiokol™ LP polysulfides available from Toray Industries, Inc. such as Thiokol™ LP2, Thiokol™ LP3, Thiokol™ LP12, Thiokol™ LP23, Thiokol™ LP33, and Thiokol™ LP55. Thiokol™ LP polysulfides have a number average molecular weight from 1,000 Da to 7,500 Da, a —SH content from 0.8% to 7.7%, and a cross-linking density from 0% to 2%. Thiokol™ LP polysulfide prepolymers have the general structure of Formula (21a) and E in the thiol-terminated prepolymer of Formula (4) can be a moiety of Formula (21):

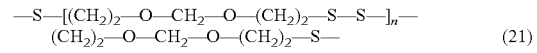

$$—S—[(CH_2)_2—O—CH_2—O—(CH_2)_2—S—S—]_n—(CH_2)_2—O—CH_2—O—(CH_2)_2—S— \quad (21)$$

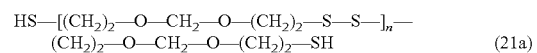

$$HS—[(CH_2)_2—O—CH_2—O—(CH_2)_2—S—S—]_n—(CH_2)_2—O—CH_2—O—(CH_2)_2—SH \quad (21a)$$

where n can be such that the number average molecular weight from 1,000 Da to 7,500 Da, such as, for example an integer from 8 to 80.

A thiol-terminated sulfur-containing prepolymer can comprise a Thiokol-LP® polysulfide, a Thioplast® G polysulfide, or a combination thereof.

A thiol-terminated polysulfide prepolymer can comprise a thiol-terminated polysulfide prepolymer of Formula (22a) and E in the thiol-terminated prepolymer of Formula (4) can be a moiety of Formula (22):

  (22)

  (22a)

where,
t can be an integer from 1 to 60;
q can be an integer from 1 to 8;
p can be an integer from 1 to 10;
r can be an integer from 1 to 10;
y has an average value within a range from 1.0 to 1.5; and
each R can independently be selected from branched alkanediyl, branched arenediyl, and a moiety having the structure —(CH$_2$)$_p$—O—(CH$_2$)$_q$—O—(CH$_2$)$_r$—.

In thiol-terminated polysulfide prepolymers of Formula (22a) and moieties of Formula (22a), t can be, for example, an integer from 2 to 60, from 1 to 40, or from 1 to 20.

In thiol-terminated polysulfide prepolymers of Formula (22a) and moieties of Formula (22a), q can be, for example, an integer from 1 to 6, or an integer from 1 to 4. For example, q can be 1, 2, 3, 4, 5 or 6.

In thiol-terminated polysulfide prepolymers of Formula (22a) and moieties of Formula (22a), each p can be, for example, an integer from 1 to 6 or from 1 to 4. For example, each p can be 1, 2, 3, 4, 5, 6, 7, 8, 9, or 10.

In thiol-terminated polysulfide prepolymers of Formula (22a) and moieties of Formula (22a), each r can be, for example, an integer from 1 to 6 or from 1 to 4. For example, each p can be 1, 2, 3, 4, 5, 6, 7, 8, 9, or 10.

In thiol-terminated polysulfide prepolymers of Formula (22a) and moieties of Formula (22a), y can have a value of 1.

In thiol-terminated polysulfide prepolymers of Formula (22a) and moieties of Formula (22a), y can have an average value, for example, of 1, such as from 1.05 to 2, or from 1.1 to 1.8.

In thiol-terminated polysulfide prepolymers of Formula (22a) and moieties of Formula (22a), R can be —(CH$_2$)$_p$—O—(CH$_2$)$_q$—O—(CH$_2$)$_r$—.

In thiol-terminated polysulfide prepolymers of Formula (22a) and moieties of Formula (22a), R can be —(CH$_2$)$_p$—O—(CH$_2$)$_q$—O—(CH$_2$)$_r$—, each q can be 1, 2, 3, or 4, and each p and r can be 1 or 2.

In thiol-terminated polysulfide prepolymers of Formula (12a) and moieties of Formula (12a), 0% to 20% of the R groups can comprise branched alkanediyl or branched arenediyl, and 80% to 100% of the R groups can be —(CH$_2$)$_p$—O—(CH$_2$)$_q$—O—(CH$_2$)$_r$—.

In thiol-terminated polysulfide prepolymers of Formula (22a) and moieties of Formula (22a), a branched alkanediyl or a branched arenediyl can be —R$^1$(-A)$_n$- where R$^1$ is a hydrocarbon group, n is 1 or 2, and A is a branching point. A branched alkanediyl can have the structure —CH$_2$—CH(—CH$_2$—)—.

Thiol-terminated polysulfide prepolymers of Formula (22a) and moieties of Formula (22a) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene.

Examples of thiol-terminated polysulfide prepolymers of Formula (22) and (22a) are disclosed, for example, in U.S. Application Publication No. 2016/0152775, in U.S. Pat. No. 9,079,833, and in U.S. Pat. No. 9,663,619.

A thiol-terminated polysulfide prepolymer can comprise a thiol-terminated polysulfide prepolymer of Formula (23a) and E in the thiol-terminated prepolymer of Formula (4) can be a moiety of Formula (23):

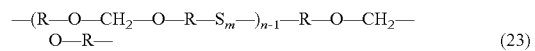  (23)

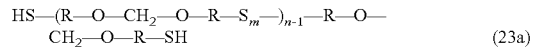  (23a)

where R is C$_{2-4}$ alkanediyl, m is an integer from 1 to 8, and n is an integer from 2 to 370.

In thiol-terminated polysulfide prepolymers of Formula (23) and (23a), m can have an average value, for example, greater than 1, such as from 1.05 to 2, or from 1.1 to 1.8.

In thiol-terminated polysulfide prepolymers of Formula (23) and (23a), m can be, for example, an integer from 1 to 6, and integer from 1 to 4, or the integer 1, 2, 3, 4, 5, 6, 7, or 8.

In thiol-terminated polysulfide prepolymers of Formula (23) and (23a), n can be, for example, an integer from 2 to 200 or an integer from 2 to 100.

In thiol-terminated polysulfide prepolymers of Formula (23) and (23a), each R can independently be selected from ethanediyl, 1,3-propanediyl, 1,1-propanediyl, 1,2-propanediyl, 1,4-butanediyl, 1,1-butanediyl, 1,2-butanediyl, and 1,3-butanediyl.

Examples of thiol-terminated polysulfide prepolymers of Formula (23) and (23a) are disclosed, for example, in JP 62-53354.

Thiol-terminated polysulfide prepolymers can be liquid at room temperature. Thiol-terminated monosulfide prepolymers can have a viscosity of no more than 1,500 poise (150 Pa-sec), such as 40 poise to 500 poise (4 Pa-sec to 50 Pa-sec), at a temperature of about 25° C. and a pressure of about 760 mm Hg (101 kPa) determined according to ASTM D-2849 § 79-90 using a Brookfield CAP 2000 viscometer with a No. 6 spindle, at speed of 300 rpm, and a temperature of 23° C.

Thiol-terminated polysulfide prepolymers can have a number average molecular weight within a range from 300 Da to 10,000 Da, such as within a range 1,000 Da to 8,000 Da, the molecular weight being determined by gel-permeation chromatography using a polystyrene standard. Thiol-terminated polysulfide prepolymers can have a glass transition temperature T$_g$ less than −40° C., less than −55° C., or less than −60° C. The glass transition temperature T$_g$ is determined by Dynamic Mass Analysis (DMA) using a TA Instruments Q800 apparatus with a frequency of 1 Hz, an amplitude of 20 microns, and a temperature ramp of −80° C. to 25° C., with the T$_g$ identified as the peak of the tan δ curve.

A thiol-terminated sulfur-containing prepolymer can comprise a thiol-terminated sulfur-containing polyformal prepolymer or a combination of thiol-terminated sulfur-containing polyformal prepolymers. Sulfur-containing polyformal prepolymers useful in sealant applications are disclosed, for example, in U.S. Pat. No. 8,729,216 and in U.S. Pat. No. 8,541,513, each of which is incorporated by reference in its entirety.

A thiol-terminated sulfur-containing prepolymer can comprise a thiol-terminated sulfur-containing polyformal comprising a moiety of Formula (24):

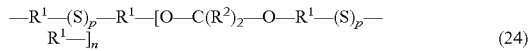
(24)

where n can be an integer from 1 to 50; each p can independently be selected from 1 and 2; each $R^1$ can be $C_{2-6}$ alkanediyl; and each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl.

A thiol-terminated sulfur-containing polyformal prepolymer can have the structure of Formula (24a):

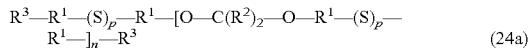
(24a)

where n can be an integer from 1 to 50; each p can independently be selected from 1 and 2; each $R^1$ can be $C_{2-6}$ alkanediyl; each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and each $R^3$ comprises a thiol-terminated group.

In sulfur-containing polyformal moieties of Formula (24) and prepolymers of Formula (24a), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal moieties of Formula (24) and prepolymers of Formula (24a), each $R^1$ can be ethane-1,2-diyl.

In sulfur-containing polyformal moieties of Formula (24) and prepolymers of Formula (24a), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal moieties of Formula (24) and prepolymers of Formula (24a), each $R^2$ can be selected from hydrogen, methyl, and ethyl.

In sulfur-containing polyformal moieties of Formula (24) and prepolymers of Formula (24a), each $R^1$ is the same and can be selected from $C_{2-3}$ alkanediyl such as ethane-1,2-diyl and propane-1,3-diyl; and each $R^2$ is the same and can be selected from hydrogen and $C_{1-3}$ alkyl such as methyl, ethyl, or propyl. In sulfur-containing polyformal moieties of Formula (24) and prepolymers of Formula (24a), each $R^1$ can be ethane-1,2-diyl.

In sulfur-containing polyformal moieties of Formula (24) and prepolymers of Formula (24a), each $R^2$ can be hydrogen. In sulfur-containing polyformal moieties of Formula (24) and prepolymers Formula (24a), each $R^1$ can be ethane-1,2-diyl and each $R^2$ can be hydrogen.

In sulfur-containing polyformal moieties of Formula (24) and prepolymers of Formula (24a), n can be an integer selected from 1 to 50, an integer from 2 to 40, an integer from 4 to 30, or n can be an integer from 7 to 30.

In sulfur-containing polyformal moieties of Formula (24) and prepolymers of Formula (24a), each p is the same and can be 1, and each p is the same and can be 2.

In sulfur-containing polyformal moieties of Formula (24) and prepolymers of Formula (24a) can have a number average molecular weight from 200 Da to 6,000 Da, from 500 Da to 5,000 Da, from 1,000 Da to 5,000 Da, from 1,500 Da to 4000 Da, or from 2,000 Da to 3,600 Da.

In sulfur-containing polyformal prepolymers of Formula (24a), each $R^3$ can be a thiol-terminated group and can be a group of Formula (a), Formula (b), Formula (c), Formula (d), Formula (e), or Formula (f):

(a)

(b)

(c)

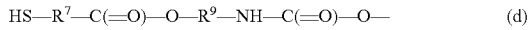
(d)

(e)

(f)

where each $R^6$ comprises a moiety derived from a diisocyanate or a moiety derived from an ethylenically unsaturated monoisocyanate; each $R^7$ can be selected from $C_{2-14}$ alkanediyl and $C_{2-14}$ heteroalkanediyl; and each $R^9$ can be selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

Sulfur-containing polyformal prepolymers provided by the present disclosure can have the structure of Formula (24b):

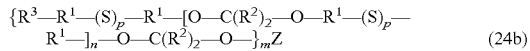
(24b)

where each n can be an integer selected from 1 to 50; m can be an integer selected from 3 to 6; p can independently be selected from 1 and 2; each $R^1$ can independently be $C_{2-6}$ alkanediyl; each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; each $R^3$ comprises a thiol-terminated group; and Z can be derived from the core of an m-valent parent polyol $Z(OH)_m$.

In sulfur-containing polyformal prepolymers of Formula (24b), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal prepolymers of Formula (24b), each $R^1$ can be ethane-1,2-diyl.

In sulfur-containing polyformal prepolymers of Formula (24b), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal prepolymers of Formula (24b), each $R^2$ can be selected from hydrogen, methyl, and ethyl.

In sulfur-containing polyformal prepolymers of Formula (24b), each $R^1$ can be the same and can be selected from $C_{2-3}$ alkanediyl such as ethane-1,2-diyl or propane-1,3-diyl; and each $R^2$ can be the same and can be selected from hydrogen and $C_{1-3}$ alkyl such as methyl, ethyl, or propyl. In sulfur-containing polyformal prepolymers of Formula (24b), each $R^1$ can be ethane-1,2-diyl. In sulfur-containing polyformal prepolymers of Formula (24b), each $R^2$ can be hydrogen. In sulfur-containing polyformal prepolymers of Formula (24b), each $R^1$ can be ethane-1,2-diyl and each $R^2$ can be hydrogen.

In sulfur-containing polyformal prepolymers of Formula (24b), m can be 3, m can be 4, m can be 5, or m can be 6.

In sulfur-containing polyformal prepolymers of Formula (24b) where m is 3, the parent polyol $Z(OH)_m$ is a triol of Formula (25):

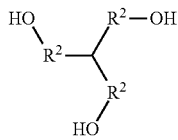
(25)

where each $R^2$ can independently be $C_{1-6}$ alkanediyl, or a triol of Formula (26):

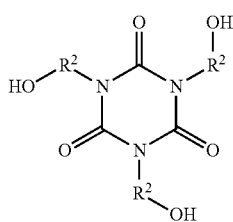
(26)

where each $R^2$ can independently be $C_{1-6}$ alkanediyl. Accordingly, in these embodiments Z can have the structure of Formula (25a) or Formula (26b):

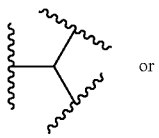
(25a)

or

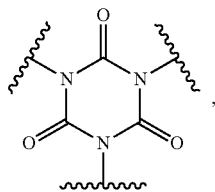
(26b)

respectively, where each $R^2$ can independently be $C_{1-6}$ alkanediyl.

In sulfur-containing polyformal prepolymers of Formula (24b), each n can be an integer selected from 1 to 50, an integer selected from 2 to 40, an integer selected from 4 to 30, or an integer selected from 7 to 30.

In sulfur-containing polyformal prepolymers of Formula (24b) has a number average molecular weight from 200 Da to 6,000 Da, from 500 Da to 5,000 Da, from 1,000 Da to 5,000 Da, from 1,500 Da to 4000 Da, or from 2,000 Da to 3,600 Da.

In sulfur-containing polyformal prepolymers of Formula (24b), $R^3$ can be bonded to a polyfunctionalizing agent $B(V)_z$ through a moiety of Formula (24).

In sulfur-containing polyformal prepolymers of Formula (24b), each $R^3$ can be the same.

In sulfur-containing polyformal prepolymers of Formula (24b), each $R^3$ can comprise a thiol-terminated group of Formula (a), Formula (b), Formula (c), Formula (d), Formula (e), or Formula (f):

$HS-R^7-R^6-O-$ (a)

$HS-R^7-O-$ (b)

$HS-R^7-NH-C(=O)-O-$ (c)

$HS-R^7-C(=O)-O-R^9-NH-C(=O)-O-$ (d)

$HS-R^7-C(=O)-NH-R^9-NH-C(=O)-O-$ (e)

$HS-R^7-C(=O)-O-$ (f)

where each $R^6$ comprises a moiety derived from a diisocyanate or a moiety derived from an ethylenically unsaturated monoisocyanate; each $R^7$ can be selected from $C_{2-14}$ alkanediyl and $C_{2-14}$ heteroalkanediyl; and each $R^9$ can be selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

A thiol-terminated sulfur-containing prepolymer can comprise a thiol-terminated monosulfide prepolymer or a combination of thiol-terminated monosulfide prepolymers.

A thiol-terminated monosulfide prepolymer can comprise a thiol-terminated monosulfide prepolymer comprising a moiety of Formula (27):

$$-S-R^2-[-S-(R-X)_p-(R^1-X)_q-R^2-]_n-$$
$$S-$$
(27)

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^2$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;

each X can independently be selected from O or S;

p can be an integer from 1 to 5;

q can be an integer from 0 to 5; and n can be an integer from 1 to 60, such as from 2 to 60, from 3 to 60, or from 25 to 35.

In moieties of Formula (27), each X can independently be selected from S, O, and $NR^3$, where $R^3$ comprises $C_{1-4}$ alkyl; p can be an integer from 1 to 5; q can be an integer from 0 to 5; n can be an integer from 1 to 60; each R can independently be selected from $C_{2-10}$ alkanediyl, $C_{6-8}$ cycloalkanediyl, $C_{1-4}$ alkylcycloalkanediyl, and $C_{8-10}$ alkylarenediyl; each $R^1$ can independently be selected from $C_{1-10}$ alkanediyl, $C_{6-8}$ cycloalkanediyl, $C_{1-4}$ alkylcycloalkanediyl, and $C_{8-10}$ alkylarenediyl; and each $R^2$ can independently be selected from $C_{2-10}$ alkanediyl, $C_{6-8}$ cycloalkanediyl, $C_{1-4}$ alkylcycloalkanediyl, and $C_{8-10}$ alkylarenediyl.

A thiol-terminated monosulfide prepolymer can comprise a thiol-terminated monosulfide prepolymer of Formula (27a), a thiol-terminated monosulfide prepolymer of Formula (27b), a thiol-terminated monosulfide prepolymer of Formula (27c), or a combination of any of the foregoing:

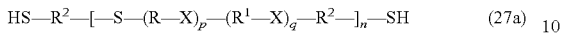  (27a)

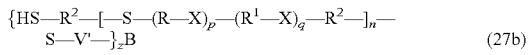  (27b)

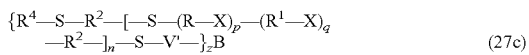  (27c)

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^2$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;

each X can independently be selected from O and S;

p can be an integer from 1 to 5;

q can be an integer from 0 to 5; and n can be an integer from 1 to 60, such as from 2 to 60, from 3 to 60, or from 25 to 35 and B represents a core of a z-valent polyfunctionalizing agent $B(—V)_z$ wherein:

z can be an integer from 3 to 6; and each V can be a moiety comprising a terminal group reactive with a thiol group;

each —V'— can be derived from the reaction of —V with a thiol; and each $R^4$ can independently be selected from hydrogen and a bond to a polyfunctionalizing agent $B(—V)_z$ through a moiety of Formula (27).

In thiol-terminated monosulfide prepolymers of Formula (27)-(27c):

each X can independently be selected from S, O, and $NR^3$, where $R^3$ be selected from $C_{1-4}$ alkyl;

p can be an integer from 1 to 5;

q can be an integer from 0 to 5;

n can be an integer from 1 to 60;

each R can independently be selected from $C_{2-10}$ alkanediyl, $C_{6-8}$ cycloalkanediyl, $C_{1-4}$ alkylcycloalkanediyl, and $C_{8-10}$ alkylarenediyl;

each $R^1$ can independently be selected from $C_{1-10}$ alkanediyl, $C_{6-8}$ cycloalkanediyl, $C_{1-4}$ alkylcycloalkanediyl, and $C_{8-10}$ alkylarenediyl;

each $R^2$ can independently be selected from $C_{2-10}$ alkanediyl, $C_{6-8}$ cycloalkanediyl, $C_{1-4}$ alkylcycloalkanediyl, and $C_{8-10}$ alkylarenediyl;

B represents a core of a z-valent polyfunctionalizing agent $B(—V)_z$ wherein:

z can be an integer from 3 to 6; and each V can be a moiety comprising a terminal group reactive with a thiol group;

each —V'— can be derived from the reaction of —V with a thiol; and each $R^4$ can independently be selected from hydrogen and a bond to a polyfunctionalizing agent $B(—V)_z$ through a moiety of Formula (27).

In thiol-terminated monosulfide moieties or prepolymers of Formula (27)-(27c), each X can independently be S or O, each X can be S, or each X can be O.

In thiol-terminated monosulfide moieties or prepolymers of Formula (27)-(27c), p can be an integer from 2 to 6, or p can be 1, 2, 3, 4, 5, or 6.

In thiol-terminated monosulfide moieties or prepolymers of Formula (27)-(27c), q can be an integer from 1 to 5, q can be an integer from 2 to 5, or q can be 0, 1, 2, 3, 4, or 5.

In thiol-terminated monosulfide moieties or prepolymers of Formula (27)-(27c), n can be an integer from 2 to 60, from 3 to 60, or from 25 to 35.

In thiol-terminated monosulfide moieties or prepolymers of Formula (27)-(27c), each R can independently be selected from $C_{2-10}$ alkanediyl and $C_{6-8}$ cycloalkanediyl, each R can be $C_{2-10}$ alkanediyl, or each R can be $C_{6-8}$ cycloalkanediyl.

In thiol-terminated monosulfide moieties or prepolymers of Formula (27)-(27c), each R can be selected from $C_{2-6}$ alkanediyl, $C_{2-4}$ alkanediyl, $C_{3-10}$ alkanediyl, and $C_{3-6}$ alkanediyl.

In thiol-terminated monosulfide moieties or prepolymers of Formula (27)-(27c), each R can be selected from ethanediyl, 1,3-propanediyl, 1,2-propanediyl, 1,4-butanediyl, and 1,3-butanediyl.

In thiol-terminated monosulfide moieties or prepolymers of Formula (27)-(27c), each $R^1$ can independently be selected from $C_{1-10}$ alkanediyl and $C_{6-8}$ cycloalkanediyl, each R can be $C_{1-10}$ alkanediyl, or each $R^1$ can be $C_{6-8}$ cycloalkanediyl.

In thiol-terminated monosulfide moieties or prepolymers of Formula (27)-(27c), each $R^1$ can be selected from $C_{1-6}$ alkanediyl, $C_{1-4}$ alkanediyl, $C_{2-10}$ alkanediyl, and $C_{2-6}$ alkanediyl.

In thiol-terminated monosulfide moieties or prepolymers of Formula (27)-(27c), each $R^1$ can be selected from methanediyl, ethanediyl, 1,3-propanediyl, 1,2-propanediyl, 1,4-butanediyl, and 1,3-butanediyl.

In thiol-terminated monosulfide moieties or prepolymers of Formula (27)-(27c), each $R^2$ can independently be selected from $C_{2-10}$ alkanediyl and $C_{6-8}$ cycloalkanediyl, each $R^2$ can be $C_{2-10}$ alkanediyl, or each $R^2$ can be $C_{6-8}$ cycloalkanediyl.

In thiol-terminated monosulfide moieties or prepolymers of Formula (27)-(27c), each $R^2$ can be selected from $C_{2-6}$ alkanediyl, $C_{2-4}$ alkanediyl, $C_{3-10}$ alkanediyl, and $C_{3-6}$ alkanediyl.

In thiol-terminated monosulfide moieties or prepolymers of Formula (27)-(27c), each $R^2$ can be selected from ethanediyl, 1,3-propanediyl, 1,2-propanediyl, 1,4-butanediyl, and 1,3-butanediyl.

In thiol-terminated monosulfide moieties or prepolymers of Formula (27)-(27c), p can be 1 or 2, q can be 1 or 2, n can be an integer from 1 to 60 or an integer from 25 to 35, each X can be O or S, each R can be $C_{2-4}$ alkanediyl, each $R^1$ can be $C_{1-4}$ alkanediyl, and each $R^2$ can be $C_{2-4}$ alkanediyl.

In thiol-terminated monosulfide moieties or prepolymers of Formula (27)-(27c), p can be 1 or 2, q can be 1 or 2, n can be an integer from 1 to 60 or an integer from 25 to 35, each X can be O or S, each R can be $C_2$ alkanediyl, each $R^1$ can be $C_1$ alkanediyl, and each $R^2$ can be $C_2$ alkanediyl.

In thiol-terminated monosulfide moieties or prepolymers of Formula (27)-(27c), p can be 1 or 2, q can be 1 or 2, n can be an integer from 1 to 60 or an integer from 25 to 35, each X can be O, each R can be $C_2$ alkanediyl, each $R^1$ can be $C_1$ alkanediyl, and each $R^2$ can be $C_2$ alkanediyl.

In thiol-terminated monosulfide moieties or prepolymers of Formula (27)-(27c), $B(-V)_z$ can be selected from 1,2,3-trichloropropane, 1,1,1-tris(chloromethyl)propane, 1,1,1-tris(chloromethyl)ethane, 1,3,5-tris(chloromethyl)benzene, and a combination of any of the foregoing.

In thiol-terminated monosulfide moieties or prepolymers of Formula (27c) each $R^4$ can independently selected from hydrogen and a bond to a polyfunctionalizing agent $B(V)_z$ through a moiety of Formula (27). A thiol-terminated monosulfide moiety or prepolymer can have an average thiol functionality, for example, from 2.05 to 2.9, such as from 2.1 to 2.8, or from 2.2 to 2.6.

Thiol-terminated monosulfide moieties or prepolymers of Formula (27)-(27c) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfide moieties or prepolymers of Formula (27)-(27c) are disclosed, for example, in U.S. Pat. No. 7,875,666, which is incorporated by reference in its entirety.

A thiol-terminated monosulfide prepolymer can comprise a thiol-terminated monosulfide prepolymer comprising a moiety of Formula (28) and E in the thiol-terminated prepolymer of Formula (4) can be a moiety of Formula (28a):

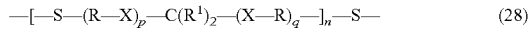  (28)

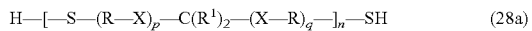  (28a)

wherein, each R can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;

each $R^1$ can independently be selected from hydrogen, $C_{1-10}$ n-alkyl, such as a $C_{1-6}$ n-alkyl, $C_{3-10}$ branched alkyl, such as a $C_{3-6}$ branched alkyl having one or more pendant groups which can be, for example, alkyl groups, such as methyl or ethyl groups; a $C_{6-8}$ cycloalkyl group; a $C_{6-14}$ alkylcycloalkyl, such as a $C_{6-10}$ alkylcycloalkyl; and a $C_{8-10}$ alkylaryl;

each X can independently be selected from O and S;

p can be an integer from 1 to 5;

q can be an integer from 1 to 5; and n can be an integer from 1 to 60, such as from 2 to 60, from 3 to 60, or from 25 to 35.

A thiol-terminated monosulfide prepolymer can comprise a thiol-terminated monosulfide prepolymer of Formula (28a), a thiol-terminated monosulfide prepolymer of Formula (28b), a thiol-terminated monosulfide prepolymer of Formula (28c), or a combination of any of the foregoing:

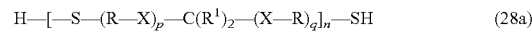  (28a)

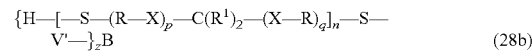  (28b)

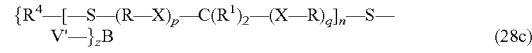  (28c)

wherein, each R can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;

each $R^1$ can independently be selected from hydrogen, $C_{1-10}$ n-alkyl, such as a $C_{1-6}$ n-alkyl, $C_{3-10}$ branched alkyl, such as a $C_{3-6}$ branched alkyl having one or more pendant groups which can be, for example, alkyl groups, such as methyl or ethyl groups; a $C_{6-8}$ cycloalkyl group; a $C_{6-14}$ alkylcycloalkyl, such as a $C_{6-10}$ alkylcycloalkyl; and a $C_{8-10}$ alkylaryl;

each X can independently be selected from O and S;

p can be an integer from 1 to 5;

q can be an integer from 1 to 5;

n can be an integer from 1 to 60, such as from 2 to 60, from 3 to 60, or from 25 to 35;

B represents a core of a z-valent polyfunctionalizing agent $B(-V)_z$ wherein:

z can be an integer from 3 to 6; and each V can be a moiety comprising a terminal group reactive with a thiol group;

each —V'— can be derived from the reaction of —V with a thiol; and each $R^4$ can independently be selected from hydrogen and a bond to a polyfunctionalizing agent $B(-V)_z$ through a moiety of Formula (28).

In thiol-terminated monosulfide moieties or prepolymers of Formula (28)-(28c), each X can independently be selected from S and O; p can be an integer from 1 to 5; q can be an integer from 1 to 5; n can be an integer from 1 to 60; each R can independently be $C_{2-10}$ alkanediyl; each $R^1$ can independently be selected from hydrogen and $C_{1-10}$ alkanediyl; B represents a core of a z-valent polyfunctionalizing agent $B(-V)_z$ wherein: z can be an integer from 3 to 6; and each V can be a moiety comprising a terminal group reactive with a thiol group; each —V'— can be derived from the reaction of —V with a thiol; and each $R^4$ can independently be hydrogen or can be bonded to a polyfunctionalizing agent $B(-V)_z$ through a moiety of Formula (28).

In thiol-terminated monosulfide moieties or prepolymers of Formula (28)-(28c), each X can be S, or each X can be O.

In thiol-terminated monosulfide moieties or prepolymers of Formula (28)-(28c), p can be an integer from 2 to 5, or q can be 1, 2, 3, 4, or 5.

In thiol-terminated monosulfide moieties or prepolymers of Formula (28)-(28c), p can be an integer from 2 to 5, or q can be 1, 2, 3, 4, or 5.

In thiol-terminated monosulfide moieties or prepolymers of Formula (28)-(28c), n can be an integer from 2 to 60, from 3 to 60, or from 25 to 35.

In thiol-terminated monosulfide moieties or prepolymers of Formula (28)-(28c), each R can independently be selected from $C_{2-6}$ alkanediyl and $C_{2-4}$ alkanediyl.

In thiol-terminated monosulfide moieties or prepolymers of Formula (28)-(28c), each R can be selected from ethanediyl, 1,3-propanediyl, 1,2-propanediyl, 1,4-butanediyl, and 1,3-butanediyl.

In thiol-terminated monosulfide moieties or prepolymers of Formula (28)-(28c), each R can be selected from $C_{2-10}$ n-alkanediyl, $C_{2-10}$ branched alkanediyl, and a combination thereof.

In thiol-terminated monosulfide moieties or prepolymers of Formula (28)-(28c), each $R^1$ can independently be selected from hydrogen and $C_{2-6}$ alkyl.

In thiol-terminated monosulfide moieties or prepolymers of Formula (28)-(28c), each $R^1$ can independently be selected from hydrogen, ethanediyl, 1,3-propyl, 1,2-propyl, 1,4-butyl, and 1,3-butyl.

In thiol-terminated monosulfide moieties or prepolymers of Formula (28)-(28c), each $R^1$ can be selected from $C_{1-10}$ n-alkyl, $C_{1-10}$ branched alkyl, and a combination thereof.

In thiol-terminated monosulfide moieties or prepolymers of Formula (28)-(28c), each X can be O, p can be 1 or 2, q can be 1 or 2, n can be 1 to 60 such as 2 to 60, each R can be $C_{2-4}$ alkanediyl such as ethanediyl, and each $R^1$ can be hydrogen.

In thiol-terminated monosulfide moieties or prepolymers of Formula (28)-(28c), each X can be O, p can be 1, q can be 1, n can be 1 to 60 such as 2 to 60, each R can be $C_{2-4}$ alkanediyl such as ethanediyl, and each $R^1$ can be hydrogen.

In thiol-terminated monosulfide moieties or prepolymers of Formula (28)-(28c), each X can be O, p can be 2, q can be 2, n can be 1 to 60 such as 2 to 60, each R can be $C_{2-4}$ alkanediyl such as ethanediyl, and each $R^1$ can be hydrogen.

In thiol-terminated monosulfide moieties or prepolymers of Formula (28)-(18c), $B(-V)_z$ can be selected from 1,2,3-trichloropropane, 1,1,1-tris(chloromethyl)propane, 1,1,1-tris(chloromethyl)ethane, 1,3,5-tris(chloromethyl)benzene, and a combination of any of the foregoing.

Thiol-terminated monosulfide moieties or prepolymers of Formula (28)-(28c) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfides of Formula (28)-(28c) are disclosed, for example, in U.S. Pat. No. 8,466,220, which is incorporated by reference in its entirety.

Thiol-terminated monosulfide moieties and prepolymers can have a number average molecular weight within a range from 300 Da to 10,000 Da, such as within a range 1,000 Da to 8,000 Da, where the molecular weight is determined by gel-permeation chromatography using a polystyrene standard. Thiol-terminated monosulfide prepolymers can have a glass transition temperature $T_g$ less than −40° C., less than −55° C., or less than −60° C. The glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

A sulfur-containing prepolymer can comprise a sulfur-containing perfluoroether prepolymer, a perfluorosilicone prepolymer, or a combination thereof.

A polythiol can comprise a small molecule polythiol and/or a polythiol polyfunctionalizing agent.

A small molecule refers to polythiol generally having a molecular weight such as less than 2,000 Da, less than 1,000 Da, less than 800 Da, less than 600 Da, or less than 500 Da, i.e. in general less than that of a typical polythiol prepolymer. Suitable polythiols can be monomeric and can be characterized, for example, by a weight average molecular weight from 200 Da to 2,000 Da, from 200 Da to 1,500 Da, from 200 Da to 1,000 Da, from 500 Da to 2,000 Da, or from 500 Da to 1,500 Da. A small molecule polythiol may or may not have repeating units.

A small molecule polythiol can have a thiol-functionality, for example, from 2 to 6. A small molecule polythiol can be a sulfur-containing small molecule polythiol. A small molecule polythiol can comprise a polyfunctionalizing agent having a thiol functionality, for example, from 3 to 6.

Examples of suitable trifunctional thiol-terminated polyfunctionalizing agents include, for example, 1,2,3-propanetrithiol, 1,2,3-benzenetrithiol, 1,1,1-butanetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercapto-propionyloxy)ethyl]isocyanurate (TEMPIC), dipentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable mercapto-acetate polythiol polyfunctionalizing agents include pentaerythritol tetramercaptoacetate (PRTMA), trimethylolpropane trimercaptoacetate (TMPMA), glycol dimercaptoacetate (GDMA), ethyleneglycol dimercaptoacetate, di-trimethylolpropane tetramercaptoacetate, and combinations of any of the foregoing.

Examples of suitable mercapto-acrylate polythiol polyfunctionalizing agents include tris[2-(3-mercaptopropionyloxy)ethyl]isocyanurate, 2,3-di(2-mercaptoethylthio)-1-propane-thiol, dimercaptodiethylsulfide (2,2'-thiodiethanethiol), dimercaptodioxaoctane (2,2'-(ethylenedioxy) diethanethiol, 1,8-dimercapto-3,6-dioxaoctane, and combinations of any of the foregoing.

Suitable polythiol polyfunctionalizing agents are commercially available, for example, from Bruno Bock Thiochemicals under the Thiocure® tradename.

A polythiol polyfunctionalizing agent can comprise a polythiol of Formula (1):

$$B(-V)_z \qquad (1)$$

wherein,

B comprises a core of a z-valent polyfunctionalizing agent $B(-V)_z$;

z can be an integer from 3 to 6; and each —V can independently be a moiety comprising a terminal thiol group.

In polythiols of Formula (1), z can be, for example, 3, 4, 5, or 6.

In polythiols of Formula (1), z can be 3. Suitable trifunctional polythiols include, for example, 1,2,3-propanetrithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Mixtures polythiols of Formula (1) may also be used.

Other examples of suitable polythiol monomers include 1,2,3-propanetrithiol, isocyanurate-containing trithiols, and combinations thereof, as disclosed, for example, in U.S. Application Publication No. 2010/0010133, which is incorporated by reference in its entirety, and isocyanurates as disclosed, for example, in U.S. Application Publication No. 2011/0319559, which is incorporated by reference in its entirety.

Compositions provided by the present disclosure can comprise from 0.01 wt % to 4 wt % of a small molecule polythiol such as trithiol, from 0.5 wt % to 3.5 wt %, from 1 wt % to 3 wt %, or from 1.5 wt % to 2.5 wt % of a monomeric polythiol such as a trithiol, where wt % is based on the total weight of the composition.

Compositions provided by the present disclosure can comprise a polyalkenyl or combination of polyalkenyls. A polyalkenyl can be difunctional or can have an alkenyl-functionality greater than two (2) such as from 3 to 6, including an alkenyl functionality of 3, 4, 5, or 6. A polyalkenyl can comprise a polyallyl, a bis(alkenyl) ether, a sulfur-containing bis(alkenyl) ether, or a combination of any of the foregoing.

Curable compositions provided by the present disclosure can comprise, for example, from 1 wt % to 10 wt % of a polyalkenyl or combination of polyalkenyls, from 2 wt % to 9 wt %, from 3 wt % to 8 wt %, or from 4 wt % to 7 wt % of a polyalkenyl or combination of polyalkenyls, where wt % is based on the total weight of the composition. Compositions provided by the present disclosure can comprise a substantially equivalent ratio of thiol groups to alkenyl groups, such as an equivalent ratio of thiol to alkenyl groups within 10%, within 5%, within 2% or within 1%, where wt % is based on the total weight of the composition.

Compositions provided by the present disclosure can comprise from 15 eq % to 45 eq % of a trifunctional polyalkenyl, from 20 eq % to 40 eq %, or from 25 eq % to 35 eq % of a trifunctional polyalkenyl, where eq % is based on the total alkenyl equivalents of alkenyl groups in the composition.

Compositions provided by the present disclosure can comprise from 55 eq % to 85 eq % of a difunctional polyalkenyl such as a dialkenyl ether, from 60 eq % to 80 eq %, or from 55 eq % to 75 eq % of a trifunctional polyalkenyl, where eq % is based on the total alkenyl equivalents of alkenyl groups in the composition.

Compositions provided by the present disclosure can comprise from 90 eq % to 100 eq %, from 95 eq % to 100 eq %, or 100 eq % of a difunctional polyalkenyl such as a dialkenyl ether, to a tri functional polyalkenyl, where eq % is based on the total equivalents of alkenyl groups in the composition.

A polyalkenyl can comprise a bis(alkenyl) ether. Compositions provided by the present disclosure can comprise a bis(alkenyl)ether or a combination of bis(alkenyl)ethers.

A bis(alkenyl)ether can have the structure of Formula (6):

$$CH_2=CH-O-(-R^2-O-)_m-CH=CH_2 \qquad (6)$$

wherein, m can be 0 to 50; and each $R^2$ can independently be selected from $C_{2-6}$ n-alkanediyl, $C_{3-6}$ branched alkanediyl, $C_{6-8}$ cycloalkanediyl, $C_{6-10}$ alkanecycloalkanediyl, and $-[(-CH_2-)_p-O-]_q-(-CH_2-)_r-$, wherein, each p can independently be an integer ranging from 2 to 6;

q can be an integer from 1 to 5; and r can be an integer from 2 to 10.

In bis(alkenyl)ethers of Formula (6), m can be an integer from 0 to 50, such as an integer from 1 to 6, from 1 to 4, or from 1 to 3.

In bis(alkenyl)ethers of Formula (6), m can be 1, 2, 3, 4, 5, or 6.

In bis(alkenyl)ethers of Formula (6), each $R^2$ can independently be $C_{2-6}$ alkanediyl such as 1,2-ethane-diyl, 1,3-propane-diyl, 1,4-butane-diyl, 1,5-pentane-diyl, or 1,6-hexane-diyl.

In bis(alkenyl)ethers of Formula (6), each $R^2$ can be $-[(-CH_2-)_p-O-]_q-(-CH_2-)_r-$.

In bis(alkenyl)ethers of Formula (6), each $R^2$ can be $-[(-CH_2-)_p-O-]_q-(-CH_2-)_r-$, where each p can be 2, each r can be 2, and q can be 1, 2, 3, 4, or 5.

Examples of suitable bis(alkenyl)ethers include divinyl ether, ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether (TEG-DVE), tetraethylene glycol divinyl ether, and cyclohexanedimethanol divinyl ether.

Suitable bis(alkenyl)ethers include, for example, compounds having at least one oxyalkanediyl group, such as from 1 to 4 oxyalkanediyl groups, i.e., compounds in which m in Formula (6) is an integer from 1 to 4. In Formula (6), m can be an integer ranging from 2 to 4. It is also possible to employ commercially available divinyl ether mixtures that are characterized by a non-integer average value for the number of oxyalkanediyl units per molecule. Thus, m in Formula (6) can also take on rational number values, for example, ranging from 0 to 10.0, such as from 1.0 to 10.0, from 1.0 to 4.0, from 2.0 to 4.0 or from 2.1 to 3.9.

Examples of suitable bis(alkenyl)ethers include, divinyl ether, ethylene glycol divinyl ether (EG-DVE) ($R^2$ in Formula (6) is ethanediyl and m is 1), butanediol divinyl ether (BD-DVE) ($R^2$ in Formula (6) is butanediyl and m is 1), hexanediol divinyl ether (HD-DVE) ($R^2$ in Formula (6) is hexanediyl and m is 1), diethylene glycol divinyl ether (DEG-DVE) ($R^2$ in Formula (6) is ethanediyl and m is 2), triethylene glycol divinyl ether ($R^2$ in Formula (6) is ethanediyl and m is 3), tetraethylene glycol divinyl ether (TEG-DVE) ($R^2$ in Formula (6) is ethanediyl and m is 4), cyclohexanedimethanol divinyl ether, cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such divinyl ether monomers. A bis(alkenyl)ethers may have one or more pendant groups selected from alkyl groups, hydroxyl groups, alkoxy groups, and amino groups. A bis(alkenyl)ether can comprise an aliphatic bis(alkenyl)ether, a cycloaliphatic bis(alkenyl)ether or a combination thereof.

Bis(alkenyl)ethers in which $R^2$ in Formula (6) is $C_{3-6}$ branched alkanediyl may be prepared by reacting a polyhydroxyl compound with acetylene. Examples of divinyl ethers of this type include compounds in which $R^2$ in Formula (6) is an alkyl-substituted methanediyl group such as —CH(CH$_3$)— (for example Pluriol® blends such as Pluriol® E-200 divinyl ether (BASF Corporation), for which R$^2$ in Formula (6) is ethanediyl and m is 3.8) or an alkyl-substituted ethanediyl (for example —CH$_2$CH (CH$_3$)—such as DPE polymeric blends including DPE-2 and DPE-3, International Specialty Products).

Other useful bis(alkenyl)ethers include compounds in which R$^2$ in Formula (6) is polytetrahydrofuryl (poly-THF) or polyoxyalkanediyl, such as those having an average of about 3 monomer units.

A polyalkenyl can comprise a sulfur-containing bis(alkenyl)ether or a combination of sulfur-containing bis(alkenyl) ethers. A sulfur-containing bis(alkenyl)ether can have the structure of Formula (30):

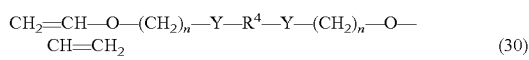

wherein,
each n can independently be an integer from 1 to 4;
each Y can independently be selected from —O— and —S—; and
R$^4$ can be selected from C$_{2-6}$ n-alkanediyl, C$_{3-6}$ branched alkanediyl, C$_{6-8}$ cycloalkanediyl, C$_{6-10}$ alkanecycloalkanediyl, and —[(—CH$_2$—)$_p$—X—]$_q$—(—CH$_2$—)$_r$—, wherein,
each X can independently be selected from —O—, —S—, and —S—S—;
p can be an integer from 2 to 6;
q can be an integer from 1 to 5; and
r can be an integer from 2 to 6; and
at least one Y' is —S—, or R$^4$ is —[(—CH$_2$—)$_p$—X—]$_q$—(—CH$_2$—)$_r$— and at least one X is —S— or —S—S—.

In sulfur-containing bis(alkenyl) ethers of Formula (30), each n can be 1, 2, 3, or 4.

In sulfur-containing bis(alkenyl) ethers of Formula (30), each Y can be —O— or each Y' can be —S—.

In sulfur-containing bis(alkenyl) ethers of Formula (30), R$^4$ can be C$_{2-6}$ n-alkanediyl, such as ethane-diyl, n-propanediyl, n-butane-diyl, n-pentane-diyl, or n-hexane-diyl.

In sulfur-containing bis(alkenyl) ethers of Formula (30), R$^4$ can be C$_{2-6}$ n-alkanediyl; both Y can be —S— or one Y can be —S— and the other Y can be —O—.

In sulfur-containing bis(alkenyl) ethers of Formula (30), R$^4$ can be —[(—CH$_2$—)$_p$—X—]$_q$—(—CH$_2$—)$_r$—.

In sulfur-containing bis(alkenyl) ethers of Formula (30), R$^4$ can be —[(—CH$_2$—)$_p$—X—]$_q$—(—CH$_2$—)$_r$—, where each X can be —O— or each X can be —S—S— or at least one X can be —O— or at least one X can be —S—S—.

In sulfur-containing bis(alkenyl) ethers of Formula (30), R$^4$ can be —[(—CH$_2$—)$_p$—X—]$_q$—(—CH$_2$—)$_r$—, where each X can be —S— or at least one X can be —S—.

In sulfur-containing bis(alkenyl) ethers of Formula (30), R$^4$ can be —[(—CH$_2$—)$_p$—X—]$_q$—(—CH$_2$—)$_r$—, where each p can be 2 and r can be 2.

In sulfur-containing bis(alkenyl) ethers of Formula (30), R$^4$ can be —[(—CH$_2$—)$_p$—X—]$_q$—(—CH$_2$—)$_r$—, where q can be 1, 2, 3, 4, or 5.

In sulfur-containing bis(alkenyl) ethers of Formula (30), R$^4$ can be —[(—CH$_2$—)$_p$—X—]$_q$—(—CH$_2$—)$_r$—, where each p can be 2, r can be 2, and q can be 1, 2, 3, 4, or 5.

In sulfur-containing bis(alkenyl) ethers of Formula (30), R$^4$ can be —[(—CH$_2$—)$_p$—X—]$_q$—(—CH$_2$—)$_r$—, where each X can be —S—; each p can be 2, r can be 2, and q can be 1, 2, 3, 4, or 5.

In sulfur-containing bis(alkenyl) ethers of Formula (30), R$^4$ can be —[(—CH$_2$—)$_p$—X—]$_q$—(—CH$_2$—)$_r$—, where each X can be —O—; each p can be 2, r can be 2, and q can be 1, 2, 3, 4, or 5.

In sulfur-containing bis(alkenyl) ethers of Formula (30), R$^4$ can be —[(—CH$_2$—)$_p$—X—]$_q$—(—CH$_2$—)$_r$—, where each X can be —O—; and each Y' can be —S—.

In sulfur-containing bis(alkenyl) ethers of Formula (30), R$^4$ can be —[(—CH$_2$—)$_p$—X—]$_q$—(—CH$_2$—)$_r$—, where each X can be —S—; and each Y' can be —O—.

In sulfur-containing bis(alkenyl) ethers of Formula (30), each n can be 2, each Y' can be independently selected from —O— and —S—, and R$^4$ can be —[(—CH$_2$—)$_p$—X—]$_q$—(—CH$_2$—)$_r$—, where each X can independently be selected from —O—, —S—, and —S—S—, p can be 2, q can be selected from 1 and 2, and r can be 2.

In sulfur-containing bis(alkenyl) ethers of Formula (30), each n can be 2, each Y' can be independently selected from —O— and —S—, and R$^4$ can be C$_{2-4}$ alkanediyl, such as ethanediyl, n-propanediyl, or n-butanediyl.

Sulfur-containing bis(alkenyl) ethers can comprise sulfur-containing bis(alkenyl) ethers of Formula (30a), Formula (30b), Formula (30c), Formula (30d), Formula (30e), Formula (30f), Formula (30g), Formula (30h), or a combination of any of the foregoing:

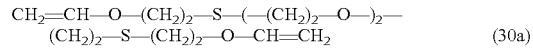

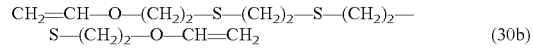

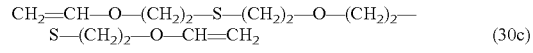

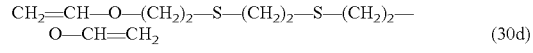

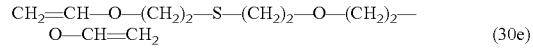

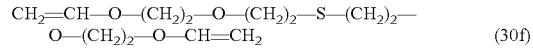

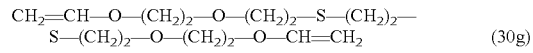

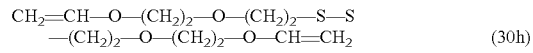

Examples of suitable sulfur-containing bis(alkenyl) ethers include 3,9,12,18-tetraoxa-6,15-dithiaicosa-1,19-diene, 3,6,15,18-tetraoxa-9,12-dithiaicosa-1,19-diene, 3,15-dioxa-6,9,12-trithiaheptadeca-1,16-diene, 3,9,15-trioxa-6,12-dithiaheptadeca-1,16-diene, 3,6,12,15-tetraoxa-9-thiaheptadeca-1,16-diene, 3,12-dioxa-6,9-dithiatetradeca-1,13-diene, 3,6,12-trioxa-9-thiatetradeca-1,13-diene, 3,6,13,16-tetraoxa-9,10-dithiaoctadeca-1,17-diene, and combinations of any of the foregoing.

A sulfur-containing bis(alkenyl) ether provided by the present disclosure can be liquid at room temperature. A sulfur-containing bis(alkenyl) ether can have a number average molecular weight from 200 Da to 2,000 Da, from 200 Da to 1,500 Da, from 200 Da to 1,000 Da, from 200 Da to 800 Da, or from 300 Da to 500 Da.

The synthesis of sulfur-containing bis(alkenyl)ethers is disclosed, for example, in PCT International Publication No. WO 2018/085650, which is incorporated by reference in its entirety.

Sulfur-containing bis(alkenyl) ethers of Formula (39) are difunctional. Sulfur-containing alkenyl ethers provided by the present disclosure can also include sulfur-containing polyalkenyl ethers having a functionality greater than two, such as a functionality from 3 to 6. Also, poly(alkenyl) ethers provided by the present disclosure can include poly (alkenyl) ethers having a functionality greater than two, such as a functionality from 3 to 6.

For example, a sulfur-containing poly(alkenyl) ether or poly(alkenyl) ether can have the structure of Formula (1):

$$B(-V)_z \qquad (1)$$

wherein,

B comprises a core of a z-valent polyfunctionalizing agent $B(-V)_z$;

z can be an integer from 3 to 6; and each —V can be a moiety comprising a terminal sulfur-containing alkenyl ether group, a terminal alkenyl ether group, or combination thereof, wherein at least one —V comprises a terminal sulfur-containing alkenyl group.

A multifunctional sulfur-containing alkenyl ether can be derived from a sulfur-containing bis(alkenyl) ether of Formula (39), by reacting a sulfur-containing bis(alkenyl) ether of Formula (39) with a polyfunctionalizing agent, where the polyfunctionalizing agent of comprises terminal groups reactive with alkenyl groups such as thiol groups. A multifunctional alkenyl ether can be derived from a bis(alkenyl) ether of Formula (6), by reacting a bis(alkenyl) ether of Formula (6) with a polyfunctionalizing agent, where the polyfunctionalizing agent of comprises terminal groups reactive with alkenyl groups such as thiol groups.

For example, a polyfunctional sulfur-containing poly(alkenyl) ether can have the structure of Formula (30i):

$$\{CH_2=CH-O-(CH_2)_n-Y-R^4-Y-(CH_2)_n-O-(CH_2)_2-V'-\}_zB \qquad (30i)$$

where n, Y, and $R^4$ are defined as in Formula (30), z and B are defined as in Formula (1), and —V'— can be derived from the reaction of —V with an alkenyl group.

In multifunctional sulfur-containing poly(alkenyl) ethers of Formula (30a), $B(-V)_z$ can be a polythiol such as any of those disclosed herein, such as 1,2,3-propane trithiol and isocyanurate-containing trithiols.

Multifunctional sulfur-containing poly(alkenyl) ethers of Formula (30a) can be prepared by reacting a sulfur-containing bis(alkenyl) ether of Formula (30) with a thiol-terminated polyfunctionalizing agent $B(-V)_z$ in the presence of a suitable catalyst such as an amine catalyst.

Similarly, multifunctional polyalkenyl ethers can have the structure of Formula (6b):

$$\{CH_2=CH-O-(-R^2-O-)_m-(CH_2)_2-V'-\}_zB \qquad (6b)$$

where m, z, $R^2$, V' and B are defined as in Formula (6) and Formula (30i).

A polyalkenyl can have an alkenyl functionality greater than 2, such as 3, 4, 5, or 6. Examples of suitable polyalkenyls include 1,3,5-triallyl-1,3,5-triazine-2,4,6(1H,3H,5H)-trione, and triallyl cyanurate (2,4,6-triallyloxy-1,3,5-triazine).

Compositions provided by the present disclosure can comprise a small molecule polyalkenyl.

A small molecule polyalkenyl can comprise a polyalkenyl having an alkenyl functionality greater than 2 such as an alkenyl functionality from 3 to 6, or a combination of any of the foregoing. A small molecule polyalkenyl can generally have a molecular weight less than that of a polyalkenyl prepolymer such as a molecular weight less than 1,000 Da, less than 800 Da, less than 600 Da, or less than 500 Da.

Examples of suitable alkenyl-terminated polyfunctionalizing agents include triallyl cyanurate (TAC), triallylisocyanurate (TAIC), 1,3,5-triallyl-1,3,5-triazinane-2,4,6-trione, 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

Compositions provided by the present disclosure can comprise from 0.01 wt % to 4 wt % of a monomeric polyalkenyl such as triakenyl, from 0.5 wt % to 3.5 wt %, from 1 wt % to 3 wt %, or from 1.5 wt % to 2.5 wt % of a monomeric polyalkenyl such as a trialkenyl, where wt % is based on the total weight of the composition.

A polyalkenyl prepolymer can comprise any suitable alkenyl terminated prepolymer. A polyalkenyl prepolymer can comprise an alkenyl-terminated sulfur-containing prepolymer such as an alkenyl-terminated polythioether prepolymer, an alkenyl-terminated polysulfide, and alkenyl-terminated sulfur-containing polyformal, or an alkenyl-terminated monosulfide. A polyalkenyl prepolymer can be prepared by reacting a compound having a terminal alkenyl group and a group reactive with a thiol, with a thiol-terminated prepolymer as disclosed herein. For example, a compound having a terminal alkenyl group and a group reactive with a thiol can be a small molecule polyalkenyl disclosed herein. An alkenyl-terminated polythioether can be prepared by the method disclosed herein for preparing thiol-terminated polythioethers modified such that there is an excess of alkenyl groups.

Curable compositions provided by the present disclosure can comprise a hydroxyl-functional vinyl ether or combination of hydroxyl-functional vinyl ethers.

A hydroxyl-functional vinyl ether can have the structure of Formula (31) or the structure of Formula (31a):

$$CH_2=CH-O-(CH_2)_t-OH \qquad (31)$$

$$CH_2=CH-O-R-OH \qquad (31a)$$

where t can be an integer from 2 to 10, and R can be substituted $C_{1-10}$ alkanediyl, $C_{5-6}$ cycloalkanediyl, or $C_{6-16}$ alkanecycloalkanediyl. The substituent courp in substituted $C_{1-10}$ akanediyl can be $C_{1-3}$ alkyl. In hydroxyl-functional vinyl ethers of Formula (31), t can be 1, 2, 3, 4, 5, or t can be 6. Examples of suitable hydroxyl-functional vinyl ethers include 1,4-cyclohexane dimethylol monovinyl ether, 1-methyl-3-hydroxypropyl vinyl ether, 4-hydroxybutyl vinyl ether, and a combination of any of the foregoing. A hydroxyl-functional vinyl ether can be 4-hydroxybutyl vinyl ether.

Curable compositions provided by the present disclosure can comprise, for example, from 0.1 wt % to 10 wt % of a hydroxyl-functional vinyl ether, from 0.2 wt % to 9 wt %, from 0.3 wt % to 0.7 wt % and from 0.4 wt % to 0.7 wt %, where wt % is based on the total weight of the curable composition.

Compositions provided by the present disclosure comprise an organoborane complex or a combination of organoborane complexes. An organoborane complex comprises an organoborane complexed with a ligand.

Compositions can comprise, for example, from 0.1 wt % to 4 wt % of an organoborane complex, from 0.5 wt % to 3.5 wt %, from 1 wt % to 3 wt %, or from 1.5 wt % to 2.5 wt % of an organoborane complex, where wt % is based on the total weight of the composition.

An organoborane complex can comprise an organoborane compound and a blocking ligand.

When the organoborane becomes unblocked, the organoborane can react with oxygen or an oxygen source to provide a source of radicals for promoting a free radical initiated reaction such as a thiol-ene polymerization reaction.

An organoborane radical initiator may be any organoborane compound known in the art capable of generating free radicals. Examples of suitable organoboranes include tri-functional boranes having the structure of Formula (32):

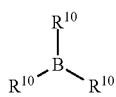 (32)

where each of $R^{10}$ can independently be selected from hydrogen, $C_{1-20}$ alkyl, $C_{1-20}$ alkoxy, $C_{5-10}$ cycloalkyl, and $C_{6-8}$ aryl. For example, each $R^{10}$ can be independently selected from $C_{1-20}$ alkyl, $C_{1-15}$ alkyl, $C_{1-10}$ alkyl, or $C_{1-5}$ alkyl.

Examples of suitable organoboranes include tri-methylborane, tri-ethylborane, tri-n-butylborane, tri-n-octylborane, tri-sec-butylborane, tri-dodecylborane, phenyldiethylborane, and combinations of any of the foregoing. An organoborane can comprise tri-n-butylborane.

An organoborane can be an organosilicon-functional organoborane and may include a functional group including at least one of a silicon atom, a siloxane oligomer, and a siloxane polymer. Examples of suitable organosilicon-functional organoboranes are described in PCT International Publication No. WO 2006/073695. An organosilicon-functional organoborane may include a complex including at least one a silicon atom, a siloxane oligomer, and/or a siloxane polymer.

An organoborane initiator can be derived from decomplexation of an air-stable complex of an organoborane compound and an organonitrogen compound. For example, an organoborane initiator can be derived from an organoborane-organonitrogen complex. Suitable organoborane initiators include, for example, organoborane-amine complexes, organoborane-azole complexes, organoborane-amidine complexes, organoborane-heterocyclic nitrogen complexes, amido-organoborate complexes, and combinations thereof. An organoborane-amine complex can comprise a trialkylborane-amine complex. Additional examples of suitable organoborane initiators are described in U.S. Publication No. 2007/0141267, U.S. Pat. No. 7,247,596, and PCT International Publication No. 2007044735. An organoborane-amine complex includes a complex formed between an organoborane and a suitable amine that renders the organoborane-amine complex stable at ambient conditions. Any suitable organoborane-amine complex known in the art may be used. An organoborane-amine complex can be capable of initiating polymerization or cross-linking of the radical curable organic compound through introduction of an amine-reactive compound, and/or by heating. For example, an organoborane-amine complex can be destabilized at ambient temperatures through exposure to suitable amine-reactive compounds. Heat may be applied if needed or desired. An organoborane-amine complex can have the structure of Formula (33):

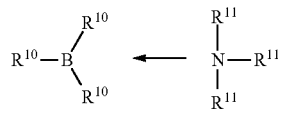 (33)

where $R^{11}$ can independently be selected from hydrogen, $C_{1-12}$ alkyl, $C_{1-12}$ heteroalkyl, $C_{1-12}$ cycloalkyl, $C_{5-12}$ heterocycloalkyl $C_{6-12}$, alkylaryl, an organosilane group, an organosiloxane group, a $C_{1-12}$ alkanediyl group capable of functioning as a covalent bridge to the boron, a divalent organosiloxane group capable of functioning as a covalent bridge to the boron, and halogen substituted homologues thereof, such that at least one of $R^{10}$ includes one or more silicon atoms and is covalently bonded to boron. In $C_{1-12}$ heteroalkyl and $C_{5-12}$ heterocycloalkyl the one or more heteroatoms can be O. Each $R^{11}$ can have the structure $(CH_2)_{n1}-O-(CH_2)_{n2}$, where n1 is an integer from 1 to 10, from 1 to 8, from 1 to 6, or from 1 to 4; and each n2 can be an integer from 1 to 8, from 1 to 6, from 1 to 4, or from 1 to 2.

Any suitable amine ligand can be used to form the organoborane-amine complex. Examples of suitable amines include at least one of an alkyl group, an alkoxy group, an imidazole group, an amidine group, an ureido group, and combinations thereof. Suitable amines include, for example, 1,3 propane diamine, 1,6-hexanediamine, methoxypropylamine, pyridine, isophorone diamine, 3-aminopropyltrimethoxysilane, aminomethyltrimethoxysilane, 3-aminopropyltriethoxysilane, aminomethyltriethoxysilane, 2-(trimethoxysilylethyl)pyridine, aminopropylsilanetriol, 3-(m-aminophenoxy)propyltrimethoxysilane, 3-aminopropyldiisopropylmethoxysilane, aminophenyltrimethoxysilane, 3-aminopropyltris(methoxyethoxethoxy)silane, tert-4-(2-aminoethyl)-3-aminopropyltrimethoxysilane, N-(6-aminohexyl)aminomethyltrimethoxysilane, N-(2-aminoethyl)-11-aminoundecyltrimethoxysilane, aminoethylaminomethylphenethyltrimethoxysilane, N-(2-aminoethyl)-3-aminopropylmethyldimethoxysilane, N-(2-aminoethyl)-3-aminoisobutylmethyldimethoxysilane, (3-trimethoxysilylpropyl)diethylene-triamine, 1,1,2,4-tetramethyl-1-sila-2-azacyclopentane, amine functional organopolysiloxanes including at least one amine functional group such as 3-aminopropyl, 6-aminohexyl, 11-aminoundecyl, 3-(N-allylamino)propyl, N-(2-aminoethyl)-3-aminopropyl, aminomethyl, N-(2-aminoethyl)-3-aminoisobutyl, p-aminophenyl, 2-ethylpyridinyl, and 3-propylpyrrolyl, nitrogen compounds including N-(3-triethyoxysilylpropyl)-4,5-dihydroimidazole, ureidopropyltriethoxysilane, and combinations of any of the foregoing. An amine ligand can be selected from amine-functional silanes, amine-functional organopolysiloxanes, and combinations thereof. In another embodiment, the amine includes N-(2-aminoethyl)-3-aminopropyltrimethoxysilane. An amine ligand can be selected from 2-methoxyethyl amine, 3-methoxypropyl amine, 4-methoxybutyl amine, and combinations of any of the foregoing.

An organoborane complex can be physically and/or chemically attached (bound) to a solid particle such as a phase support or an inorganic particle to control working times, as well as to stabilize liquid phase organoborane-amine complexes against separating during storage. Attachment can be accomplished by a number of known surface treatments either in-situ or a priori. Some surface treatment methods include pre-treating solid particles such as ground or precipitated silica, calcium carbonate, carbon black, carbon nanoparticles, silicon nanoparticles, barium sulfate, titanium dioxide, aluminum oxide, boron nitride, silver, gold, platinum, palladium, and alloys thereof, base metals such as nickel, aluminum, copper, and steel, and combinations thereof, with a condensation reactive compound. Some examples of condensation reactive compounds that may be used include, but are not limited to, isocyanatopropyltriethoxysilane, isocyanatomethyltriethoxysilane, triethoxysilylundecanal, glycidoxypropyltrimethoxysilane, glycidoxymethyltrimethoxysilane, 3-(triethoxysilyl)propylsuccinic anhydride, 2-(4-chlorosulfonylphenyl)ethyltrimethoxysilane, and combinations thereof. The pretreatment may be followed by complexation with the organoborane, or by direct treatment of the solid particles using a preformed organoborane initiator that is condensation reactive. If the solid particles include surface functional groups, additives such as surface treating agents or impurities that are inherently amine-reactive, may require appropriate precautions to avoid premature decomplexation of the organoborane-amine complex being attached. Solid particles including amine-reactive substances can be purified or neutralized before attachment of the organoborane initiator. Alternatively, the attachment of the organoborane initiator may be performed in an oxygen free environment.

In an organoborane-amine complex of Formula (33), each $R^{10}$ can independently be selected from $C_{1-6}$ alkyl, such as methyl, ethyl, n-propyl, n-butyl, n-pentyl, or n-hexyl; and each $R^{12}$ can be selected from methoxy n-substituted methoxy $C_{1-6}$ alkyl, such as methoxymethyl, methoxyethyl, methoxypropyl, and methoxybutyl.

Organoborane-amine complexes are capable of being deblocked in an acidic environment.

Examples of suitable organoborane complexes include trialkylborane-amine complexes such as tris(n-butyl)borane-3-methoxypropylamine, triethylborane-1,3-diaminopropane, and treiethylborane-diethylenetriamine, available, for example, from Callery.

Composition provided by the present disclosure can comprise a radical oxidizing agent or a combination of radical oxidizing agents.

Compositions provided by the present disclosure can comprise, for example, from 0.1 wt % to 4 wt %, from 0.5 wt % to 3.5 wt %, from 1 wt % to 3 wt % or from 1.5 wt % to 2.5 wt %, of a radical oxidizing agent, where wt % is based on the total weight of the composition.

Examples of suitable radical oxidizing agents include bis(tetrabutylammonium) persulfate (TBAPS), and other bis(tetraalkylammonium) persulfates such as bis(tetramethylammonium) persulfate, bis(tetraethylammonium) persulfate, bis(tributylmethylammonium) persulfate, and combinations of any of the foregoing.

TBAPS can be prepared by extraction of an aqueous solution of potassium peroxydisulfate and 2 eq of tetrabutylammonium hydrogensulfate, or by a metathesis reaction between tetrabutylammonium hydroxide (TBAOH, 1.0 M solution in methanol) and aqueous $(NH_4)_2S_2O_8)$.

A suitable radical oxidizing agent is capable of forming free radicals at room temperature and can serve as a source of oxygen for the generation of free radicals by the organoborane.

Bis(tetraalkylammonium) persulfates can be prepared according to the methods descried in *Tetrahedron*, 63, 2007, pp. 5184-5188, by reacting tetrabutyl ammonium hydroxide ($Bu_4NOH$) and ammonium perulfate ($(NH_4)_2S_2O_8$).

In certain compositions the radical oxidizing agent comprises tetrabutylammonium persulfate (TBAPS) and the organoborane complex comprises the tri-n-butylborane-3-methoxypropylamine complex (TnBB-MOPA).

Compositions provided by the present disclosure can comprise a plasticizer or combination of plasticizers.

Compositions can comprise a polybutadiene plasticizer. Other examples of suitable plasticizers include Jayflex™ DINP, Jayflex™ DIDP, Jayflex™ DIUP, and Jayflex™ DTDP available from Exxon Mobil.

Compositions provided by the present disclosure can comprise from 0.01 wt % to 3 wt % of a plasticizer, from 0.05 wt % to 2.5 wt %, from 0.1 wt % to 2 wt % or from 0.3 wt % to 1 wt % of a plasticizer, where wt % is based on the total weight of the composition.

Compositions provided by the present disclosure can include a photoinitiator or combination of photoinitiators. The radiation can be actinic radiation that can apply energy that can generate an initiating species from a photopolymerization initiator upon irradiation therewith, and widely includes α.-rays, γ-rays, X-rays, ultraviolet (UV) light, visible light, or an electron beam. For example, the photoinitiator can be a UV photoinitiator.

Examples of suitable UV photoinitiators include α-hydroxyketones, benzophenone, α,α.-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl O-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, and bisacyclphosphine oxide.

Examples of suitable benzophenone photoinitiators include 2-hydroxy-2-methyl-1-phenyl-1-propanone, 2-hydroxy-1,4,4-(2-hydroxyethoxy)phenyl]-2-methyl-1-propanone, α-dimethoxy-α-phenylacetophenone, 2-benzyl-2-(dimethylamino)-1-[4-(4-morpholinyl) phenyl]-1-butanone, and 2-methyl-1-[4-(methylthio)phenyl]-2-(4-morpholinyl)-1-propanone.

Examples of suitable oxime photoinitiators include (hydroxyimino)cyclohexane, 1-[4-(phenylthio)phenyl]-octane-1,2-dione-2-(O-benzoyloxime), 1-[9-ethyl-6-(2-methylbenzoyl)-9H-carbazol-3-yl]-ethanone-1-(O-acetyloxim-e), trichloromethyl-triazine derivatives), 4-(4-methoxystyryl)-2,6-trichloromethyl-1,3,5-triazine), 4-(4-methoxyphenyl)-2,6-trichloromethyl-1,3,5-triazine, and α-aminoketone (1-(4-morpholinophenyl)-2-dimethylamino-2-benzyl-butan-1-one).

Examples of suitable phosphine oxide photoinitiators include diphenyl (2,4,6-trimethylbenzoyl)-phosphine oxide (TPO) and phenylbis(2,4,6-trimethyl benzoyl) phosphine oxide (BAPO).

Other examples of suitable UV photoinitiators include the Irgacure® products from BASF, for example the products Irgacure® 184, Irgacure® 500, Irgacure® 1173, Irgacure® 2959, Irgacure® 745, Irgacure® 651, Irgacure® 369, Irgacure® 907, Irgacure® 1000, Irgacure® 1300, Irgacure® 819, Irgacure® 819DW, Irgacure® 2022, Irgacure® 2100, Irgacure® 784, and/or Irgacure® 250. Other suitable UV photoinitiators include Irgacure® MBF, Darocur® 1173, Darocur® TPO, and Darocur®4265.

A UV photoinitiator can comprise, for example, 2,2-dimethoxy-1,2-diphenylethan-1-one, 2,4,6-trimethylbenzoyl-diphenyl-phosphineoxide, or a combination thereof.

Other examples of suitable photoinitiators include Darocur® TPO, Lucirin® TPO (available from BASF), Speed-cure® TPO (available from Lambson), Irgacure® TPO, and Omnirad® (available from IGM Resins), and combinations of any of the foregoing.

Compositions provided by the present disclosure can comprise from 1 wt % to 5 wt %, from 1.5 wt % to 4.5 wt %, from 2 wt % to 4 wt %, from 2.5 wt % to 3.5 wt % of a UV photoinitiator or combination of UV photoinitiators, where wt % is based on the total weight of the composition.

Compositions provided by the present disclosure can comprise a filler or combination of filler. Suitable filler can comprise, inorganic filler, organic filler, lightweight filler, and combinations of any of the foregoing.

Curable compositions can comprise, for example, from 1 wt % to 70 wt %, from 15 wt % to 35 wt % filler, from 17 wt % tp 33 wt %, from 20 wt % to 30 wt % filler, or from 22 wt % to 28 wt %, where wt % is based on the total weight of the curable composition. Compositions provide by the present disclosure can comprise silica gel/amorphous silica, precipitated silica, fumed silica, precipitated calcium carbonate, calcium carbonate, micronized oxidized polyethylene homopolymer, and low-density microcapsules.

Filler can be selected to enhance UV transmissibility of the sealant. Generally, silica filler are more UV transparent than filler such as calcium carbonate.

A composition can comprise a sufficient amount of an acidic filler such that the pH of the sealant composition is sufficiently acidic as to deblock the organoborane complex. Silica filler such as fumed silica, silica gel/amorphous silica, precipitated silica can produce an acidic solution with a pH from 4 to 5 in an aqueous solvent.

Compositions and sealants provided by the present disclosure can comprise an inorganic filler or combination of inorganic filler. An inorganic filler can be included to provide mechanical reinforcement and to control the rheological properties of the composition. Inorganic filler may be added to compositions to impart desirable physical properties such as, for example, to increase the impact strength, to control the viscosity, or to modify the electrical properties of a cured composition. Inorganic filler useful in compositions provided by the present disclosure and useful for sealant applications such as aviation and aerospace sealant applications, include carbon black, calcium carbonate, precipitated calcium carbonate, calcium hydroxide, hydrated alumina (aluminum hydroxide), fumed silica, silica, precipitated silica, silica gel, micronized silica and combinations of any of the foregoing.

For example, an inorganic filler can include a combination calcium carbonate and fumed silica, and the calcium carbonate and fumed silica can be treated and/or untreated.

An inorganic filler can be coated or uncoated. For example, an inorganic filler can be coated with a hydrophobic coating, such as a coating of polydimethylsiloxane.

Compositions provided by the present disclosure can comprise form 10 wt % to 30 wt %, from 15 wt % to 25 wt %, or from 17 wt % to 23 wt % or a silica filler such as a silica gel, precipitated silica, fumed silica or a combination of any of the foregoing, where wt % is based on the total weight of the composition.

Compositions provided by the present disclosure can comprise silica gel or combination of silica gel. Suitable silica gel includes Gasil® silica gel available from PQ Corporation, and Sylysia®, CariAct® and Sylomask® silica gel available from Fuji Silysia Chemical Ltd. Compositions provided by the present disclosure can comprise, for example, from 5 wt % to 25 wt %, from 10 wt % to 20 wt %, or from 12 wt % to 18, of silica gel, where wt % is based on the total weight of the curable composition.

Compositions and sealants provided by the present disclosure can comprise an organic filler or a combination of organic filler. Organic filler can be selected to have a low specific gravity and to be resistant to solvents such as JRF Type I. Suitable organic filler can also have acceptable adhesion to the sulfur-containing polymer matrix. An organic filler can include solid powders or particles, hollow powders or particles, or a combination thereof.

An organic filler can have a specific gravity, for example, less than 1.15, less than 1.1, less than 1.05, less than 1, less than 0.95, less than 0.9, less than 0.8, or less than 0.7. Organic filler can have a specific gravity, for example, within a range from 0.85 to 1.15, within a range from 0.9 to 1.1, within a range from 0.9 to 1.05, or from 0.85 to 1.05.

Organic filler can comprise thermoplastics, thermosets, or a combination thereof. Examples of suitable thermoplastics and thermosets include epoxies, epoxy-amides, ethylene tetrafluoroethylene copolymers, nylons, polyethylenes, polypropylenes, polyethylene oxides, polypropylene oxides, polyvinylidene chlorides, polyvinylfluorides, tetrafluoroethylene, polyamides, polyimides, ethylene propylenes, perfluorohydrocarbons, fluoroethylenes, polycarbonates, polyetheretherketones, polyetherketones, polyphenylene oxides, polyphenylene sulfides, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing.

Examples of suitable organic filler include polyamides, polyimides, polyethylenes, polyphenylene sulfides, and combinations of any of the foregoing.

Examples of suitable polyamide 6 and polyamide 12 particles are available from Toray Plastics as grades SP-500, SP-10, TR-1, and TR-2. Suitable polyamide powders are also available from the Arkema Group under the tradename Orgasol®, and from Evonik Industries under the tradename Vestosin®.

Examples of suitable polyimide powders are available from Evonik Industries under the tradename P84®.

An organic filler can include a polyethylene powder, such as an oxidized polyethylene powder. Suitable polyethylene powders are available from Honeywell International, Inc. under the tradename ACumist®, from INEOS under the tradename Eltrex®, and Mitsui Chemicals America, Inc. under the tradename Mipelon™

The use of organic filler such as polyphenylene sulfide in aerospace sealants is disclosed in U.S. Pat. No. 9,422,451, which is incorporated by reference in its entirety. Polyphenylene sulfide is a thermoplastic engineering resin that exhibits dimensional stability, chemical resistance, and resistance to corrosive and high temperature environments. Polyphenylene sulfide engineering resins are commercially available, for example, under the tradenames Ryton® (Chevron), Techtron® (Quadrant), Fortron® (Celanese), and Torelina® (Toray). Polyphenylene sulfide resins are generally characterized by a specific gravity from about 1.3 to about 1.4.

An organic filler can have any suitable shape. For example, an organic filler can comprise fractions of crushed polymer that has been filtered to select a desired size range. An organic filler can comprise substantially spherical particles. The particles can be substantially spherical (referred to as powders) having an aspect ratio from 1:1 to 2:1, substantially non-spherical (referred to as particulates) having an aspect ratio greater than 2:1, or a combination thereof. Particles can be solid or can be porous.

An organic filler can have an average particle size, for example, within a range from 1 μm to 100 μm, 2 μm to 40 μm, from 2 μm to 30 μm, from 4 μm to 25 μm, from 4 μm to 20 μm, from 2 μm to 12 μm, or from 5 μm to 15 μm. An organic filler can have an average particle size, for example, less than 100 μm, less than 75 μm, less than 50 μm, less than 40 μm, or less than 20 μm. Particle size distribution can be determined according to ASTM E-2651-13.

An organic filler can include a low density such as a modified expanded thermoplastic microcapsules. Suitable modified expanded thermoplastic microcapsules can include an exterior coating of a melamine or urea/formaldehyde resin.

Compositions provided by the present disclosure can comprise low density microcapsules. A low-density microcapsule can comprise a thermally expandable microcapsule.

A thermally expandable microcapsule refers to a hollow shell comprising a volatile material that expands at a predetermined temperature. Thermally expandable thermoplastic microcapsules can have an average initial particle size of 5 μm to 70 μm, in some cases 10 μm to 24 μm, or from 10 μm to 17 μm.

The term "average initial particle size" refers to the average particle size (numerical weighted average of the particle size distribution) of the microcapsules prior to any expansion. The particle size distribution can be determined using a Fischer Sub-Sieve Sizer or by optical inspection.

A thermally expandable thermoplastic microcapsule can comprise a volatile hydrocarbon within a wall of a thermoplastic resin. Examples of hydrocarbons suitable for use in such microcapsules include methyl chloride, methyl bromide, trichloroethane, dichloroethane, n-butane, n-heptane, n-propane, n-hexane, n-pentane, isobutane, isopentane, isooctane, neopentane, petroleum ether, and aliphatic hydrocarbons containing fluorine, such as Freon™, and combinations of any of the foregoing.

Examples of materials suitable for forming the wall of a thermally expandable microcapsule include polymers of vinylidene chloride, acrylonitrile, styrene, polycarbonate, methyl methacrylate, ethyl acrylate, and vinyl acetate, copolymers of these monomers, and combinations of the polymers and copolymers. A crosslinking agent may be included with the materials forming the wall of a thermally expandable microcapsule.

Examples of suitable thermoplastic microcapsules include Expancel™ microcapsules such as Expancel™ DE microspheres available from AkzoNobel. Examples of suitable Expancel™ DE microspheres include Expancel™ 920 DE 40 and Expancel™ 920 DE 80. Suitable low-density microcapsules are also available from Kureha Corporation.

Suitable low-density filler such as low-density microcapsules can have a mean diameter (d0.5), for example, from 1 μm to 100 μm, from 10 μm to 80 μm, or from 10 μm to 50 μm, as determined according to ASTM D1475.

Low density filler such as low density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ASTM D1475. Low density filler such as low-density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to ASTM D1475.

Low density filler such as low microcapsules can be characterized by a mean particle diameter from 1 μm to 100 μm and can have a substantially spherical shape. Low density filler such as low-density microcapsules can be characterized, for example, by a mean particle diameter from 10 μm to 100 μm, from 10 μm to 60 μm, from 10 μm to 40 μm, or from 10 μm to 30 μm, as determined according to ASTM D1475.

Low density filler can comprise uncoated microcapsules, coated microcapsules, or combinations thereof.

Low density filler such as low-density microcapsules can comprise expanded microcapsules or microballoons having a coating of an aminoplast resin such as a melamine resin. Aminoplast resin-coated particles are described, for example, in U.S. Pat. No. 8,993,691, which is incorporated by reference in its entirety. Such microcapsules can be formed by heating a microcapsule comprising a blowing agent surrounded by a thermoplastic shell. Uncoated low-density microcapsules can be reacted with an aminoplast resin such as a urea/formaldehyde resin to provide a coating of a thermoset resin on the outer surface of the particle.

Low density filler such as low-density microcapsules can comprise thermally expandable thermoplastic microcapsules having an exterior coating of an aminoplast resin, such as a melamine resin. The coated low-density microcapsules can have an exterior coating of a melamine resin, where the coating can have a thickness, for example, less than 2 μm, less than 1 μm, or less than 0.5 μm. The melamine coating on the low-density microcapsules is believed to render the microcapsules reactive with the thiol-terminated polythioether prepolymer and/or the polyepoxide curing agent, which enhances the fuel resistance, and renders the microcapsules resistant to pressure.

The thin coating of an aminoplast resin can have a film thickness of less than 25 μm, less than 20 μm, less than 15 μm, or less than 5 μm. The thin coating of an aminoplast resin can have a film thickness of at least 0.1 nanometers, such as at least 10 nanometers, or at least 100 nanometers, or, in some cases, at least 500 nanometers.

Aminoplast resins can be based on the condensation products of formaldehyde, with an amino- or amido-group carrying substance. Condensation products can be obtained from the reaction of alcohols and formaldehyde with melamine, urea or benzoguanamine Condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines Examples of such compounds include N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris(ethylamino)-1,3,5 triazine. Suitable aminoplast resins can also be based on the condensation products of other aldehydes such as acetaldehyde, crotonaldehyde, acrolein, benzaldehyde, furfural, and glyoxal.

An aminoplast resin can comprise an alkylated, low-imino aminoplast resin which has a degree of polymerization less than 3.75, such as less than 3.0, or less than 2.0. The number average degree of polymerization can be defined as the average number of structural units per polymer chain. For example, a degree of polymerization of 1.0 indicates a completely monomeric triazine structure, while a degree of polymerization of 2.0 indicates two triazine rings joined by a methylene or methylene-oxy bridge.

Degree of polymerization represents an average degree of polymerization value as determined by gel permeation chromatography using polystyrene standards.

An aminoplast resin can contain methylol or other alkylol groups, and at least a portion of the alkylol groups can be etherified by reaction with an alcohol. Examples of suitable monohydric alcohols include alcohols such as methanol, ethanol, propanol, butanol, pentanol, hexanol, heptanol, benzyl alcohol, other aromatic alcohols, cyclic alcohols such as cyclohexanol, monoethers of glycols, and halogen-substituted or other substituted alcohols, such as 3-chloropropanol and butoxyethanol. Aminoplast resins can be substantially alkylated with methanol or butanol.

An aminoplast resin can comprise a melamine resin. Examples of suitable melamine resins include methylated melamine resins (hexamethoxymethylmelamine), mixed ether melamine resins, butylated melamine resins, urea resins, butylated urea resins, benzoguanamine and glycoluril resins, and formaldehyde free resins. Such resins are available, for example, from Allnex Group and Hexion.

Examples of suitable melamine resins include methylated melamine resins such as Cymel™ 300, Cymel™ 301, Cymel™ 303LF, Cymel™ 303ULF, Cymel™ 304, Cymel™ 350, Cymel 3745, Cymel™ XW-3106, Cymel™ MM-100, Cymel™ 370, Cymel™ 373, Cymel™ 380, ASTRO MEL™601, ASTRO MEL™ 601ULF, ASTRO MEL™400, ASTRO MEL™ NVV-3A, Aricel PC-6A, ASTRO MEL™ CR-1, and ASTRO SET™ 90.

A suitable aminoplast resin can comprise a urea-formaldehyde resin.

Aminoplast resin-coated particles are distinct from uncoated particles that are merely incorporated into a polymer network, such as is the case when uncoated low-density particles are dispersed in a film-forming binder. For aminoplast resin-coated particles, a thin film is deposited on the exterior surface of individual discrete particles such as thermally expanded microcapsules. These aminoplast resin-coated particles may then be dispersed in a film-forming binder, thereby resulting in dispersion of the coated particles throughout a polymer network. The thin coating of an aminoplast resin can cover, for example from 70% to 100%, from 80% to 100%, or from 90% to 100% of the exterior surface of a low-density particle such as a thermally expanded microcapsule. The coating of an aminoplast resin can form a substantially continuous covering on the exterior surface of a low-density particle.

Low density microcapsules can be prepared by any suitable technique, including, for example, as described U.S. Pat. Nos. 8,816,023 and 8,993,691, each of which is incorporated by reference in its entirety. Coated low density microcapsules can be obtained, for example, by preparing an aqueous dispersion of microcapsules in water with a melamine resin, under stirring. A catalyst may then be added and the dispersion heated to, for example, a temperature from 50° C. to 80° C. Low density microcapsules such as thermally expanded microcapsules having a polyacrylonitrile shell, de-ionized water and an aminoplast resin such as a melamine resin can be combined and mixed. A 10% w/w solution of para-toluene sulfuric acid in distilled water can then be added and the mixture reacted at 60° C. for about 2 hours. Saturated sodium bicarbonate can then be added and the mixture stirred for 10 minutes. The solids can be filtered, rinsed with distilled water, and dried overnight at room temperature. The resulting powder of aminoplast resin-coated microcapsules can then be sifted through a 250 μm sieve to remove and separate agglomerates.

Prior to application of an aminoplast resin coating, a thermally-expanded thermoplastic microcapsule can be characterized by a specific gravity, for example, within a range from 0.01 to 0.05, within a range from 0.015 to 0.045, within a range from 0.02 to 0.04, or within a range from 0.025 to 0.035, wherein the specific gravity is determined according to ASTM D1475. For example, Expancel™920 DE 40 and Expancel™ 920 DE 80 can be characterized by a specific gravity of about 0.03, wherein the specific gravity is determined according to ASTM D1475.

Following coating with an aminoplast resin, an aminoplast-coated microcapsule can be characterized by a specific gravity, for example, within a range from 0.02 to 0.08, within a range from 0.02 to 0.07, within a range from 0.02 to 0.06, within a range from 0.03 to 0.07, within a range from 0.03 to 0.065, within a range from 0.04 to 0.065, within a range from 0.045 to 0.06, or within a range from 0.05 to 0.06, wherein the specific gravity is determined according to ASTM D1475.

Compositions provided by the present disclose can comprise micronized oxidized polyethylene homopolymer. An organic filler can include a polyethylenes, such as an oxidized polyethylene powder. Suitable polyethylenes are available, for example, from Honeywell International, Inc. under the tradename ACumist®, from INEOS under the tradename Eltrex®, and Mitsui Chemicals America, Inc. under the tradename Mipelon™

Compositions provided by the present disclosure can comprise micronized oxidized polyethylene homopolymer, fumed silica, silica gel/amorphous silica, low-density with filler, precipitated calcium carbonate, or a combination of any of the foregoing. Low density filler can have a specific gravity, for example, less than 1.0, less than 0.9, less than 0.7, less than 0.5, less than 0.3, or less than 0.1.

Compositions and sealants provided by the present disclosure can include an adhesion promoter or combination of adhesion promoters.

Curable compositions provided by the present disclosure can comprise, for example, less than 1 wt % of an adhesion promoter, less than 1 wt %, less than 3 wt % or less than 4 wt % of an adhesion promoter, where wt % is based on the total weight of the curable composition. A curable composition provided by the present disclosure can comprise, for example from 0.1 wt % to 5 wt %, from 0.5 wt % to 4 wt %, from 1 wt % to 3 wt % of an adhesion promoter, where wt % is based on the total weight of the composition.

Low density compositions provided by the present disclosure can comprise an adhesion promoter or combination of adhesion promoters. An adhesion promoter can include a phenolic adhesion promoter, a combination of phenolic adhesion promoters, an organo-functional alkoxysilane, a combination of organo-functional alkoxysilanes, or a combination of any of the foregoing. An organo-functional alkoxysilane can be an amine-functional alkoxysilane.

The use of amino-functional alkoxysilane adhesion promoters can be used to control the acidity of a sealant composition.

Compositions and sealants provided by the present disclosure can comprise a phenolic adhesion promoter, an organo-functional alkoxysilane, or a combination thereof. A phenolic adhesion promoter can comprise a cooked phenolic resin, an un-cooked phenolic resin, or a combination thereof. Examples of suitable adhesion promoters include phenolic resins such as Methylon® phenolic resin, and organosilanes, such as epoxy-, mercapto- or amine-functional silanes, such as Silquest® organosilanes. A cooked phenolic comprises the reaction product of a phenolic resin and a thiol-terminated sulfur-containing prepolymer.

Phenolic adhesion promoters can comprise the reaction product of a condensation reaction of a phenolic resin with one or more thiol-terminated polysulfides. Phenolic adhesion promoters can be thiol-terminated.

Examples of phenolic resins include 2-(hydroxymethyl)phenol, (4-hydroxy-1,3-phenylene)dimethanol, (2-hydroxybenzene-1,3,4-triyl) trimethanol, 2-benzyl-6-(hydroxymethyl)phenol, (4-hydroxy-5-((2-hydroxy-5-(hydroxymethyl)cyclohexa-2,4-dien-1-yl)methyl)-1,3-phenylene) dimethanol, (4-hydroxy-5-((2-hydroxy-3,5-bis(hydroxymethyl)cyclohexa-2,4-dien-1-yl)methyl)-1,3-phenylene)dimethanol, and a combination of any of the foregoing.

Suitable phenolic resins can be synthesized by the base-catalyzed reaction of phenol with formaldehyde.

Phenolic adhesion promoters can comprise the reaction product of a condensation reaction of a Methylon® resin, a Varcum® resin, or a Durez® resin available from Durez Corporation with a thiol-terminated polysulfide such as a Thioplast® resin.

Examples of Methylon® resins include Methylon® 75108 (allyl ether of methylol phenol, see U.S. Pat. No. 3,517,082) and Methylon® 75202.

Examples of Varcum® resins include Varcum® 29101, Varcum® 29108, Varcum® 29112, Varcum® 29116, Varcum® 29008, Varcum® 29202, Varcum® 29401, Varcum® 29159, Varcum®29181, Varcum® 92600, Varcum® 94635, Varcum® 94879, and Varcum® 94917.

An example of a Durez® resin is Durez® 34071.

Compositions provided by the present disclosure can comprise an organo-functional adhesion promoter such as an organo-functional alkoxysilane. An organo-functional alkoxysilane can comprise hydrolysable groups bonded to a silicon atom and at least one organofunctional group. An organo-functional alkoxysilane can have the structure $R^{12}$—$(CH_2)_n$—$Si(-OR)_{3-n}R_n$, where $R^{12}$ is an organofunctional group, n is 0, 1, or 2, and R is alkyl such as methyl or ethyl. Examples of organofunctional groups include epoxy, amino, methacryloxy, or sulfide groups. An organofunctional alkoxysilane can be a dipodal alkoxysilane having two or more alkoxysilane groups, a functional dipodal alkoxysilane, a non-functional dipodal alkoxysilane or a combination of any of the foregoing. An organofunctional alkoxysilane can be a combination of a monoalkoxysilane and a dipodal alkoxysilane. For amino functional alkoxysilanes, $R^{12}$ can be —$NH_2$.

An amine-functional alkoxysilane can comprise a primary amine-functional alkoxysilane, a secondary amine-functional alkoxysilane, or a combination thereof. A primary amine-functional alkoxysilane refers to a alkoxysilane having primary amino group. A secondary amine-functional alkoxysilane refers to a alkoxysilane having a secondary amine group. An amine-functional alkoxysilane can comprise, for example, from 40 wt % to 60 wt % of a primary amine-functional alkoxysilane; and from 40 wt % to 60 wt % of a secondary amine-functional alkoxysilane; from 45 wt % to 55 wt % of a primary amine-functional alkoxysilane and from 45 wt % to 55 wt % of a secondary amine-functional alkoxysilane; or from 47 wt % to 53 wt % of a primary amine-functional alkoxysilane and from 47 wt % to 53 wt % of a secondary amine-functional alkoxysilane; where wt % is based on the total weight of the amine-functional alkoxysilane in a composition.

A secondary amine-functional alkoxysilane can be a sterically hindered amine-functional alkoxysilane. In a sterically hindered amine-functional alkoxysilane the secondary amine can be adjacent to a large group or moiety that limits or restricts the degrees of freedom of the secondary amine compared to the degrees of freedom for a non-sterically hindered secondary amine. For example, in a sterically hindered secondary amine, the secondary amine can be adjacent to a phenyl group, a cyclohexyl group, or a branched alkyl group.

Amine-functional alkoxysilanes can be monomeric amine-functional alkoxysilanes having a molecular weight, for example, from 100 Da to 1000 Da, from 100 Da to 800 Da, from 100 Da to 600 Da, or from 200 Da to 500 Da.

Examples of suitable primary amine-functional alkoxysilanes include 4-aminobutyltriethoxysilane, 4-amino-3,3-dimethylbutyltrimethoxysilane, N-(2-aminoethyl)-3-aminopropyltriethoxysilane, 3(m-aminophenoxy)propyltrimethoxysilane, m-aminophenyltrimethoxysilane, p-aminophenyltrimethoxysilane, 3-aminopropyltriethoxysilane, 3-aminopropyltrimethoxysilane, 3-aminopropyltris(methoxyethoxyethoxy)silane, 11-aminoundecyltriethoxysilane, 2-(4-pyridylethyl)triethoxysilane, 2-(2-pyridylethyltrimethoxysilane, N-(3-trimethoxysilylpropyl)pyrrole, 3-aminopropylsilanetriol, 4-amino-3,3-dimethylbutylmethyldimethoxysilane, 3-aminopropylmethyldiethoxysilane, 1-amino-2-(dimethylethoxysilyl)propane, 3-aminopropyldiisopropylene ethoxysilane, and 3-aminopropyldimethylethoxysilane.

Examples of suitable diamine-functional silanes include aminoethylaminomethyl)phenethyltrimethoxysilane N-(2-aminoethyl)-3-aminopropyltrimethoxysilane, and n-(β-aminoethyl) γ-aminopropyltrimethoxy silane.

Examples of suitable secondary amine-functional silanes include 3-(N-allylamino)propyltrimethoxysilane, n-butylaminopropyltrimethoxysilane, tert-butylaminopropyltrimethoxysilane, (N,N-cylohexylaminomethyl)methyldiethoxysilane, (N-cyclohexylaminomethyl)triethoxysilane, (N-cyclohexylaminopropyl)trimethoxysilane, (3-(n-ethylamino)isobutyl)methyldiethoxysilane, (3-(N-ethylamino)isobutyl)trimethoxysilane, N-methylaminopropylmethyldimethoxysilane, N-methylaminopropyltrimethoxysilane, (phenylaminomethyl)methyldimethoxysilane, N-phenylaminomethyltriethoxysilane, and N-phenylaminopropyltrimethoxysilane.

Examples of suitable amino-functional silanes under the Silquest® tradename include Silquest® A-1100 (γ-aminopropyltriethoxysilane), Silquest® A-1108 (γ-aminopropylsilsesquioxane), Silquest® A 1110 (γ-aminopropyltrimethoxysilane), Silquest® 1120 (N-β-(aminoethyl)-γ-aminopropyltrimethoxysilane), Silquest® 1128 (benzylamino-silane), Silquest® A-1130 (triaminofunctional silane), Silquest® Y-11699 (bis-(γ-triethoxysilylpropyl)amine), Silquest® A-1170 (bis-(γ-trimethoxysilylpropyl)amine), Silquest® A-1387 (polyazamide), Silquest® Y-19139 (ethoxy based polyazamide), and Silquest® A-2120 (N-β-(aminoethyl)-γ-aminopropylmethyldimethoxysilane).

Suitable amine-functional alkoxysilanes are commercially available, for example, from Gelest Inc, from Dow Corning Corporation, and Momentive.

An organo-functional alkoxysilane can be a mercapto-functional alkoxysilane including, for example 3-mercaptopropyltriethoxysilane, 3-mercaptopropyltriemthoxysilane, 11-mercaptoundecyltrimethoxysilane, 3-mercaptopropylmethyldimethoxysilane, and combinations of any of the foregoing.

Curable compositions provided by the present disclosure can comprise less than 3 wt % of an adhesion promoter, less than 2 wt %, less than 1 wt % or less than 0.5 wt %, where wt % is based on the total weight of the curable composition.

Compositions provided by the present disclosure can have a pH sufficient to deblock the organoborane radical initiator. Deblocking of the organoborane complex is favored by an acidic pH.

The pH of the curable composition can be established by the typical components added to a sealant composition or by including an additional acidic component.

For example, the filler can provide a sufficient pH to deblock the organoborane radical initiator.

For example, the pH of a 4% aqueous slurry of Cab-O-Sil® (D-171) is between 3.7 to 4.3. When included in a curable composition in an amount from 15 wt % to 25 wt %, the pH is sufficiently acidic to deblock the organoborane radical initiator.

For example, the pH of a composition can be from 3 to 6, from 3.5 to 4.5, or from 3 to 4.

Compositions provided by the present disclosure can comprise a photochromic agent sensitive to the degree of cure or the extent of exposure to actinic radiation. A cure indicator can change color upon exposure to actinic radiation, which can be permanent or reversible. A cure indicator can be initially transparent and become colored upon exposure to actinic radiation or can be initially colored and become transparent upon exposure to actinic radiation.

Compositions provided by the present disclosure may be formulated as sealants. By formulated is meant that in addition to the reactive species forming the cured polymer network, additional material can be added to a composition to impart desired properties to the uncured sealant and/or to the cured sealant. For the uncured sealant these properties can include viscosity, pH, and/or rheology. For cured sealants, these properties can include specific gravity, adhesion, corrosion resistance, color, glass transition temperature, electrical conductivity, cohesion, and/or physical properties such as tensile strength, elongation, and hardness. Compositions provided by the present disclosure may comprise one or more additional components suitable for use in sealants such as vehicle and aerospace sealants and depend at least in part on the desired performance characteristics of the cured sealant under conditions of use.

Curable compositions provided by the present disclosure can comprise from 40 wt % to 80 wt % of a thiol-terminated sulfur-containing prepolymer, from 1 wt % to 9 wt % of a polyalkenyl, from 0.5 wt % to 4 wt % of an organoborane-complex, and from 0.5 wt % to 4 wt % of a radical oxidizing agent, where wt % is based on the total weight of the curable composition.

Curable compositions provided by the present disclosure can comprise from 45 wt % to 75 wt % of a thiol-terminated sulfur-containing prepolymer, from 3 wt % to 7 wt % of a polyalkenyl, from 1 wt % to 3 wt % of an organoborane-complex, and from 1 wt % to 3 wt % of a radical oxidizing agent, where wt % is based on the total weight of the curable composition.

Curable compositions provided by the present disclosure can comprise from 50 wt % to 70 wt % of a thiol-terminated sulfur-containing prepolymer, from 4 wt % to 6 wt % of a polyalkenyl, from 1.5 wt % to 2.5 wt % of an organoborane-complex, and from 1.5 wt % to 2.5 wt % of a radical oxidizing agent, where wt % is based on the total weight of the curable composition.

Curable compositions provided by the present disclosure can comprise from 40 wt % to 80 wt % of a thiol-terminated sulfur-containing prepolymer, from 1 wt % to 9 wt % of a polyalkenyl, from 0.5 wt % to 4 wt % of an organoborane-complex, from 0.5 wt % to 4 wt % of a radical oxidizing agent, and from 15 wt % to 35 wt % of an inorganic filler, where wt % is based on the total weight of the curable composition.

Curable compositions provided by the present disclosure can comprise from 45 wt % to 75 wt % of a thiol-terminated sulfur-containing prepolymer, from 3 wt % to 7 wt % of a polyalkenyl, from 1 wt % to 3 wt % of an organoborane-complex, from 1 wt % to 3 wt % of a radical oxidizing agent, and from 20 wt % to 30 wt % of an inorganic filler, where wt % is based on the total weight of the curable composition.

Curable compositions provided by the present disclosure can comprise from 50 wt % to 70 wt % of a thiol-terminated sulfur-containing prepolymer, from 4 wt % to 6 wt % of a polyalkenyl, from 1.5 wt % to 2.5 wt % of an organoborane-complex, from 1.5 wt % to 2.5 wt % of a radical oxidizing agent, and from 22 wt % to 28 wt % of an inorganic filler, where wt % is based on the total weight of the curable composition.

Compositions provided by the present disclosure can further comprise a UV photoinitiator such as from 0.02 wt % to 1 wt %, from 0.04 wt % to 0.5 wt %, or from 0.6 wt % to 0.3 wt % of a photoinitiators, where wt % is based on the total weight of the curable composition.

Compositions provided by the present disclosure can further comprise an organo-functional alkoxysilane such as an amino-functional alkoxysilane such as from 0.1 wt % to 4 wt %, from 0.5 wt % to 3.5 wt %, from 1 wt % to 3 wt %, or from 1.5 wt % to 2.5 wt % of an organo-functional alkoxysilane, where wt % is based on the total weight of the curable composition.

Uncured sealants provided by the present disclosure can be provided as a three-part system comprising a first part, a second part, and a third part which can be prepared and stored separately, combined, and mixed at the time of use.

A first part of the sealant system can comprise a thiol-terminated sulfur-containing prepolymer, inorganic filler, a monomeric polythiol, and an organofunctional alkoxysilane.

A second part of a sealant system can comprise a polyalkenyl, a UV photoinitiator, a plasticizer and filler.

A third part can comprise an organoborane complex. A fourth part can comprise a radical oxidizing agent. The organoborane complex and oxidizing agent can be provided in an organic solvent, such as a from 5 wt % to 15 wt % in an organic solvent such as chloroform or cyclohexane.

To facilitate homogeneous mixing, it can be desirable that the viscosity of the first and second parts be similar.

Alternatively, the first part and the second part can be combined, and individually the amino-functional alkoxysilane, the organoborane complex, and the radical oxidizing agent can be sequentially combined with first and second parts.

Curable compositions provided by the present disclosure can be used as sealants or coatings such as for a vehicle and aerospace, and in particular, as sealants or coatings where resistance to hydraulic fluid is desired. A sealant refers to a curable composition that has the ability when cured to resist atmospheric conditions such as moisture (e.g., from 5% RH to 100% RH) and temperature (e.g., from −30° C. to 40° C.) and at least partially block the transmission of materials such as water, water vapor, fuel, solvents, and/or liquids and gases.

Compositions provided by the present disclosure may be applied directly onto the surface of a substrate or over an underlayer such as a primer by any suitable coating process.

Furthermore, methods are provided for sealing an aperture utilizing a composition provided by the present disclosure. These methods comprise, for example, applying the curable composition to at least one surface of a part; and curing the applied composition to provide a sealed part.

Compositions, including sealants, provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy; urethane; graphite; fiberglass composite; Kevlar®; acrylics; and polycarbonates. Compositions provided by the present disclosure may be applied to a substrate such as aluminum and aluminum alloy.

Sealant compositions provided by the present disclosure may be formulated as Class A, Class B, or Class C sealants. A Class A sealant refers to a brushable sealant having a viscosity of 1 poise to 500 poise (0.1 Pa-sec to 50 Pa-sec) and is designed for brush application. A Class B sealant refers to an extrudable sealant having a viscosity from 4,500 poise to 20,000 poise (450 Pa-sec to 2,000 Pa-sec) and is designed for application by extrusion via a pneumatic gun. A Class B sealant can be used form fillets and sealing on vertical surfaces or edges where low slump/slag is required. A Class C sealant has a viscosity from 500 poise to 4,500 poise (50 Pa-sec to 450 Pa-sec) and is designed for application by a roller or combed tooth spreader. A Class C sealant can be used for fay surface sealing. Viscosity can be measured according to Section 5.3 of SAE Aerospace Standard AS5127/1C published by SAE International Group.

Compositions provided by the present disclosure may be applied directly onto the surface of a substrate or over an underlayer by any suitable coating process known to those of ordinary skill in the art.

Furthermore, methods are provided for sealing an aperture utilizing a composition provided by the present disclosure. These methods comprise, for example, providing the curable composition of the present disclosure; applying the curable composition to at least one surface of a part; and curing the applied composition to provide a sealed part.

Compositions, including sealants, provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy; urethane; graphite; fiberglass composite; Kevlar®; acrylics; and polycarbonates. Compositions provided by the present disclosure may be applied to a substrate such as aluminum and aluminum alloy.

A composition provided by the present disclosure may be cured under ambient conditions, where ambient conditions refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 25° C. The methods may be used to seal apertures on aerospace vehicles including aircraft and aerospace vehicles.

Apertures, surfaces, joints, fillets, fay surfaces including apertures, surfaces, fillets, joints, and fay surfaces of aerospace vehicles, sealed with compositions provided by the present disclosure are also disclosed. The compositions and sealants can also be used to seal fasteners.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within about 3 days to about 7 days following mixing and application to a surface. In general, full adhesion strength as well as other properties of cured compositions of the present disclosure becomes fully developed up to 7 days following mixing and application of a curable composition to a surface.

A cured composition can have a thickness, for example, from 5 mils to 25 mils (127 µm to 635 µm) such as from 10 mils to 20 mils (254 µm to 508 µm).

The free radical photopolymerization reaction can be initiated by exposing a composition provided by the present disclosure to actinic radiation such as UV radiation, for example, for less than 120 seconds, less than 90 seconds, less than 60 seconds, or less than 30 seconds.

The free radical photopolymerization reaction can be initiated by exposing a composition provided by the present disclosure to actinic radiation such as UV radiation, for example, for from 15 seconds to 120 seconds, from 15 seconds to 90 seconds, for rom 15 seconds to 60 seconds.

The UV radiation can include irradiation at a wavelength at 394 nm.

The total power of the UV exposure can be, for example, from 50 mW/cm$^2$ to 500 mW/cm$^2$, from 50 mW/cm$^2$ to 400 mW/cm$^2$, from 50 mW/cm$^2$ to 300 mW/cm$^2$, from 100 mW/cm$^2$ to 300 mW/cm$^2$, or from 150 mW/cm$^2$ to 250 mW/cm$^2$.

Compositions provided by the present disclosure are curable without exposure to actinic radiation such as UV radiation. Composition can be at least partly curable upon exposure to actinic radiation and such compositions can include a photoionization. The actinic radiation such as UV radiation can be applied to at least a portion of an applied sealant. The sealant can be accessible to the actinic radiation and the portion of sealant exposed to the UV radiation can be cured to a certain depth below the surface. For example, the actinic radiation can be initiated the photopolymerization reaction to a depth, for example, of at least 4 mm, at least 6 mm, at least 8 mm, or at least 10 mm A portion of the sealant may not be accessible to actinic radiation either because of absorption or scattering of the actinic radiation of the sealant which prevents the actinic radiant from interacting with the full thickness of the sealant. A portion of the sealant may be obscured by the geometry of the part being sealed or may be obscured by an overlying structure.

Cured compositions provided by the present disclosure, such as cured sealants, exhibit properties acceptable for use in vehicle and aerospace sealant applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi (2.75 MPa); tear strength greater than 50 pounds per linear inch (pli) (8.75 N/mm); elongation between 250% and 300%; and hardness greater than 40 Durometer A. These and other cured sealant properties appropriate for aviation and aerospace applications are disclosed in AMS 3265B, which is incorporated by reference in its entirety. It is also desirable that, when cured, compositions of the present disclosure used in aviation and aircraft applications exhibit a percent volume swell not greater than 25% following immersion for one week at 60° C. (140° F.) and ambient pressure in Jet Reference Fluid (JRF) Type 1. Other properties, ranges, and/or thresholds may be appropriate for other sealant applications.

Cured compositions provided by the present disclosure can be fuel-resistant. The term "fuel resistant" means that a composition, when applied to a substrate and cured, can provide a cured product, such as a sealant, that exhibits a percent volume swell of not greater than 40%, in some cases not greater than 25%, in some cases not greater than 20%, and in other cases not more than 10%, after immersion for one week at 140° F. (60° C.) and ambient pressure in JRF Type I according to methods described in ASTM D792 (American Society for Testing and Materials) or AMS 3269 (Aerospace Material Specification).

JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1 etc., available from SAE (Society of Automotive Engineers)).

Compositions provided by the present disclosure provide a cured product, such as a sealant, exhibiting a tensile elongation of at least 200% and a tensile strength of at least 200 psi when measured in accordance with the procedure described in AMS 3279, § 3.3.17.1, test procedure AS5127/1, § 7.7. In general, for a Class A sealant there is no tensile and elongation requirement. For a Class B sealant, as a general requirement, tensile strength is equal to or greater than 200 psi (1.38 MPa) and elongation is equal to or greater than 200%. Acceptable elongation and tensile strength can be different depending on the application.

Compositions provide a cured product, such as a sealant, that exhibits a lap shear strength of greater than 200 psi (1.38 MPa), such as at least 220 psi (1.52 MPa), at least 250 psi (1.72 MPa), and, in some cases, at least 400 psi (2.76 MPa), when measured according to the procedure described in SAE AS5127/1 paragraph 7.8.

A cured sealant prepared from a composition provided by the present disclosure meets or exceeds the requirements for aerospace sealants as set forth in AMS 3277.

Apertures, surfaces, joints, fillets, fay surfaces including apertures, surfaces, fillets, joints, and fay surfaces of aerospace vehicles, sealed with compositions provided by the present disclosure are also disclosed.

Compositions provided by the present disclosure can be used to seal a part including a surface of a vehicle.

The term "vehicle" is used in its broadest sense and includes all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft.

A composition provided by the present disclosure can be used in a F/A-18 jet or related aircraft such as the F/A-18E Super Hornet and F/A-18F; in the Boeing 787 Dreamliner, 737, 747, 717 passenger jet aircraft, a related aircraft (produced by Boeing Commercial Airplanes); in the V-22 Osprey; VH-92, S 92, and related aircraft (produced by NAVAIR and Sikorsky); in the G650, G600, G550, G500, G450, and related aircraft (produced by Gulfstream); and in the A350, A320, A330, and related aircraft (produced by Airbus). Compositions provided by the present disclosure can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

Compositions provided by the present disclosure can be used to seal parts and surfaces of vehicles such as fuel tank surfaces and other surfaces exposed to or potentially exposed to aerospace solvents, aerospace hydraulic fluids, and aerospace fuels.

The present invention includes parts sealed with a composition provided by the present disclosure, and assemblies and apparatus comprising a part sealed with a composition provided by the present disclosure.

The present invention includes vehicles comprising a part such as a surface sealed with a composition provided by the present disclosure. For example, an aircraft comprising a fuel tank or portion of a fuel tank sealed with a sealant provided by the present disclosure is included within the scope of the invention.

Aspects of the Invention

The invention is further defined by the following aspects.

Aspect 1. A composition comprising: a polythiol; a polyalkenyl; an organoborane complex; and a radical oxidizing agent.

Aspect 2. The composition of aspect 1, wherein the polythiol comprises a polythiol prepolymer, a small molecule polythiol, or a combination thereof; and the polyalkenyl comprises a polyalkenyl prepolymer, a small molecule polyalkenyl, or a combination thereof.

Aspect 3. The composition of any one of aspects 1 to 2, wherein the polythiol comprises a thiol-terminated sulfur-containing prepolymer; and the polyalkenyl comprises a small molecule polyalkenyl Aspect 4. The composition of aspect 3, wherein the thiol-terminated sulfur-containing prepolymer comprises a thiol-terminated polythioether prepolymer, a thiol-terminated sulfur-containing polyformal prepolymer, a thiol-terminated monosulfide prepolymer, a thiol-terminated urethane-containing prepolymer, or a combination of any of the foregoing.

Aspect 5. The composition of any one of aspects 3 to 4, wherein the thiol-terminated sulfur-containing prepolymer comprises a thiol-terminated polythioether prepolymer.

Aspect 6. The composition of any one of aspects 3 to 5, wherein the thiol-terminated sulfur-containing prepolymer comprises a thiol-terminated polythioether prepolymer comprising at least one moiety having the structure of Formula (3):

$$-[S-(CH_2)_2-O-(R^2-O)_m(CH_2)_2-S-R^1-]_n \quad (3)$$

wherein,
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$, wherein,
p is an integer from 2 to 6;
q is an integer from 1 to 5;

r is an integer from 2 to 10;
each $R^3$ is independently selected from hydrogen and methyl; and
each X independently comprises O, S, or NR, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and —[(CHR$^3$)$_p$—X—]$_q$(CHR$^3$)$_r$—, wherein p, q, r, $R^3$, and X are as defined as for $R^1$;
m is an integer from 0 to 50; and
n is an integer from 1 to 60.

Aspect 7. The composition of any one of aspects 3 to 6, wherein the thiol-terminated sulfur-containing prepolymer comprises a thiol-terminated polythioether prepolymer of Formula (3a), a thiol-terminated polythioether prepolymer of Formula (3b), a thiol-terminated polythioether prepolymer of Formula (3c), or a combination of any of the foregoing:

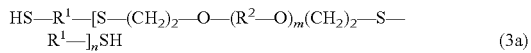

HS—R$^1$—[S—(CH$_2$)$_2$—O—(R$^2$—O)$_m$(CH$_2$)$_2$—S—R$^1$—]$_n$SH  (3a)

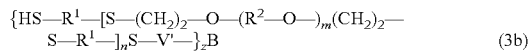

{HS—R$^1$—[S—(CH$_2$)$_2$—O—(R$^2$—O)$_m$(CH$_2$)$_2$—S—R$^1$—]$_n$S—V'—}$_z$B  (3b)

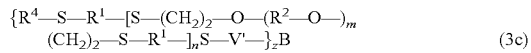

{R$^4$—S—R$^1$—[S—(CH$_2$)$_2$—O—(R$^2$—O)$_m$(CH$_2$)$_2$—S—R$^1$—]$_n$S—V'—}$_z$B  (3c)

wherein,
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and —[(CHR$^3$)$_p$—X—]$_q$(CHR$^3$)$_r$—, wherein,
p is an integer from 2 to 6;
q is an integer from 1 to 5;
r is an integer from 2 to 10;
each $R^3$ is independently selected from hydrogen and methyl; and
each X independently comprises O, S, or NR, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and —[(CHR$^3$)$_p$—X—]$_q$(CHR$^3$)$_r$—, wherein p, q, r, $R^3$, and X are as defined as for $R^1$;
m is an integer from 0 to 50;
n is an integer from 1 to 60;
B represents a core of a z-valent, polyfunctionalizing agent B(—V)$_z$ wherein,
z is an integer from 3 to 6; and
each V is a moiety comprising a terminal group reactive with a thiol; and
each —V'— is a moiety derived from the reaction of —V with a thiol; and
each $R^4$ is independently selected from hydrogen and a moiety of Formula (3), which is bound to a prepolymer of Formula (3c):

—[S—(CH$_2$)$_2$—O—(R$^2$—O)$_m$(CH$_2$)$_2$—S—R$^1$—]$_n$  (3).

Aspect 8. The composition of aspect 7, wherein,
each $R^1$ is —[(CH$_2$)$_p$—O—]$_q$(CH$_2$)$_r$—;
each $R^2$ is $C_{1-6}$ alkanediyl;
m is an integer from 0 to 3;
each p is 2;
q is 1 or 2;
r is 2; and
z is 3.

Aspect 9. The composition of any one of aspects 7 to 8, wherein
each $R^1$ is —[(CH$_2$)$_p$—O—]$_q$(CH$_2$)$_r$—;
each $R^2$ is $C_{1-6}$ alkanediyl;
m is an integer from 1 to 3;
each p is 2;
q is 1 or 2;
r is 2; and
z is 3.

Aspect 10. The composition of any one of aspects 3 to 9, wherein the thiol-terminated sulfur-containing prepolymer comprises a thiol-terminated polysulfide comprising a moiety of Formula (19), a thiol-terminated polysulfide comprising a moiety of Formula (20), a thiol-terminated polysulfide comprising a moiety of Formula (21), or a combination of any of the foregoing:

—(—R—S—S—)$_n$—R—  (19)

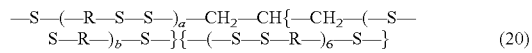

—S—(—R—S—S—)$_a$—CH$_2$—CH{—CH$_2$—(—S—S—R—)$_b$—S—}{—(—S—S—R—)$_c$—S—}  (20)

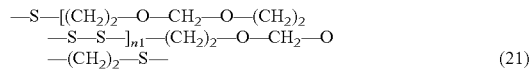

—S—[(CH$_2$)$_2$—O—CH$_2$—O—(CH$_2$)$_2$—S—S—]$_{n1}$—(CH$_2$)$_2$—O—CH$_2$—O—(CH$_2$)$_2$—S—  (21)

wherein,
each R is —(CH$_2$)$_2$—O—CH$_2$—O—(CH$_2$)$_2$—;
n=a+b+c, where n is an integer from 7 to 38; and
n1 is an integer from 8 to 80.

Aspect 11. The composition of any one of aspects 3 to 10, wherein the thiol-terminated sulfur-containing prepolymer comprises a thiol-terminated sulfur-containing polyformal comprising a moiety of Formula (24):

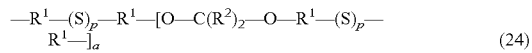

—R$^1$—(S)$_p$—R$^1$—[O—C(R$^2$)$_2$—O—R$^1$—(S)$_p$—R$^1$—]$_n$—  (24)

wherein,
n is an integer from 1 to 50;
each p is independently selected from 1 and 2;
each $R^1$ is $C_{2-6}$ alkanediyl; and
each $R^2$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl.

Aspect 12. The composition of any one of aspects 3 to 11, wherein the thiol-terminated sulfur-containing prepolymer comprises a thiol-terminated sulfur-containing polyformal prepolymer of Formula (24a), a thiol-terminated sulfur-containing polyformal prepolymer of Formula (24b), or a combination thereof:

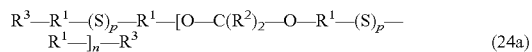

R$^3$—R$^1$—(S)$_p$—R$^1$—[O—C(R$^2$)$_2$—O—R$^1$—(S)$_p$—R$^1$—]$_n$—R$^3$  (24a)

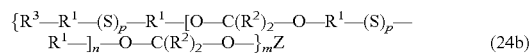

{R$^3$—R$^1$—(S)$_p$—R$^1$—[O—C(R$^2$)$_2$—O—R$^1$—(S)$_p$—R$^1$—]$_n$—O—C(R$^2$)$_2$—O—}$_m$Z  (24b)

wherein,
n is an integer selected from 1 to 50;
each p is independently selected from 1 and 2;
each $R^1$ is selected from $C_{2-6}$ alkanediyl;
each $R^2$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and
each $R^3$ comprises a thiol-terminated group; and
Z is derived from the core of an m-valent parent polyol Z(OH)$_m$.

Aspect 13. The composition of aspect 12, wherein each $R^3$ is selected from a group of Formula (a), Formula (b), Formula (c), Formula (d), Formula (e), and Formula (f):

$$HS-R^7-R^6-O- \quad (a)$$

$$HS-R^7-O- \quad (b)$$

$$HS-R^7-NH-C(=O)-O- \quad (c)$$

$$HS-R^7-C(=O)-O-R^9-NH-C(=O)-O- \quad (d)$$

$$HS-R^7-C(=O)-NH-R^9-NH-C(=O)-O- \quad (e)$$

$$HS-R^7-C(=O)-O- \quad (f)$$

wherein,
each $R^6$ is a moiety derived from a diisocyanate or a moiety derived from an ethylenically unsaturated monoisocyanate;
each $R^7$ is selected from $C_{2-14}$ alkanediyl and $C_{2-14}$ heteroalkanediyl; and
each $R^9$ is selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

Aspect 14. The composition of any one of aspects 3 to 13, wherein the sulfur-containing prepolymer comprises a thiol-terminated monosulfide prepolymer comprising a moiety of Formula (27):

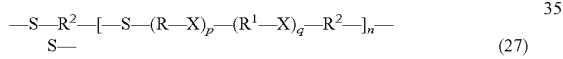

(27)

wherein,
each R is independently selected from $C_{2-10}$ alkanediyl, $C_{2-10}$ branched alkanediyl, $C_{6-8}$ cycloalkanediyl, $C_{6-14}$ alkylcycloalkyanediyl, and $C_{8-10}$ alkylarenediyl;
each $R^1$ is independently selected from $C_{1-10}$ n-alkanediyl, $C_{2-10}$ branched alkanediyl, $C_{6-8}$ cycloalkanediyl, $C_{6-14}$ alkylcycloalkanediyl, and $C_{8-10}$ alkylarenediyl;
each $R^2$ is independently selected from $C_{1-10}$ n-alkanediyl, $C_{2-10}$ branched alkanediyl, $C_{6-8}$ cycloalkanediyl; $C_{6-14}$ alkylcycloalkanediyl, and $C_{8-10}$ alkylarenediyl;
each X is independently selected from O and S;
p is an integer from 1 to 5;
q is an integer from 0 to 5; and
n is an integer from 1 to 60.

Aspect 15. The composition of any one of aspects 3 to 14, wherein the thiol-terminated sulfur-containing prepolymer comprises a thiol-terminated monosulfide prepolymer of Formula (27a), a thiol-terminated monosulfide prepolymer of Formula (27b), a thiol-terminated monosulfide prepolymer of Formula (27c), or a combination of any of the foregoing:

$$HS-R^2-[-S-(R-X)_p-(R^1-X)_qR^2-]_nSH \quad (27a)$$

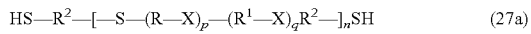

(27b)

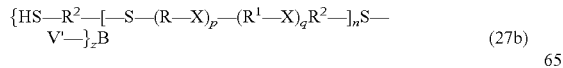

(27c)

wherein,
each X is independently selected from S, O, and $NR^3$, where $R^3$ is selected from $C_{1-4}$ alkyl;
p is an integer from 1 to 5;
q is an integer from 0 to 5;
n is an integer from 1 to 60;
each R is independently selected from $C_{2-10}$ alkanediyl, $C_{6-8}$ cycloalkanediyl, $C_{1-4}$ alkylcycloalkanediyl, and $C_{8-10}$ alkylarenediyl;
each $R^1$ is independently selected from $C_{1-10}$ alkyl, $C_{6-8}$ cycloalkyl, $C_{1-4}$ alkylcycloalkyl, and $C_{8-10}$ alkylaryl;
each $R^2$ is independently selected from $C_{2-10}$ alkanediyl, $C_{6-8}$ cycloalkanediyl, $C_{1-4}$ alkylcycloalkanediyl, and $C_{8-10}$ alkylarenediyl;
B represents a core of a z-valent polyfunctionalizing agent $B(-V)_z$ wherein:
z is an integer from 3 to 6; and
each V is a moiety comprising a terminal group reactive with a thiol group;
each —V'— is derived from the reaction of —V with a thiol; and
each $R^4$ is independently selected from hydrogen and a bond to a polyfunctionalizing agent $B(-V)_z$ through a moiety of Formula (27).

Aspect 16. The composition of any one of aspects 3 to 15, wherein the sulfur-containing prepolymer comprises a thiol-terminated monosulfide prepolymer comprising a moiety of Formula (28):

$$-[-S-(R-X)_p-C(R^1)_2-(X-R)_q-]_n-S- \quad (28)$$

wherein,
each R is independently selected from $C_{2-10}$ alkanediyl, $C_{3-10}$ branched alkanediyl, $C_{6-8}$ cycloalkanediyl, $C_{6-14}$ alkylcycloalkyanediyl, and $C_{8-10}$ alkylarenediyl;
each $R^1$ is independently selected from hydrogen, $C_{1-10}$ n-alkyl, $C_{3-10}$ branched alkyl, $C_{6-8}$ cycloalkyl group; $C_{6-14}$ alkylcycloalkyl, and $C_{8-10}$ alkylaryl;
each X is independently selected from O and S;
p is an integer from 1 to 5;
q is an integer from 1 to 5; and
n is an integer from 1 to 60.

Aspect 17. The composition of aspect 16, wherein the thiol-terminated sulfur-containing prepolymer comprises a thiol-terminated monosulfide prepolymer of Formula (28a), a thiol-terminated monosulfide prepolymer of Formula (28b), a thiol-terminated monosulfide prepolymer of Formula (28c), or a combination of any of the foregoing:

$$H-[-S-(R-X)_p-C(R^1)_2-(X-R)_q]_n-SH \quad (28a)$$

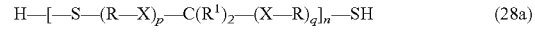

(28b)

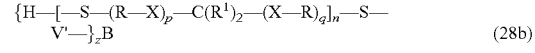

(28c)

wherein,
each X is independently selected from S and O;
p is an integer from 1 to 5;
q is an integer from 1 to 5;
n is an integer from 1 to 60;
each R is independently selected from $C_{2-10}$ alkanediyl;
each $R^1$ is independently selected from hydrogen and $C_{1-10}$ alkyl;
B represents a core of a z-valent polyfunctionalizing agent $B(-V)_z$ wherein:
z is an integer from 3 to 6; and
each V is a moiety comprising a terminal group reactive with a thiol group;

each —V'— is derived from the reaction of —V with a thiol; and each $R^4$ is independently selected from hydrogen and a bond to a polyfunctionalizing agent $B(-V)_z$ through a moiety of Formula (28).

Aspect 18. The composition of any one of aspects 3 to 17, wherein the thiol-terminated sulfur-containing prepolymer comprises a thiol-terminated urethane-containing prepolymer of Formula (9a), a thiol-terminated urethane-containing prepolymer of Formula (9b), or a combination thereof:

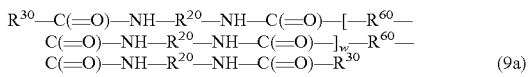

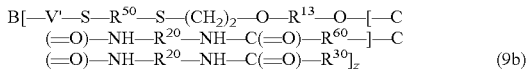  (9b)

wherein, w is an integer from 1 to 100;

each $R^{13}$ independently comprises $C_{2-10}$ alkanediyl;

each $R^{20}$ independently comprises a core of a diisocyanate;

each $R^{30}$ independently is a moiety comprising at least one terminal thiol group;

each $R^{50}$ independently comprises a core of a sulfur-containing prepolymer;

each $R^{60}$ independently comprises a moiety having the structure of Formula (10):

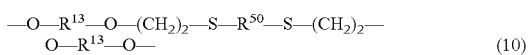  (10)

B represents a core of a z-valent, polyfunctionalizing agent $B(-V)_z$ wherein, z is an integer from 3 to 6; and each V is a moiety comprising a terminal group reactive with a thiol group; and each —V'— is derived from the reaction of —V with a thiol.

Aspect 19. The composition of any one of aspects 3 to 18, wherein the thiol-terminated sulfur-containing prepolymer comprises a thiol-terminated urethane-containing prepolymer comprising a moiety of Formula (15):

  (15)

wherein, s is an integer from 1 to 60;

each $R^1$ comprises $C_{2-10}$ alkanediyl, $C_{6-8}$ cycloalkanediyl, $C_{6-10}$ alkanecycloalkanediyl, or $-[(-CHR-)_p-X-]_q-(CHR)_r-$, wherein each R is independently selected from hydrogen and methyl, wherein, each X is independently selected from —O— and —S— each p is independently an integer from 2 to 6;

q is an integer from 1 to 5; and r is an integer from 2 to 10;

each A independently comprises a moiety of Formula (16) or a moiety of Formula (17):

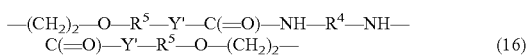  (16)

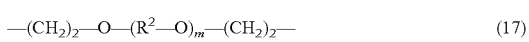  (17)

wherein, m is an integer from 0 to 50;

each Y' independently comprises —NH— or —O—; and each $R^2$ comprises $C_{2-6}$ n-alkanediyl, $C_{3-6}$ branched alkanediyl, $C_{6-8}$ cycloalkanediyl, $C_{6-10}$ alkanecycloalkanediyl, or $-[(-CH_2-)_p-O-]_q(-CH_2-)_r-$, wherein, each p is independently an integer ranging from 2 to 6;

q is an integer from 1 to 5; and r is an integer from 2 to 10;

$R^4$ comprises a core of a diisocyanate;

each $R^5$ independently comprises $C_{1-10}$ alkanediyl; and at least one A comprises a moiety of Formula (16).

Aspect 20. The composition of any one of aspects 1 to 19, wherein the polyalkenyl comprises a polyallyl, a bis(alkenyl) ether, a sulfur-containing bis(alkenyl) ether, or a combination of any of the foregoing.

Aspect 21. The composition of any one of aspects 1 to 20, wherein the polyalkenyl comprises a bis(alkenyl) ether.

Aspect 22. The composition of any one of aspects 1 to 21, wherein the polyalkenyl comprises a bis(alkenyl) ether of Formula (6):

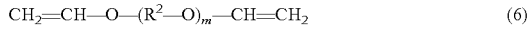  (6)

wherein, each $R^2$ can independently be selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, m can be an integer from 0 to 50;

p is an integer from 2 to 6;

q is an integer from 1 to 5;

r is an integer from 2 to 10;

each $R^3$ is independently selected from hydrogen and methyl; and each X independently comprises O, S, or NR, wherein R is selected from hydrogen and methyl.

Aspect 23. The composition of any one of aspects 1 to 22, wherein the polyalkenyl comprises cyclohexanedimethanol divinyl ether, ethyleneglycol divinyl ether, butanediol divinyl ether, hexanediol divinyl ether, diethylene glycol divinyl ether, triethylene glycol divinyl ether, tetraethylene glycol divinyl ether, or a combination of any of the foregoing.

Aspect 24. The composition of any one of aspects 1 to 203, wherein the organoborane complex comprises an organoborane-amine complex Aspect 25. The composition of any one of aspects 1 to 24, wherein the organoborane complex comprises tris(n-butyl)borane-3-methoxyproylamine.

Aspect 26. The composition of any one of aspects 1 to 25, wherein the organoborane complex comprises an organoborane complex of Formula (33):

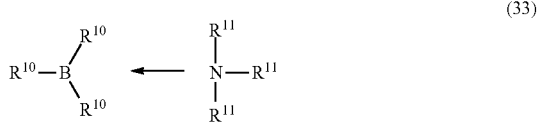  (33)

wherein, each $R^{10}$ is independently selected from hydrogen, $C_{1-12}$ alkyl, $C_{1-12}$ heteroalkyl, $C_{5-12}$ cycloalkyl, $C_{5-12}$ heterocycloalkyl, $C_{6-12}$, alkylaryl, an organosilane group, an organosiloxane group, and a $C_{1-12}$ alkanediyl group; and each $R^{11}$ is independently a substituted $C_{1-6}$ alkyl.

Aspect 27. The composition of claim 1, wherein the organoborane complex comprises a trialkyl borane and an amino-functional ligand.

Aspect 28. The composition of aspect 27, wherein the trialkyl borane comprises a compound having the structure of Formula (32);

$$B(-R^{10})_3 \quad (32)$$

wherein each $R_{10}$ is independently selected from hydrogen, $C_{1-12}$ alkyl, $C_{1-12}$ heteroalkyl, $C_{5-12}$ cycloalkyl, $C_{5-12}$ heterocycloalkyl, $C_{6-12}$, alkylaryl, an organosilane group, an organosiloxane group, and a 01.12 alkanediyl group.

Aspect 29. The composition of any one of aspects 27 to 28, wherein the amino-functional ligand comprises a substituted amine Aspect 30. The composition of any one of aspects 27 to 29, wherein the amino-functional ligand is 3-methoxy propyl amine Aspect 31. The composition of any one of aspects 27 to 30, wherein the amino-functional ligand comprises a compound having the structure:

$$N(-R^{11})_3$$

wherein each $R^{L1}$ is independently selected from hydrogen, $C_{1-12}$ alkyl, $C_{5-12}$ cycloalkyl, $C_{6-12}$, alkylaryl, an organosilane group, an organosiloxane group, a $C_{1-12}$ alkanediyl group capable of forming a covalent bridge to the boron, a divalent organosiloxane group capable of forming a covalent bridge to the boron, and halogen-substituted homologues thereof.

Aspect 32. The composition of aspect 31, wherein $R^{11}$ is selected from hydrogen, $C_{1-6}$ alkyl, and $C_{1-6}$ heteroalkyl.

Aspect 33. The composition of any one of aspects 1 to 32, wherein the radical oxidizing agent comprises a compound capable of forming free radicals at room temperature.

Aspect 34. The composition of any one of aspects 1 to 33, wherein the radical oxidizing agent comprises bis(tetrabutylammonium) persulfate (TBAPS), and other bis(tetraalkylammonium persulfates such as bis(tetramethylammonium) persulfate, bis(tetraethylammonium) persulfate, bis(tributylmethylammonium) persulfate, and combinations of any of the foregoing.

Aspect 35. The composition of any one of aspects 1 to 34, wherein the composition comprises an acid, an acidic component, or a combination thereof.

Aspect 36. The composition of any one of aspects 1 to 35, wherein the acidic component comprises fumed silica, precipitated silica, micronized silica, or a combination thereof.

Aspect 37. The composition of any one of aspects 1 to 36, wherein the composition comprises a photoinitiator.

Aspect 38. The composition of aspect 37, wherein the photoinitiator comprises a UV photoinitiator.

Aspect 39. The composition of any one of aspects 1 to 38, wherein the composition comprises from 40 wt % to 80 wt % of the polythiol, wherein the polythiol comprises a thiol-terminated sulfur-containing prepolymer, wherein wt % is based on the total weight of the composition.

Aspect 40. The composition of any one of aspects 1 to 39, wherein the composition comprises from 2 wt % to 10 wt % of the polyalkenyl, wherein wt % is based on the total weight of the composition.

Aspect 41. The composition of any one of aspects 1 to 40, wherein the composition comprises from 0.1 wt % to 2 wt % of a hydroxyl-functional vinyl ether.

Aspect 42. The composition of any one of aspects 1 to 41, wherein the composition comprises from 0.01 wt % to 3 wt % of the organoborane complex, wherein wt % is based on the total weight of the composition.

Aspect 43. The composition of any one of aspects 1 to 42, wherein the composition comprises from 0.2 wt % to 3 wt % of the radical oxidizing agent, wherein wt % is based on the total weight of the composition.

Aspect 44. The composition of any one of aspects 1 to 43, wherein the composition comprises:
from 40 wt % to 80 wt % of the polythiol, wherein the polythiol comprises a thiol-terminated sulfur-containing prepolymer;
from 2 wt % to 10 wt % of the polyalkenyl;
from 0.01 wt % to 3 wt % of the organoborane complex; and
from 0.2 wt % to 3 wt % of the radical oxidizing agent, wherein wt % is based on the total weight of the composition.

Aspect 45. The composition of any one of aspects 1 to 44, wherein,
the polythiol comprises a thiol-terminated polythioether prepolymer;
the polyalkenyl comprises a polyvinyl ether;
the organoborane complex comprises tris(n-butyl)borane-3-methoxyproylamine; and
the radical oxidizing agent comprises bis(tetrabutylammonium persulfate.

Aspect 46. The composition of any one of aspects 1 to 45, wherein the composition has a pH from 3 to 6.

Aspect 47. The composition of any one of aspects 1 to 46, wherein the composition further comprises from 10 wt % to 30 wt % of an acidic inorganic filler, wherein wt % is based on the total weight of the composition.

Aspect 48. The composition of aspect 47, wherein the acidic inorganic filler comprises fumed silica, precipitated silica, silica gel/amorphous silica, or a combination of any of the foregoing.

Aspect 49. The composition of any one of aspects 1 to 48, wherein the composition comprises form 0.02 wt % to 1 wt % of a UV photoinitiator, wherein wt % is based on the total weight of the composition.

Aspect 50. The composition of any one of aspects 1 to 49, wherein the composition comprises from 0.01 wt % to 4 wt % of an amino-functional alkoxysilane, wherein wt % is based on the total weight of the composition.

Aspect 51. The composition of any one of aspects 1 to 50, wherein the composition comprises a trifunctional polythiol, a micronized oxidized polyethylene homopolymer, a plasticizer, calcium carbonate, silica, a low-density filler, a hydroxyl-functional vinyl ether, an adhesion promoter, or a combination thereof.

Aspect 52. The composition of any one of aspects 1 to 51, wherein the composition is curable under dark conditions.

Aspect 53. A cured sealant prepared from the composition of any one of aspects 1 to 52.

Aspect 54. The cured sealant of aspect 53, wherein the cured sealant exhibits a tensile strength greater than 200 psi (1.3 MPa) and an % elongation greater than 200% following exposure to Jet Reference Fluid Type I according to AMS 3269, where tensile strength and % elongation are determined according to AMS 3279.

Aspect 55. A part sealed with the cured sealant of any one of aspects 52 to 53.

Aspect 56. A vehicle comprising a surface sealed with the cured sealant of any one of aspects 52 to 53.

Aspect 57. The vehicle of aspect 56, wherein the vehicle is an aerospace vehicle.

Aspect 58. A method of sealing a part comprising: applying the composition of any one of aspects 1 to 52 to a part; and allowing the applied composition to cure, to seal the part.

Aspect 59. The method of aspect 58, further comprising, after or during applying the composition of claim 1 to the part, exposing at least a portion of the applied composition to actinic radiation.

Aspect 60. A sealant system, comprising:
a first part, wherein the first part comprises a polyalkenyl; and
a second part, wherein the second part comprises a polythiol;
a third part, wherein the third part comprises an organoborane complex; and
a fourth part, wherein the fourth part comprises a radical oxidizing agent.

Aspect 61. The sealant system of aspect 60, wherein the first part, the second, or both the first and second parts comprise a UV photoinitiator.

Aspect 62. A sealant comprising the sealant system of any one of aspects 60 to 61, wherein the first part, the second part, the third part, and the fourth part are combined.

Aspect 63. A cured sealant prepared from the sealant system of any one of aspects 60 to 61.

Aspect 64. A part comprising the cured sealant of aspect 63.

Aspect 65. A vehicle comprising a surface sealed with the cured sealant of any one of aspects 60 to 61.

Aspect 66. The vehicle of aspect 65, wherein the vehicle is an aerospace vehicle.

Aspect 67. A method of sealing a part, comprising: combining the first part, the second part, the third part, and the fourth part of the sealant system of any one of aspects 60 to 61 to provide a curable sealant; applying the curable sealant to a part; and allowing the applied sealant to cure, to seal the part.

Aspect 68. The method of aspect 67, further comprising, after or during applying the curable sealant to the part, exposing at least a portion of the applied sealant to actinic radiation.

EXAMPLES

Embodiments provided by the present disclosure are further illustrated by reference to the following examples, which describe the compositions provided by the present disclosure and uses of such compositions. It will be apparent to those skilled in the art that many modifications, both to materials, and methods, may be practiced without departing from the scope of the disclosure.

Example 1

General Procedures

Handling of photoinitiators and photoinitiator-containing formulations was done in the dark. Hand-mixing was done with a stainless spatula. Clear/black jars of different capacities (Flack Tek Inc.) were used for making the formulations. Mixing was done using a Hauschild SpeedMixer (Model: DAC 600 FVZ). Unless specified, mixing was done at 2,300 rpm. Tetrabutylammonium persulfate (TBAPS) was synthesized using a literature-procedure (*Tetrahedron* 2007, 63, 5184-5188) and was used in the form of a 10% solution in chloroform. Tri-n-butylborane-3-methoxypropylamine complex (TnBB-MOPA) was obtained from BASF and was used in the form of a 10% solution in cyclohexane. Sealant-flowouts were made by placing an uncured sealant composition between two polyethylene sheets separated by 0.125-inch (3.175-mm) spacers and pressing between two heavy aluminum plates. Tensile and % elongation were determined on dumbbell-shaped specimens (gauge length: 0.5 inch (12.7 mm)) that were cut from cured sheets with an ISO 37 Type 2 die. A Rex Durometer Model 1700 was used for the determination of Shore A hardness. An Instron 3369 was used for the determination of tensile strength and % elongation.

Example 2

Synthesis of Polythioether Polymer (1)

A polythioether prepolymer was prepared in the manner described in Example 1 of U.S. Pat. No. 6,232,401.

In a 2-liter flask, 524.8 g (3.32 mol) of diethylene glycol divinyl ether (DEG-DVE) and 706.7 g (3.87 mol) of dimercaptodioxaoctane (DMDO) were mixed with 19.7 g (0.08 mol) of triallylcyanurate (TAC) and heated to 77° C. To the heated reaction mixture was added 4.6 g (0.024 mol) of a free radical catalyst, Vazo® 67 (2,2'-azobis(2-methyl-butyronitrile), available from DuPont). The reaction proceeded substantially to completion after 2 h to afford 1,250 g (0.39 mol, yield 100%) of a liquid polythioether prepolymer having a $T_g$ of −68° C. and a viscosity of 65 poise (6.5 Pa-sec). The resin was faintly yellow and had low odor.

The theoretical functionality of the prepolymer was 2.2.

Example 3

Synthesis of Polythioether Polymer (2)

A polythioether prepolymer was prepared as described in Example 2 of U.S. Pat. No. 8,932,685.

Triallylcyanurate (TAC) (36.67 g, 0.15 mole) and dimercaptodioxaoctane (DMDO) (449.47 g, 2.47 moles) were charged in a 1-liter, 4-necked round-bottomed flask. The flask was equipped with a stirrer, gas-passing adapter and thermometer. While stirring, the flask was flushed with dry nitrogen, and a solution of potassium hydroxide (0.012 g; aqueous concentration: 50%) was added and the reaction mixture was heated to 76° C. A solution of radical initiator Vazo® 67 (0.32 g) in diethylene glycol divinyl ether (316.44 g, 2.00 moles) was introduced in the reaction mixture over a period of 2 h during which a temperature of 66° C. to 76° C. was maintained. Following the completion of the addition of the divinyl ether, the temperature of the reaction mixture increased to 84° C. The reaction mixture was cooled to 74° C. and nine portions of Vazo® 67 (~0.15 g each) were added at an interval of 1 h while the temperature was maintained at 74° C. to 77° C. The reaction mixture was heated at 100° C. for 2 hours, cooled to 80° C., and evacuated at 68° C. to 80° C. at a pressure of 5-7 mmHg for 1.75 h.

The theoretical functionality of the polythioether prepolymer was 2.8 and had a mercaptan equivalent weight of 1,566 and a viscosity of 140 poise (1.4 Pa-sec).

Example 4

Sealant Composition (1)

A sealant composition was prepared by mixing the polythioether prepolymers described in Example 2 and Example 3 with triallylcyanurate (TAC), triethylene glycol divinyl ether (TEG-DVE), and other ingredients described in Table 1.

TABLE 1

Sealant composition (1).

| Component | Weight (g) |
| --- | --- |
| Polythioether prepolymer (1) | 36.62 |
| Polythioether prepolymer (2) | 4.59 |
| TAC | 0.63 |
| TEG-DVE | 1.93 |
| Fumed silica (Cab-O-Sil ® M5) | 2.19 |
| Total Charge | 45.96 |

Polythioether prepolymer (1) (equivalent wt.: 1,540) and polythioether prepolymer (2) (equivalent wt.: 1,584) were charged into a clear jar (size: 60 g) and mixed in a Hauschild mixer for 4 min. TAC and TEG-DVE were added and the contents were mixed in the Hauschild mixer for 4 min. Fumed silica (Cab-O-Sil® M5) was added and the contents were mixed in the Hauschild mixer for 30 sec. The contents were subjected to two rounds of hand-mixing followed by 4 min of mixing in Hauschild mixer. The mixture was allowed to cool for 40 min.

Sealant 1A: A 15 g portion of the sealant composition was placed in a clear jar (size; 60 g). TnBB-MOPA (0.0225 g) was added. The contents were hand-mixed, mixed further in Hauschild mixer for 30 sec, and allowed to cure in the open cup under ambient laboratory lighting at ambient temperature (25° C.) and humidity (50% RH). After 6 days of curing, hardness of the cured sealant was Shore 15 A.

Sealant 1B: Another 15 g portion of the sealant composition was placed in a clear jar (size; 60 g). TBAPS (0.3 g of 10% solution in chloroform) was added and the contents were hand-mixed. TnBB-MOPA (0.015 g) was added. The contents were hand-mixed, mixed further in Hauschild mixer for 30 sec and allowed to cure in the open cup under ambient laboratory lighting at ambient temperature (25° C.) and humidity (50% RH). After 6 days of curing, the hardness of the cured sealant was Shore 40 A. The hardness results demonstrated that a combination of TBAPS and TnBB-MOPA was a superior catalyst package than TnBB-MOPA alone.

Example 5

Dual-Cure Sealant Composition (2)

A sealant composition was prepared by mixing the ingredients described in Table 2.

TABLE 2

Sealant composition (2).

| Component | Weight (g) |
| --- | --- |
| Polythioether prepolymer (1) | 32.53 |
| Polythioether prepolymer (2) | 3.84 |
| TAC | 0.52 |
| TEG-DVE | 1.62 |
| Calcium carbonate (Socal ® 2G 31UF) | 0.0235 |
| Fumed silica (Cab-O-Sil ® M5) | 0.7240 |

TABLE 2-continued

Sealant composition (2).

| Component | Weight (g) |
| --- | --- |
| Silica gel/amorphous silica (Gasil ® IJ35) | 8.7809 |
| Darocur ® TPO (photoinitiator) | 0.0233 |
| Irgacure ® 651 (photoinitiator) | 0.0913 |

Polythioether polymer (1) (equivalent wt.: 1,636) and polythioether polymer (2) (equivalent wt.: 1,584) were charged into a clear jar (size: 100 g) and mixed in Hauschild mixer for 30 sec. TAC and TEG-DVE were added and the contents were mixed in Hauschild mixer for 4 min. Calcium carbonate was added; the contents were hand-mixed and mixed further in Hauschild mixer for 30 sec. Cab-O-Sil® M5 was added and the contents were mixed in Hauschild mixer for 30 sec. Gasil® IJ35 was added and the contents were mixed in Hauschild mixer for 30 sec. The thixotropic contents were hand-mixed, mixed further in Hauschild mixer twice for 4 min each and cooled to room temperature (25° C.). A photoinitiator (1.15 g of a 10% solution of 4:1 mixture of Irgacure® 651 and Darocur® TPO in ethyl acetate) was added. The contents were hand-mixed and mixed further in a Hauschild mixer for 30 sec. TBAPS (0.096 g of a 10% solution in chloroform) was added and the contents were hand-mixed. TnBB-MOPA (0.0481 g of 10% solution in cyclohexane) was added and the contents were hand-mixed and mixed further in a Hauschild mixer for 30 sec. A flowout was made and cured in the dark for two days at ambient temperature (25° C.) and humidity (50% RH) and for 1 day at 60° C.

The cured sealant had a hardness of Shore 68 A, a tensile strength of 840 psi (5.79 MPa), and an elongation of 212%.

Example 6

Base Composition (1)

A base composition was prepared by mixing the ingredients described in Table 3.

TABLE 3

Base composition (1).

| Component | Weight (g) |
| --- | --- |
| Polythioether prepolymer (1) | 90.39 |
| Polythioether prepolymer (2) | 10.67 |
| Calcium Carbonate (Socal ® 2G 31UF) | 0.08 |
| Fumed silica (Cab-O-Sil ® M5) | 1.90 |
| Silica gel/amorphous silica (Gasil ® IJ35) | 23.04 |

Polythioether prepolymer (1) (equivalent wt.: 1,636) and polythioether prepolymer (2) (equivalent wt.: 1,584) were charged into a clear jar (size: 300 g) and mixed in Hauschild mixer 30 sec. Calcium carbonate and Cab-O-Sil® M5 were added, and the contents were mixed in the Hauschild mixer twice for 30 sec each and then for 3 min. Gasil® IJ35 was added and the contents were mixed in the Hauschild mixer for 30 sec. The thixotropic contents were subjected to two rounds of hand-mixing and mixed further in the Hauschild mixer for 4 min. The contents were cooled to room temperature (25° C.).

Example 7

Dual-Cure Sealant Composition (3)

A sealant composition was prepared by mixing the ingredients described in Table 4.

TABLE 4

| Dual-cure sealant composition (2). | |
| --- | --- |
| Component | Weight (g) |
| Base composition of Example 6 | 45.77 |
| TEG-DVE | 2.27 |
| Photoinitiators (10% solution in ethyl acetate) | 1.23 |
| 10% TBAPS in chloroform | 0.412 |
| 10% TnBB-MOPA in cyclohexane | 0.206 |

The base of Example 6 and TEG-DVE were charged into a Hauschild mixing cup (size: 100 g) and mixed in the Hauschild mixer for 30 sec. The contents were hand-mixed and mixed further in the Hauschild mixer for 30 sec. A photoinitiator (1.23 g of a 10% solution of 4:1 mix of Irgacure® 651 and Darocur® TPO in ethyl acetate) was added. The contents were hand-mixed and mixed further in the Hauschild mixer for 30 sec. TBAPS (0.412 g of a 10% solution in chloroform) was added. The contents were hand-mixed and mixed further in the Hauschild mixer for 30 sec. TnBB-MOPA (0.206 g of 10% solution in cyclohexane) was added. The contents were mixed in the Hauschild mixer for 15 sec. The contents were hand-mixed and mixed further in a Hauschild mixer for 15 sec. A flowout was prepared and cured for two days/ambient lights/ambient temperature (25° C.) and 1 day at 60° C. The cured sealant had a hardness of Shore 55 A, a tensile strength of 670 psi (4.62 MPa) and an elongation of 392%.

Example 8

Base Composition (2)

A base composition was prepared by mixing the ingredients described in Table 5:

TABLE 5

| Base composition (2). | |
| --- | --- |
| Component | Weight (g) |
| Polythioether prepolymer (1a) | 62.00 |
| Polythioether prepolymer (1b) | 70.28 |
| Polythioether prepolymer 2 | 10.67 |
| Calcium Carbonate (Socal ® 2G 31UF) | 0.113 |
| Silica (Cab-O-Sil ® M5) | 2.69 |
| Silica (Gasil ® IJ 35) | 32.59 |

The polythioether prepolymer (1a) (equivalent wt.: 1,636) (Example 2), the polythioether prepolymer (1b) (equivalent wt.: 1610; same as polythioether (1a) but different lot) (Example 2), and the polythioether prepolymer (2) (equivalent wt.: 1584) (Example 3) were charged into a clear jar (size: 300 g) and mixed in a Hauschild mixer 4 min. Calcium carbonate was added and the contents were mixed in the Hauschild mixer twice for 30 sec. Cab-O-Sil® M5 was added and the contents mixed in the Hauschild mixer twice for 30 sec. The contents were hand-mixed and mixed in Hauschild mixer for 30 sec. The contents were hand-mixed and mixed further in a Hauschild mixer for 4 min. Gasil® IJ35 was added and the contents mixed in the Hauschild mixer twice for 30 sec. The thixotropic contents were hand-mixed and mixed further in the Hauschild mixer for 30 sec. The contents were mixed twice by hand-mixing and mixing further in the Hauschild mixer for 4 min.

Example 9

Dark-Cure Sealant Composition (4)

A sealant composition was prepared by mixing the ingredients described in Table 6.

TABLE 6

| Sealant composition (4) | |
| --- | --- |
| Component | Weight (g) |
| Base Composition (2) of Example 8 | 45.85 |
| TEG-DVE | 2.29 |
| 10% TBAPS in chloroform | 0.827 |
| 10% TnBB-MOPA in cyclohexane | 0.827 |

The base composition (2) of Example 8 and TEG-DVE were charged into a Hauschild mixing cup (size: 100 g) and mixed in the Hauschild mixer for 30 sec. The contents were hand-mixed and mixed further in the Hauschild mixer for 30 sec. TBAPS (0.827 g of a 10% solution in chloroform) was added. The contents were hand-mixed and mixed further in the Hauschild mixer for 30 sec. TnBB-MOPA (0.827 g of 10% solution in cyclohexane) was added and the contents were mixed in the Hauschild mixer for 30 sec. A flowout was made. The composition was fast-curing and the quality of the flowout was substandard. The flowout was cured for 7 days at room temperature (25° C.) in the dark.

The cured specimen had a hardness of Shore 50 A, a tensile strength of 578 psi (3.98 MPa) and an elongation of 491%.

Example 10

Part A of UV-Curable Sealant Composition (5)

Part A of a UV-curable sealant composition was prepared by mixing the ingredients described in Table 7.

TABLE 7

| Part A of UV-curable sealant composition. | |
| --- | --- |
| Component | Weight (g) |
| Cyclohexanedimethanol divinyl ether | 69.41 |
| 4-Hydroxybutyl vinyl ether | 9.49 |
| Darocur ® TPO | 0.31 |
| Irgacure ® 651 | 1.25 |
| Polybutadiene plasticizer | 8.45 |
| Calcium carbonate, precipitated | 0.91 |
| Fumed silica | 10.18 |

Cyclohexanedimethanol divinyl ether, 4-hydroxybutyl vinyl ether, Darocur® TPO, Irgacure®651, and a polybutadiene plasticizer were charged in a black jar (size: 200 g). The contents were hand-mixed and mixed further in a Hauschild mixer (speed: 2,000 rpm) for 30 sec. Calcium carbonate and fumed silica were added, and the contents were hand-mixed and mixed further in the Hauschild mixer (speed: 2,000 rpm) for 1 min.

The blend had a viscosity of 280 poise (28 Pa-sec) (Brookfield Viscometer, Spindle #7, 10 rpm).

Example 11

Part B of UV-Curable Sealant Composition (5)

Part B of a UV-curable sealant composition was prepared by mixing the ingredients described in Table 8.

TABLE 8

Part B of UV-curable sealant composition.

| Component | Weight (g) |
|---|---|
| Polythioether prepolymer (1) | 57.34 |
| Polythioether prepolymer (2) | 13.53 |
| Trifunctional polythiol | 2.49 |
| Micronized oxidized polyethylene homopolymer, Acumist ® A6 | 5.39 |
| Fumed Silica (1) | 1.94 |
| Fumed Silica (2) | 2.56 |
| Silica gel/amorphous silica, Gasil ® IJ35 | 16.37 |
| Low-density filler, Expancel ® 920 DE 40D30 | 0.25 |
| (3-Mercaptopropyl)trimethoxy silane | 0.13 |

The polythioether prepolymer (1) (equivalent wt.: 1,625) (Example 2), the polythioether polymer (2) (equivalent wt.: 1,531) (Example 3), and a trifunctional thiol were charged into a black jar (size: 200 g). The contents were hand-mixed and mixed further in the Hauschild mixer (speed: 1200 rpm) for 1 min. Acumist® A6, a micronized oxidized polyethylene homopolymer (Honeywell International), was added and the contents were mixed in the Hauschild mixer (speed: 2000 rpm) for 1 min. Fumed silica (1) and fumed silica (2) were added, and the contents were mixed in the Hauschild mixer (speed: 2,350 rpm) for 2 min. Gasil® IJ35 was added and the contents were mixed twice by hand-mixing followed by further mixing in the Hauschild mixer (speed: 2,300 rpm) for 2 min. Expancel® 920 (AkzoNobel Inc.) was added and the contents were mixed in the Hauschild mixer (speed: 1,800 rpm) for 1 min. (3-Mercaptopropyl)trimethoxysilane was added and the contents were mixed twice by hand-mixing followed by further mixing in the Hauschild mixer (speed: 2,000 rpm) for 1 min.

The blend had a viscosity of ~20,000 poise (2,000 Pa-sec) (Brookfield; Spindle #7, 10 rpm).

Example 12

Dual-Cure Sealant Composition (5) Containing Silquest® A-1120 as Cure Rate Modifier A sealant composition was prepared by mixing the ingredients described in Table 9:

TABLE 9

Dual-cure sealant composition (5).

| Component | Weight (g) |
|---|---|
| Part B of Example 11 | 45.00 |
| Part A of Example 10 | 3.51 |
| Silquest ® A-1120 | 0.97 |
| 10% TBAPS in chloroform | 0.97 |
| 10% TnBB-MOPA in dicyclohexane | 0.97 |

Part B of Example 11 and Part A of Example 10 were charged into a clear jar (size: 100 g). The contents were hand-mixed and mixed further in a Hauschild mixer for 30 sec. Silquest® A-1120 (N-(β-aminoethyl) γ-aminopropyltrimethoxysilane) was added, and the contents were hand-mixed and mixed further in the Hauschild mixer for 30 sec. TBAPS (0.97 g of a 10% solution in chloroform) was added, and the contents were hand-mixed and mixed further in the Hauschild mixer for 30 sec. TnBB-MOPA (0.97 g of 10% solution in cyclohexane) was added and the contents were mixed in the Hauschild mixer for 30 sec. The mixture was thick and thixotropic. A flowout was made and cured for 21 days under dark conditions at room temperature (25° C.). Seven tensile specimens (gauge length: 0.5-inches (12.7 mm)) were cut and a set of three was used for determination of hardness, tensile strength and elongation.

The hardness was Shore 55 A, the tensile strength was 384 psi (2.65 MPa), and the elongation was 197%.

Another set of three test specimens was exposed to UV (duration: 2 min; height: 3.5-inches (88.9 mm); source: Phoseon RX Firefly™ 50×20 AC395-4W) and then used for determination of hardness, tensile strength and % elongation. The hardness was Shore 56 A, the tensile strength 369 psi (2.54 MPa), and the elongation 175%. After the UV-exposure, there was no significant change in the values of hardness, tensile strength and elongation, which indicated that the test specimens were fully cured under the dark conditions.

Example 13

Summary Results

A summary of the results is provided in Table 10.

TABLE 10

Summary of results.

| Example Sealant | Cure Conditions | Photoinitiator | Co-Catalyst | Hardness Shore A | Tensile Strength psi (MPa) | Elongation % |
|---|---|---|---|---|---|---|
| Example 4 Sealant 1 | ambient light[1] 6 days at 23° C. | no | no | 15 | —[4] | — |
| Example 4 Sealant 1 | ambient light[1] 6 days at 23° C. | no | yes | 40 | — | — |
| Example 5 Sealant 2 | dark[2] 2 days at 23° C. 1 day at 60° C. | yes | yes | 68 | 840 (5.79) | 212 |
| Example 7 Sealant 3 | ambient light[1] 2 days at 23° C. 1 day at 60° C. | yes | yes | 55 | 670 (4.62) | 392 |

TABLE 10-continued

Summary of results.

| Example Sealant | Cure Conditions | Photoinitiator | Co-Catalyst | Hardness Shore A | Tensile Strength psi (MPa) | Elongation % |
|---|---|---|---|---|---|---|
| Example 9 Sealant 4 | Dark[2] 7 days at 23° C. | no | yes | 50 | 578 (3.98) | 491 |
| Example 12 Sealant 5 | Dark[2] 21 days at 23° C. | yes | yes | 55 | 384 (2.65) | 197 |
| Example 12 Sealant 5 | UV[3] + Dark[2] | yes | yes | 56 | 369 (2.54) | 175 |

[1]Ambient cure conditions: exposure to laboratory lighting.
[2]Dark cure conditions: no light exposure.
[3]UV cure conditions: UV exposure for 2 min, 3.5-inches (88.9 mm); source: Phoseon RX Firefly™ 50×20 AC395-4W.
[4]Not measured.

Finally, it should be noted that there are alternative ways of implementing the embodiments disclosed herein. Accordingly, the present embodiments are to be considered as illustrative and not restrictive. Furthermore, the claims are not to be limited to the details given herein and are entitled to their full scope and equivalents thereof.

What is claimed is:

1. A composition comprising:
   a polythiol;
   a polyalkenyl;
   an organoborane complex; and
   a radical oxidizing agent, wherein the radical oxidizing agent comprises a persulfate.

2. The composition of claim 1, wherein,
   the polythiol comprises a thiol-terminated sulfur-containing prepolymer; and
   the polyalkenyl comprises a small molecule polyalkenyl.

3. The composition of claim 2, wherein the thiol-terminated sulfur-containing prepolymer comprises a thiol-terminated polythioether prepolymer comprising at least one moiety having the structure of Formula (3):

$$[S(CH_2)_2—O—(R^2—O)_m(CH_2)_2—S—R^1—]_n— \quad (3)$$

wherein,
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and —[(CHR^3)_p—X—]_q(CHR^3)_r—, wherein,
p is an integer from 2 to 6;
q is an integer from 1 to 5;
r is an integer from 2 to 10;
each $R^3$ is independently selected from hydrogen and methyl; and
each X independently is selected from O, S, and NR, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and —[(CHR^3)_p—X—]_q(CHR^3)_r—, wherein p, q, r, $R^3$, and X are as defined as for $R^1$;
m is an integer from 0 to 50; and
n is an integer from 1 to 60.

4. The composition of claim 2, wherein the thiol-terminated sulfur-containing prepolymer comprises a thiol-terminated polythioether prepolymer of Formula (3a), a thiol-terminated polythioether prepolymer of Formula (3b), a thiol-terminated polythioether prepolymer of Formula (3c), or a combination of any of the foregoing:

$$HS—R^1—[S—(CH_2)_2—O—(R^2—O)_m(CH_2)_2—S—R^1—]_mSH \quad (3a)$$

$$\{HS—R^1—[S—(CH_2)_2—O—(R^2—O—)_m(CH_2)_2—S—R^1—]_n—S—V'—\}_zB \quad (3b)$$

$$\{R^4—S—R^1—[S—(CH_2)_2—O—(R^2—O—)_m(CH_2)_2—S—R^1—]_n—S—V'—\}_zB \quad (3c)$$

wherein,
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and —[(CHR^3)_p—X—]_q(CHR^3)_r—, wherein,
p is an integer from 2 to 6;
q is an integer from 1 to 5;
r is an integer from 2 to 10;
each $R^3$ is independently selected from hydrogen and methyl; and
each X independently is selected from O, S, and NR, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and —[(CHR^3)_p—X—]_q(CHR^3)_r—, wherein p, q, r, $R^3$, and X are as defined as for $R^1$;
m is an integer from 0 to 50;
n is an integer from 1 to 60;
B represents a core of a z-valent, polyfunctionalizing agent B(—V)_z wherein,
z is an integer from 3 to 6; and
each V is a moiety comprising a terminal group reactive with a thiol; and
each —V'— is a moiety derived from the reaction of —V with a thiol; and
each $R^4$ is independently selected from hydrogen and a moiety of Formula (3), which is bound to a prepolymer of Formula (3c):

$$—[S—(CH_2)_2—O—(R^2—O)_m(CH_2)_2—S—R^1—]_n— \quad (3).$$

5. The composition of claim 1, wherein the polyalkenyl comprises a bis(alkenyl) ether.

6. The composition of claim 1, wherein the organoborane complex comprises an organoborane-amine complex.

7. The composition of claim 1, wherein the organoborane complex comprises an organoborane complex of Formula (33):

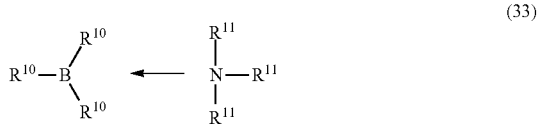

(33)

wherein,
each $R^{10}$ is independently selected from hydrogen, $C_{1-12}$ alkyl, $C_{1-12}$ heteroalkyl, $C_{5-12}$ cycloalkyl, $C_{5-12}$ heterocycloalkyl alkylaryl, an organosilane group, an organosiloxane group, and a $C_{1-12}$ alkanediyl group; and
each $R^1$ is independently a substituted $C_{1-6}$ alkyl.

8. The composition of claim 1, wherein the organoborane complex comprises a trialkyl borane and an amino-functional ligand.

9. The composition of claim 1, wherein the radical oxidizing agent comprises a compound capable of forming free radicals at room temperature.

10. The composition of claim 1, wherein the radical oxidizing agent is selected from bis(tetrabutylammonium) persulfate (TBAPS), bis(tetrabutylammonium persulfate, bis(tetraethylammonium) persulfate, bis(tributylmethylammonium) persulfate, and combinations of any of the foregoing.

11. The composition of claim 1, wherein the composition comprises an acid, an acidic component, or a combination thereof.

12. The composition of claim 1, wherein the composition comprises a photoinitiator.

13. The composition of claim 1, wherein the composition comprises:
from 40 wt % to 80 wt % of the polythiol, wherein the polythiol comprises a thiol-terminated sulfur-containing prepolymer;
from 2 wt % to 10 wt % of the polyalkenyl;
from 0.01 wt % to 3 wt % of the organoborane complex; and
from 0.2 wt % to 3 wt % of the radical oxidizing agent, wherein wt % is based on the total weight of the composition.

14. The composition of claim 1, wherein,
the polythiol comprises a thiol-terminated polythioether prepolymer;
the polyalkenyl comprises a polyvinyl ether;
the organoborane complex comprises tris(n-butyl)borane-3-methoxyproylamine; and
the radical oxidizing agent comprises bis(tetrabutylammonium) persulfate.

15. The composition of claim 1, wherein the composition has a pH from 3 to 6.

16. A cured sealant prepared from the composition of claim 1.

17. A part sealed with the cured sealant of claim 16.

18. A vehicle comprising the part of claim 17.

19. A method of sealing a part comprising:
applying the composition of claim 1 to a part; and
allowing the applied composition to cure, to seal the part.

20. The method of claim 19, further comprising, after or during applying the composition of claim 1 to the part, exposing at least a portion of the applied composition to actinic radiation.

21. The part of claim 17, wherein the part is an aerospace vehicle part.

22. The vehicle of claim 18, wherein the vehicle is an aerospace vehicle.

* * * * *